United States Patent
Jain et al.

(10) Patent No.: US 9,906,562 B2
(45) Date of Patent: Feb. 27, 2018

(54) ASSOCIATING SERVICE TAGS WITH REMOTE DATA MESSAGE FLOWS BASED ON REMOTE DEVICE MANAGEMENT ATTRIBUTES

(71) Applicant: Nicira, Inc., Palo Alto, CA (US)

(72) Inventors: Jayant Jain, Cupertino, CA (US); Anirban Sengupta, Saratoga, CA (US); Srinivas Nimmagadda, San Jose, CA (US); Alok S. Tiagi, Palo Alto, CA (US); Kausum Kumar, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 85 days.

(21) Appl. No.: 14/929,404

(22) Filed: Nov. 1, 2015

(65) Prior Publication Data
US 2017/0064749 A1 Mar. 2, 2017

Related U.S. Application Data

(60) Provisional application No. 62/211,677, filed on Aug. 28, 2015.

(51) Int. Cl.
*H04L 12/28* (2006.01)
*H04L 29/06* (2006.01)
(Continued)

(52) U.S. Cl.
CPC ........ *H04L 63/20* (2013.01); *G06F 17/30958* (2013.01); *H04L 12/4641* (2013.01); *H04L 41/5045* (2013.01); *H04L 61/256* (2013.01); *H04L 61/2571* (2013.01); *H04L 61/2585* (2013.01); *H04L 63/029* (2013.01); *H04L 63/0236* (2013.01); *H04L 63/0263* (2013.01); *H04L 63/0272* (2013.01); *H04L 63/08* (2013.01); *H04L 63/105* (2013.01); *H04L 67/1097* (2013.01); *H04L 69/22* (2013.01);
(Continued)

(58) Field of Classification Search
None
See application file for complete search history.

(56) References Cited

U.S. PATENT DOCUMENTS 6,079,020 A * 6/2000 Liu ................ H04Q 3/0029
709/223
2002/0169980 A1 11/2002 Brownwell
(Continued)

FOREIGN PATENT DOCUMENTS

WO 2017040334 A1 3/2017

OTHER PUBLICATIONS

Dunbar, Linda, et al., "Layer 4-7 Service Chain Problem Statement," Internet-Draft, Jul. 11, 2013, 16 pages, draft-dunbar-14-17-sc-problem-statement-00.txt., IETF Trust.
(Continued)

*Primary Examiner* — Bob Phunkulh
(74) *Attorney, Agent, or Firm* — Adeli LLP

(57) ABSTRACT

Some embodiments provide novel methods for processing remote-device data messages in a network based on data-message attributes from a remote device management (RDM) system. For instance, the method of some embodiments identifies a set of RDM attributes associated with a data message, and then performs one or more service operations based on identified RDM attribute set.

24 Claims, 28 Drawing Sheets

(51) Int. Cl.
  *H04L 12/46*     (2006.01)
  *H04W 12/08*    (2009.01)
  *H04W 76/02*    (2009.01)
  *H04L 29/12*     (2006.01)
  *G06F 17/30*     (2006.01)
  *H04L 29/08*     (2006.01)
  *H04L 12/24*     (2006.01)

(52) U.S. Cl.
  CPC ......... *H04W 12/08* (2013.01); *H04W 76/022* (2013.01); *H04L 67/1004* (2013.01)

(56) References Cited

U.S. PATENT DOCUMENTS

| | | | |
|---|---|---|---|
| 2003/0033398 A1 | 2/2003 | Carlson et al. | |
| 2004/0120295 A1 | 6/2004 | Liu et al. | |
| 2004/0225895 A1 | 11/2004 | Mukherjee et al. | |
| 2005/0086494 A1* | 4/2005 | Carley | G06F 21/71 713/182 |
| 2008/0075088 A1 | 3/2008 | Carrasco | |
| 2009/0328192 A1* | 12/2009 | Yang | H04L 12/4641 726/15 |
| 2010/0217837 A1 | 8/2010 | Ansari et al. | |
| 2010/0306818 A1 | 12/2010 | Li et al. | |
| 2012/0002813 A1* | 1/2012 | Wei | H04L 63/0272 380/270 |
| 2012/0005477 A1* | 1/2012 | Wei | H04L 63/0272 713/153 |
| 2012/0005745 A1* | 1/2012 | Wei | H04L 29/12594 726/15 |
| 2012/0005746 A1* | 1/2012 | Wei | H04L 63/0272 726/15 |
| 2012/0036220 A1* | 2/2012 | Dare | G06F 8/61 709/217 |
| 2012/0036245 A1* | 2/2012 | Dare | G06F 8/60 709/223 |
| 2012/0036440 A1* | 2/2012 | Dare | G06F 9/4445 715/734 |
| 2012/0036442 A1* | 2/2012 | Dare | G06F 8/60 715/736 |
| 2012/0036552 A1* | 2/2012 | Dare | H04L 41/0253 726/1 |
| 2012/0129503 A1* | 5/2012 | Lindeman | H04W 4/001 455/414.1 |
| 2012/0254762 A1 | 10/2012 | Parmar et al. | |
| 2012/0284221 A1 | 11/2012 | Shelton et al. | |
| 2012/0289219 A1 | 11/2012 | Parmar et al. | |
| 2013/0073743 A1 | 3/2013 | Ramasamy et al. | |
| 2013/0159794 A1* | 6/2013 | Bennah | G06F 11/0793 714/57 |
| 2013/0298182 A1* | 11/2013 | May | H04L 63/0272 726/1 |
| 2013/0318345 A1* | 11/2013 | Hengeveld | H04L 12/4633 713/168 |
| 2013/0322453 A1 | 12/2013 | Allan | |
| 2014/0086253 A1 | 3/2014 | Yong | |
| 2014/0096228 A1 | 4/2014 | Weintraub et al. | |
| 2014/0310362 A1 | 10/2014 | Babu et al. | |
| 2015/0156205 A1 | 6/2015 | Yin et al. | |
| 2015/0169615 A1* | 6/2015 | Batchu | G06F 17/30557 707/624 |
| 2015/0180832 A1* | 6/2015 | Yuk | H04L 63/0272 726/15 |
| 2015/0263907 A1* | 9/2015 | Negishi | H04L 67/16 709/223 |
| 2017/0048194 A1* | 2/2017 | Helms | H04L 67/16 |
| 2017/0063782 A1 | 3/2017 | Jain et al. | |
| 2017/0063787 A1 | 3/2017 | Kwok et al. | |
| 2017/0063794 A1 | 3/2017 | Jain et al. | |
| 2017/0063797 A1 | 3/2017 | Jain et al. | |
| 2017/0063822 A1 | 3/2017 | Jain et al. | |
| 2017/0063928 A1 | 3/2017 | Jain et al. | |

OTHER PUBLICATIONS

Non-Published commonly owned International Patent Application PCT/US2016/049109, filed Aug. 26, 2016, Nicira, Inc.
International Search Report and Written Opinion of commonly owned International Patent Application PCT/US2016/049109, dated Oct. 31, 2016, Nicira, Inc.
Cheswick, William R., et al, "Firewalls and Internet Security: Repelling the Wily Hacker," Month Unknown 2003, pp. 233-242, 318-325, Second Edition, Addison-Wesley Professional, USA.

* cited by examiner

ASSOCIATING SERVICE TAGS WITH REMOTE DATA MESSAGE FLOWS BASED ON REMOTE DEVICE MANAGEMENT ATTRIBUTES

BACKGROUND

Secure remote access is a common feature of many of today's enterprise networks. Such access allows traveling employees (e.g., roaming salesmen) or telecommuting employees working from home to access the enterprise networks, e.g., through L3 Virtual Private Networks (VPNs). Secure remote access is also used to stitch together datacenters of a multi-site provider by using L2 VPN through commonly deployed network infrastructure, such as Secure Sockets Layer (SSL) and Internet Protocol Security (IPSec).

Secure remote access is typically provided by installing a VPN gateway on the perimeter of a network facing the Internet. The VPN gateway allows external devices/networks to connect into the enterprise internal network via a tunneling mechanism, such as SSL/DTLS or IKE/IPSec. The tunnel end points encrypt the outgoing traffic for forwarding and decrypt the incoming traffic and feed it into their respective networks. Routing and policy based forwarding (PBF) directs the relevant traffic from the internal network to the local tunnel end point for forwarding, where it is further processed using bridging or PBF to find the right tunnel to the remote network. After being authorized and gaining access to the private network, an external client has access to resources in the network like any other client that resides within the private network.

Today, not many policies are enforced on the traffic coming in from the external clients. There are various technologies today that do segmentation and security at the Application level on the end user devices. Several mobile device management (MDM) platforms (e.g., Air-Watch/iOS) require remote applications to either access all network resources via specified VPNs or maintain a public or private posture for the application based upon user identity.

However, existing platforms do not tie into the network side of the same granular profile-based access. In order to limit the access of the device to certain resources within the datacenter, existing platforms today use static firewall rules, which can become cumbersome to provision and manage apart from the rule bloat given the huge number of profiles that can possibly exist. This also does not take into account device mobility across regions and application access provisioning such as DNS names, i.e. how to serve or route different apps to different users/devices having the same URI.

BRIEF SUMMARY

Some embodiments provide novel methods for processing remote-device data messages in a network based on data-message attributes from a remote device management (RDM) system. For instance, the method of some embodiments performs a source network address translation (SNAT) operation that inserts a new source network address (e.g., new source Internet Protocol (IP) address and/or new source port) in a header of a received remote-device data message based on a RDM attribute set associated with the received data message. The method then forwards the data message to the message's destination within the network. As the message traverses through the network to its destination, one or more network elements of the network process the data message according to one or more policies of the network based on the inserted source network address in the message header. Examples of these operations include routing operations, firewall operations, network address translation operations, and other middlebox operations.

The method of other embodiments performs other network operations on a received remote-device data message directly based on the RDM attribute set associated with the data message. For instance, in some embodiments, the network elements process the data message according to one or more policies of the network that are resolved by analyzing the data message's RDM attribute set. One example of such network elements are firewall devices that perform firewall operations based on the received message's RDM attribute set. In some embodiments, the firewall devices enforce firewall rules that can be defined in terms of RDM attribute sets, as well as other message header values (e.g., L2-L7 header values).

In some embodiments, the network elements are other middlebox elements that enforce other middlebox service rules that can be defined by reference to RDM attribute sets associated with received remote-device data messages. For example, the network elements of some embodiments perform DNS (Domain Name System) operations for a data message flow (i.e., a set of data messages having the same packet header values) based on the RDM attribute set associated with the data message flow. In some embodiments, the network elements perform DNAT (destination network address translation) operations based on the RDM attribute sets of data messages, in order to route the data messages to their destinations. Some embodiments use the DNS or DNAT operations to ensure that remote devices that are associated with a first geographic location (e.g., one country) only access the network in the first geographic location, or a sub-network in a second geographic location (e.g., another country) that has been segregated for devices of the first geographic location. For instance, such approaches can be used to ensure that when a remote device of an employee of a European company attempts a Virtual Private Network (VPN) connection in the U.S., the remote device is only able to access servers in Europe or servers in a U.S. datacenter that have been segregated for use by European employees of the company.

In some embodiments, a set of one or more network controllers receives from a set of one or more RDM servers (1) the definition of various RDM attributes, and (2) a set of operators for interrelating these RDM attributes to each other and to their values. The RDM attribute definitions are provided as part of a dictionary that defines the RDM attributes and possible values for these attributes. The network controller set then allows an administrator to define policies and/or rules for the network elements (e.g., service rules for middlebox elements, routing rules for routers, etc.) based on the received RDM attribute definition and the associated set of operators. In some embodiments, the administrator can program the service policies and/or service rules through a user interface or a set of application programming interfaces (APIs) of the network controller set.

The network controller set distributes the RDM-based policies or rules to one or more network elements (e.g., pushes the policies/rules to the network elements, or allows the network elements to pull these policies/rules). In some embodiments, the network elements convert any RDM-based policies to RDM-based rules that they enforce. A VPN tunnel gateway is an example of a network element that can receive RDM-based policies or rules from the network controller set. Such a gateway establishes tunnels with remote devices that connect to the network through a VPN connection. In other words, a VPN gateway restricts a remote device's access to the resources (e.g., servers, etc.) of a network by requiring the remote device (1) to establish, through the gateway, a VPN tunnel connection with the network, (2) to encrypt packet payloads that the remote device sends through the VPN tunnel, and (3) to decrypt packet payloads that the remote device receives through the VPN tunnel. In some embodiments, the VPN gateway (1) encapsulates packets sent from the internal network to the remote device with a tunnel header, and (2) decapsulates tunnel headers from the packets that it receives from the remote device before forwarding the packets to network elements in the internal network.

When a remote device tries to establish a VPN tunnel connection with the network, the remote device's request is passed to the VPN tunnel gateway (e.g., by load balancers of the network). In some embodiments, the VPN tunnel gateway then passes the VPN credential set that it gets from the remote device to the RDM server set in order to authenticate the VPN request. In authenticating the remote device's credential set, the RDM server set in some embodiments provides one or more RDM attributes for the remote device, the user, and/or the application requesting the VPN connection.

The VPN gateway associates the provided RDM attribute(s) with the data messages that it subsequently receives through the VPN connection. Also, once the VPN connection is established, the remote device embeds one or more RDM attributes for the data messages that it sends in the VPN tunnel header in some embodiments. The VPN gateway associates any RDM attribute that it receives from the RDM server set or the remote device with the data messages transmitted by the remote device through its VPN connection.

Based on the associated RDM attribute set, the VPN gateway performs one or more operations on the data messages that it receives from the remote device through the tunnel. The associated RDM attribute set provides the context for processing the data-processing rules that the VPN gateway enforces in some embodiments. Examples of such operations include the RDM-attribute based SNAT and firewall operations described above.

Network micro-segmentation is an example of another processing operation that the VPN gateway of some embodiments performs based on the RDM attribute set associated with remote-device data messages received through the tunnel. Some embodiments implement multiple logical networks on a shared set of network elements (e.g., forwarding elements, middlebox elements, hosts, etc.) of the network. In some embodiments, each logical network is implemented as an overlay network that is decoupled from the underlying physical topology. An overlay network in some embodiments is created by using a logical network identifier (e.g., a virtual network identifier, VNI) and by using tunnels between managed network elements in the network.

In some embodiments, the VPN gateway's network micro-segmentation operation involves the VPN gateway associating the data messages from a remote device with a logical network based on the data message's associated RDM attribute set. For example, in some embodiments, the VPN gateway processes micro-segmentation rules, each of which can be specified in terms of a set of RDM attributes and a logical network identifier. In these embodiments, the VPN gateway can match a data message's RDM attribute set with the RDM attribute set of one of its micro-segmentation rules, and then can use the logical network identifier of the matching rule as the logical network identifier for the data message. In such a situation, the VPN gateway then inserts the logical network identifier in a tunnel header of a tunnel that the gateway uses to forward the data message to a forwarding element or middlebox element associated with the logical network.

In some embodiments, the VPN gateway passes the RDM attribute set that it associated with a remote device's data messages to one or more network elements within the network so that these elements can perform one or more operations based on the RDM attribute set. Examples of such operations include the RDM-attribute based firewall operations, DNS operations, DNAT operations, and/or other middlebox or forwarding operations. In some embodiment, the VPN gateway passes the RDM attribute set for a remote device to an internal forwarding element and/or middlebox element of the network through the tunnel header of the tunnel that connects the VPN gateway to that element. For instance, in some embodiments, the VPN gateway connects to a network element through a Geneve or VXLAN tunnel. This tunnel protocol allows the VPN gateway to insert flow-based metadata (which includes an RDM attribute set for the flow) in a tunnel header.

In some embodiments, the VPN gateway is implemented as a virtual machine that executes on a host computer along with one or more other virtual machines. In some of these embodiments, the VPN gateway's RDM-based processing operations (e.g., source network address translation, firewall operation, etc.) are performed by service modules that execute on the VPN VM's host computer, and that capture the remote-device data messages as the VPN VM decapsulates these messages and directs them to internal network elements of the network. For example, the service modules of some embodiments are filter modules that are called by the virtual network interface card (VNIC) of the VM or a port of the host's software switch that connects to this VNIC.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
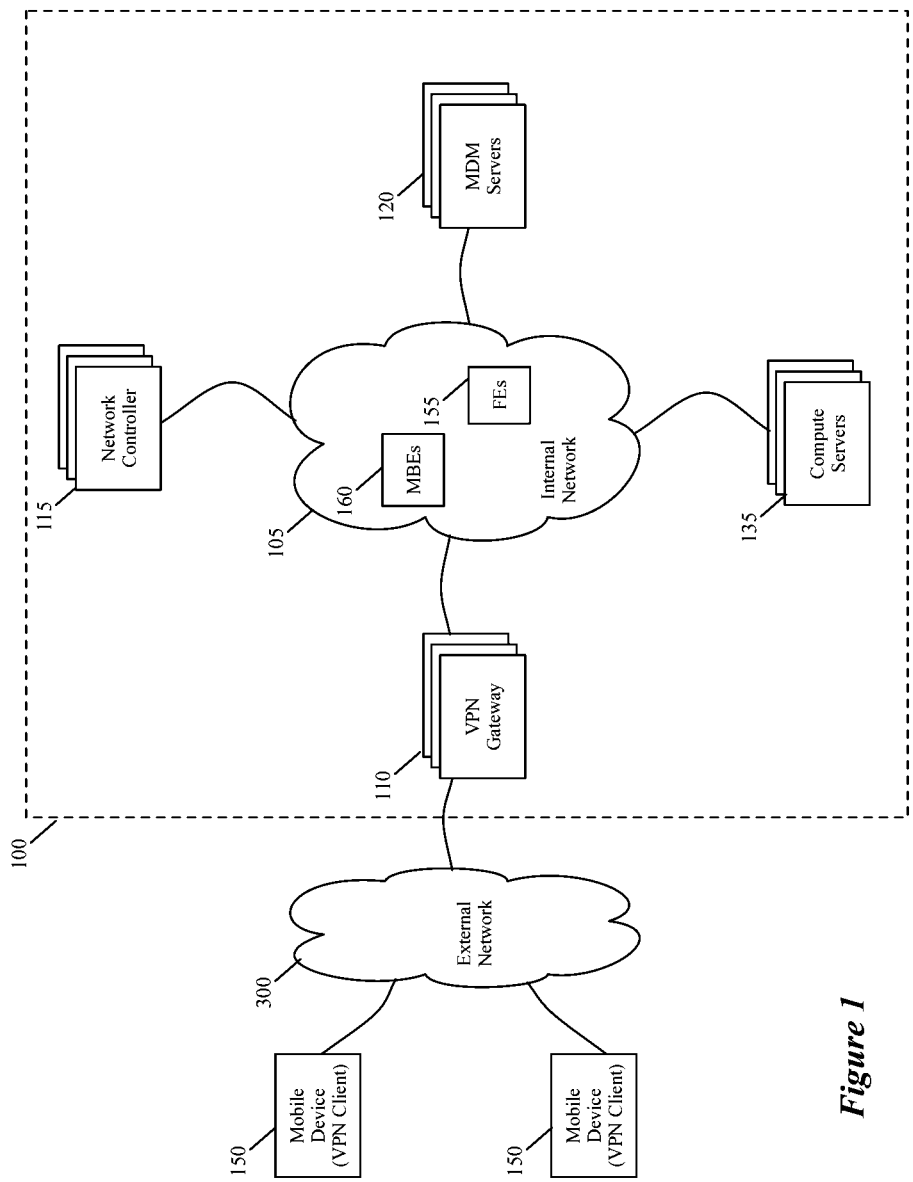
FIG. 1 illustrates an example of a datacenter that processes mobile-device data messages based on data-message attributes from an MDM system.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments process remote-device data messages in a network based on data-message attributes from a remote device management (RDM) system. Remote devices include any device that tries to access resources that are located within a private network from an external public network. Examples of such devices include servers, desktops, laptops, tablets, smartphones, etc. In some embodiments, the remote device management system is a mobile device management (MDM) system. Mobile devices include mobile computing devices, such as laptops, tablets, smartphones, virtual desktop interface (VDI), terminal servers, etc.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

Based on RDM attribute sets associated with the data messages received from remote devices (such as remote mobile devices), some embodiments perform SNAT operations that change the source network address (e.g., source Internet Protocol (IP) addresses and/or source ports) of the received remote-device data messages. One or more network elements of the network then perform one or more operations on the remote-device data messages based on changed source network addresses of the data messages. Examples of these operations include routing operations, logical segmentation operations, firewall operations, network address translation operations, and other middlebox operations.

Some embodiments perform one or more network operations on a received remote-device data message directly based on the RDM attribute set associated with the data message. For instance, in some embodiments, one or more network elements process a data message according to one or more policies of the network that are resolved by analyzing the RDM attribute set associated with the data message. One type of such network elements are firewall devices that perform firewall operations based on the received data message's associated RDM attribute set. In other words, the firewall devices of some embodiments enforce firewall rules that are defined in terms of RDM attribute sets.

In some embodiments, the network elements include forwarding elements and/or other middlebox elements that enforce other rules that are defined by reference to RDM attribute sets associated with received mobile-device data messages. For example, the network elements of some embodiments perform DNS operations or DNAT operations for a data message flow (i.e., a set of data messages having the same packet header values) based on the RDM attribute set associated with the data message flow.

FIG. 1 illustrates an example of a datacenter 100 that processes mobile-device data messages based on data-message attributes from an MDM system. This datacenter 100 has a set of VPN gateways 110 that perform one or more operations based on the MDM-attributes of data messages from mobile devices 150 that access the datacenter's resources. In addition to the VPN gateway set 110, the datacenter 100 includes a set of one or more network controllers 115, a set of one or more MDM servers 120, and several compute servers 135. These components of the datacenter are communicatively coupled through an internal network 105, which, in some embodiments, is a local area network or a wide area network. In some embodiments, the internal network 105 may connect different physical locations of the datacenter (e.g., through dedicated wired or wireless connections, or through one or more overlay networks that use the Internet). In other embodiments, the datacenter 100 is one contiguous physical location, and the internal network 105 is made up of the network elements and the wired and wireless connections between these network elements.

In some embodiments, the network elements of the internal network 105 include (1) forwarding elements 155 (such as switches, routers and bridges) that forward data messages based on the message header parameters, and (2) middlebox elements (MBEs) 160 that perform services (e.g., firewall, intrusion detection, network address translation (NAT), etc.) on the data messages based on the message header parameters. Also, in some embodiments, these elements can perform their forwarding and service operations based on MDM attributes as well. Examples of MDM attributes that can be specified for a data message flow from a mobile device include device identifier, user identifier, application identifier, application group identifier, operating system, mobile device location, mobile device compliance status, mobile device jail broken status, and Internet Protocol version.

These network elements perform their forwarding and service-process operations on data messages associated with (e.g., sent by or received for) the servers 135, MDM servers 120, network controllers 115, and VPN gateway set 110. The servers 135 perform compute and storage operations (e.g., execute applications, store files, etc.) that are accessible to one or more mobile devices 150 outside of the datacenter. In some embodiments, multiple servers 135 execute on a host computer. Examples of such servers include virtual machines and containers. In some of these embodiments, one or more network elements (e.g., forwarding elements, middlebox elements, VPN gateways) may also execute on such host computers, as further described below.

The VPN gateway set 110 establishes VPN tunnels with mobile devices 150 outside of the datacenter 100 in order to provide these devices with secure VPN connections to the resources (e.g., the servers 135) of the datacenter 100. In other words, a VPN gateway restricts a mobile device's access to the resources (e.g., servers, etc.) of a network by requiring the mobile device to first establish a secure VPN tunnel with the VPN gateway. A tunnel uses a tunnel header to encapsulate the packets from one type of protocol in the datagram of a different protocol. VPN tunnels in some embodiments use PPTP (point-to-point tunneling protocol) to encapsulate IP packets over a public network, such as the Internet. A VPN tunnel encrypts the payload of its VPN packets (of the packets with VPN tunnel headers) with one or more VPN keys. This allows packets to be exchanged between the mobile device and the VPN gateway securely.

In some embodiments, the VPN gateway (1) encapsulates and encrypts packets sent from the internal network 105 to the mobile device 150 with a VPN tunnel header, and (2) decapsulates tunnel headers from the packets that it receives from the mobile device 150, and decrypts these packets, before forwarding the packets to network elements in the internal network 105. In some embodiments, the VPN gateway 110 also includes a proxy server (e.g., SOCKS proxy server) that serves as a bridge between the network traffic inside of the datacenter 100 and the network traffic outside of the datacenter 100. Any traffic going out of the datacenter 100 appears to come from the proxy server (e.g., gets associated with the proxy server's IP address) as opposed to appearing to come from a resource inside of the datacenter 100. Although FIG. 1 shows the VPN gateways as the initial set of the datacenter components that receives the data messages from the mobile devices, one of ordinary skill will realize that in some embodiments the datacenter 100 has one or more appliances (e.g., load balancers) that initially receive and distribute the data messages entering the datacenter 100.

When a mobile device 150 tries to establish a VPN tunnel connection with the VPN gateway, the VPN tunnel gateway in some embodiments passes a VPN credential set that it gets from the mobile device 150 to the MDM server set 120 in order to authenticate the VPN request. In authenticating the mobile device's credential set, the MDM server set 120 in some embodiments provides one or more MDM attributes for the mobile device 150, the user (of the mobile device), and/or application (executing on the mobile device) requesting the VPN connection. As further described below, the VPN client or proxy client running on the mobile device also provides MDM attributes in some embodiments. For example, the client on the mobile device can provide application identifier, device identifier, location, device jailbroken status, etc.

In addition to its role in authenticating VPN requests, the MDM server set 120 in some embodiments is the server set that also provisions mobile devices for accessing the resources of a private network (e.g., the resources of the datacenter 100). Provisioning in different embodiments involves different combinations of the following operations: (1) adding the mobile device's identifier to a list of mobile devices that can have remote access, (2) adding a user identifier to identify one or more users that can have remote access through the mobile device, (3) providing VPN access software and/or settings to the mobile device so that the mobile device can set up secure VPN remote access with the datacenter, and (4) defining tenant information, like corporation identifier, user entitlements, etc.

The VPN gateway 110 associates the MDM attribute(s) provided by the MDM server set 120 with the data messages that it subsequently receives from the mobile device 150 through the established VPN connection. Also, once the VPN connection is established, the mobile device 150 embeds one or more MDM attributes for the data messages that it sends in the VPN tunnel header in some embodiments. In some embodiments, the VPN gateway 110 aggregates the MDM attributes that it receives from the MDM server set 120 and the mobile device 150 into one set of MDM attributes that it associates with the data messages transmitted by the mobile device 150 through its VPN connection.

Based on the associated MDM attribute set, the VPN gateway 110 performs one or more operations on the data messages that it receives from the mobile device through the tunnel. The associated MDM attribute set provides the context for processing the data-processing rules that the VPN gateway 110 enforces in some embodiments. In some embodiments, the rule identifiers (for identifying matching rules) of the rules are not only defined by reference to MDM attribute values but also by the flow identifier values (e.g., the L2-L4 header values, or L2-L7 header values) of the data message flows, as further described below.

One example of such data-processing rules include the MDM-attribute based SNAT rules. In some embodiments, the VPN gateway 110 performs a SNAT operation that inserts a new source network address (e.g., new source IP address and/or new source port) in a header of a received mobile-device data message based on a MDM attribute set associated with the received data message. The VPN gateway 110 then forwards the data message to the message's destination within the internal network 105. As the message traverses through the internal network 105 to its destination, one or more interior network elements (e.g., forwarding elements 155, middlebox elements 160, etc.) of the network 105 perform operations on the data message according to one or more network policies based on the inserted source network address in the data message header. Examples of such operations of the interior network elements include routing operations, logical segmentation operations, firewall operations, network address translation operations, and other middlebox operations.

The VPN gateway 110 of other embodiments performs one or more network operations on a received mobile-device data message directly based on the MDM attribute set associated with the data message. In some embodiments, these network operations are performed directly based on the MDM attribute set of the mobile-device data messages by one or more middlebox elements (e.g., middlebox engines or devices) that are associated with the VPN gateway (e.g., that execute on the same machine as the VPN gateway or are directly connected to the VPN gateway through a physical connection or an overlay connection, in order to examine all data messages that the gateway passes to the internal network 105). Such a middlebox element is referred to below as the VPN gateway's associated middlebox element (MBE). In some embodiments, the VPN gateway 110, or its associated MBE 160, processes the data message according to one or more rules that are resolved by analyzing the data message's MDM attribute set.

Firewall rules are one example of rules that are defined in terms of MDM attribute sets in some embodiments. The VPN gateway 110, or its associated MBE 160, uses a data message's MDM attribute sets to identify a firewall rule that is applicable to the data message, and then performs the action (allow, deny, redirect, redirect copy, etc.) specified by this rule on the data message.

The VPN gateway 110, or its associated MBE 160, in some embodiments performs DNS operations for a data message flow (i.e., a set of data messages having the same packet header values) based on the MDM attribute set associated with the data message flow. Also, in some embodiments, this gateway 110, or its associated MBE 160, performs DNAT operations based on the MDM attributes of data messages, in order to route the data messages to their destinations. Some embodiments use the DNS or DNAT operations to ensure that mobile devices that are associated with a first geographic location (e.g., one country) only access the network in the first geographic location, or a network in a second geographic location (e.g., another country) that has been segregated for devices of the first geographic location. For instance, such approaches can be used to ensure that when a mobile device of an employee of a European company attempts a VPN connection in the U.S., the remote device is only able to access servers in Europe or servers in a U.S. datacenter that has been segregated for use by European employees of the company.

Network micro-segmentation is an example of another processing operation that the VPN gateway 110, or its associated MBE 160, in some embodiments performs based on the MDM attributes of mobile-device data messages. Some embodiments implement multiple logical networks on a shared set of network elements (e.g., forwarding elements, middlebox elements, etc.) of the network. In some embodiments, each logical network is implemented as an overlay network that is decoupled from the underlying physical topology. An overlay network in some embodiments is created by using a logical network identifier (e.g., a virtual network identifier, VNI) and by using tunnels between managed network elements in the network.

In some embodiments, the micro-segmentation operation involves the VPN gateway, or its associated MBE, associating the mobile-device data messages with a logical network based on the data message's associated MDM attribute set. For example, in some embodiments, the VPN gateway or its associated MBE processes micro-segmentation rules, that can each be specified by reference to a set of MDM attributes and a logical network identifier. In these embodiments, the VPN gateway or its associated MBE can match a data message's MDM attribute set with the MDM attribute set of one of its micro-segmentation rules, and then can use the logical network identifier of the matching rule as the logical network identifier for the data message. In such a situation, the VPN gateway then inserts the logical network identifier in a tunnel header of a tunnel that the gateway uses to forward the data message to a forwarding element or middlebox element associated with the logical network.

In some embodiments, the VPN gateway passes the MDM attribute set that it associates with a mobile device's data messages to one or more network elements within the network so that these elements can perform one or more operations (e.g., firewall operations, DNS operations, DNAT operations, and/or other middlebox or forwarding operations) based on the MDM attribute set. In some embodiment, the VPN gateway passes the MDM attribute set for a mobile device to an internal forwarding element and/or middlebox element of the network through the tunnel header of the tunnel that connects the VPN gateway to that element. For instance, in some embodiments, the VPN gateway connects to a network element through a Geneve or VXLAN tunnel. This tunnel protocol allows the VPN gateway to insert flow-based metadata (which includes a MDM attribute set for the flow) in a tunnel header.

In some embodiments, the network controller set 115 generates the MDM-attribute based rules, and distributes these rules to the VPN gateways 110, their associated MBEs 160, and/or other network elements (e.g., forwarding elements 155). In some embodiments, the network controller set 115 receives the definition of various MDM attributes, and a set of operators for interrelating these MDM attributes to each other and to their values, from the MDM server set 120. The MDM attribute definitions are provided as part of a dictionary that defines the MDM attributes and possible values for these attributes. In some embodiments, the set of operators can include two or more of the following operators: AND, OR, equal to, greater than, less than, greater than or equal to, less than or equal to, not equal to, etc.

The network controller set 115 then allows an administrator to define policies and/or rules for the network elements (e.g., service rules for middlebox elements 160, forwarding rules for forwarding elements 155, etc.) based on the received MDM attribute definition and the associated set of operators. In some embodiments, the administrator can program the service policies and/or service rules through a user interface or a set of APIs (application programming interface) of the network controller set 115.

The network controller set 115 distributes the MDM-based policies or rules to the VPN gateways 110, their associated MBEs, and/or other network elements. In some embodiments, the network controller pushes the policies/rules to these elements. In these or other embodiments, the network controller set allows the network elements (e.g., the VPN gateways 110, their associated MBEs 160, and/or other network elements) to pull these policies/rules. In some embodiments, the VPN gateways and/or network elements convert any MDM-based policies that they receive into MDM-based rules that they enforce.

Figure 2:
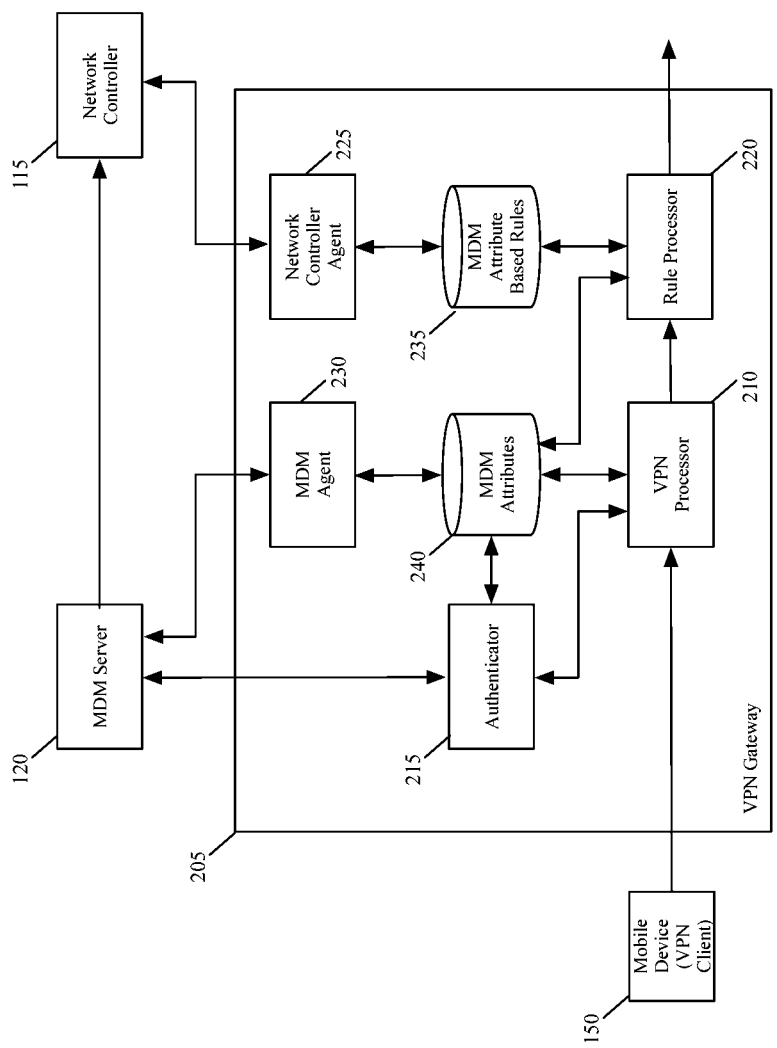
FIG. 2 illustrates a VPN gateway of some embodiments.

FIG. 2 illustrates a VPN gateway 205 of some embodiments. This VPN gateway 205 can serve as the VPN gateway 105 of the datacenter 100 of FIG. 1. As shown, the VPN gateway 205 includes a VPN processor 210, an MDM authenticator 215, a rule processor 220, a network controller agent 225, an MDM agent 230, a rule data storage 235, and an MDM attributes storage 240. The VPN processor 210 includes a VPN server (not shown) that establishes VPN tunnels with a mobile device 150 outside of the datacenter in order to encrypt and protect the data that is sent from the resources (e.g., servers) within the datacenter to the mobile device. Many such VPN servers are commonly available in the marketplace, such as VPN servers sold by Juniper Networks (Pulse Secure VPN), Cisco Systems, Inc. (Easy VPN), and Dell Inc. (Sonicwall VPN server).

In some embodiments, VPN processor 210 (1) encapsulates and encrypts packets sent from the internal network to the mobile device 150 with a VPN tunnel header, and (2) decapsulates tunnel headers from packets that it receives from the mobile device 150, and decrypts these packets, before forwarding the packets to network elements in the internal network. In some embodiments, one or more datacenter components initially receive data messages from the mobile device 150 before these messages reach the VPN processor 210.

In addition to its VPN server that performs the tunnel encapsulation/decapsulation and the encryption/decryption, the VPN processor 210 of some embodiments also includes a proxy server (e.g., a SOCKS proxy server) that serves as a bridge between the external network that the VPN server faces and the internal network of the datacenter.

In some embodiments, the VPN datapath from the mobile device can be expressed as the following sequence (1) the mobile application, (2) SOCKS Proxy client, (3) VPN client, (4) VPN server, (5) SOCKS Proxy server, and (6) destination network element in the datacenter. The reverse sequence represents the reverse datapath from the network element to the mobile device. When MDM-attribute based services are performed on the mobile device data messages, the datapath for the mobile device includes one or more MDM-attribute based services between the socket server and the destination network element.

When a mobile device 150 tries to establish a VPN tunnel connection with VPN processor 210, the VPN processor 210 passes the VPN credential set that it gets from the mobile device 150 to the authenticator 215. The authenticator 215 then relays the credential set to the MDM server set 120 in order to authenticate the VPN request. Once the VPN request is authenticated, the authenticator 215 informs the VPN processor 210 that it can establish the VPN tunnel for the mobile device 150.

In authenticating the mobile-device's credential set, the MDM server set 120 in some embodiments provides to the authenticator 215 one or more MDM attributes for the mobile device, the user (of the mobile device), and/or the mobile-device application (executing on the mobile device) requesting the VPN connection. Examples of such data includes device status (e.g., OS type), device location, conformance state, etc.

The authenticator 215 stores these attributes in the MDM attribute storage 240. Instead of receiving MDM attributes from the MDM server 120 through inband communications with the authenticator 215, the VPN gateway 205 in some embodiments gets the MDM attributes from the MDM server 120 out-of-band through its MDM agent 230. In some of these embodiments, the MDM server 120 provides the MDM attribute set associated with a requested VPN tunnel (e.g., associated with the mobile device, user, and/or mobile-device application requesting the VPN tunnel) to the MDM agent 230 once it receives the VPN credential set to authenticate from the authenticator 215. The MDM agent 230 stores any MDM attributes that it receives from MDM server 120 in the MDM attribute storage 240.

In some embodiments, this MDM attribute storage 240 stores each VPN tunnel's associated MDM attribute set in a record that identifies the VPN tunnel (e.g., in a record that stores an identifier for the VPN tunnel) and its associated MDM attribute set. Instead of identifying the VPN tunnel, or in addition to identifying the VPN tunnel (e.g., in addition to storing the VPN tunnel identifier), this record identifies the data message identifier(s) (e.g., the five tuple identifiers, which, in some embodiments, are the source IP, destination IP, source port, destination port, and protocol) for the data messages that are received through the tunnel and hence should be associated with this record's MDM attribute set.

Once the VPN connection is established, the mobile device 150 in some embodiments embeds one or more MDM attributes in the VPN tunnel header for the data messages that it sends. The VPN processor 210 in these embodiments extracts the embedded MDM attribute set, and stores this set in the MDM attribute storage 240 (e.g., in the record that was created, in the storage 240, for the MDM attribute set received from the MDM server 120). This data is stored in some embodiments for the established VPN tunnel, e.g., based on the VPN tunnel's identifier. The aggregated MDM attributes for the established VPN tunnel provide the MDM context for processing the data messages that are received through this tunnel from the mobile device 150.

Based on this context, the rule processor 220 can perform one or more operations on the data messages that it receives from the mobile device 150 through the established VPN tunnel and the VPN processor 210. Specifically, the VPN processor 210 decapsulates the VPN data message payload (i.e., removes the VPN tunnel header from the received VPN data message) that it receives from the mobile device 150 through the established VPN tunnel. The VPN processor 210 also decrypts the decapsulated VPN data message payload. The decapsulated, decrypted VPN data message payload is the data message sent by the mobile device 150 before it was encrypted and encapsulated with the tunnel header.

The VPN processor 210 passes the data message from the mobile device 150 to the rule processor 220. From the MDM attribute data storage 240, the rule processor 220 in some embodiments retrieves the MDM attribute set associated with the data message. In some embodiments, each record in the data storage 240 specifies (1) an MDM attribute set and (2) a record identifier that is defined in terms of data message header values, VPN tunnel identifiers, or both.

Hence, in some embodiments, the rule processor 220 identifies the MDM attribute set for a data message by using the data message's header values (e.g., by identifying a record in the data storage 240 that has a rule identifier that matches the message's five tuple identifier). In other embodiments, the rule processor 220 identifies a message's MDM attribute set by using the identity of the VPN tunnel (e.g., by identifying the record in the data storage 240 that has the VPN tunnel identifier). In these embodiments, the VPN processor 210 needs to inform the rule processor 220 of the VPN tunnel identity for a data message that it provides to the rule processor 220. In yet other embodiments, the rule processor 220 identifies the MDM attribute set for a data message by using both the header values of the data message and the tunnel identifier (tunnel ID).

The rule processor 220 then uses the identified MDM attribute set to identify one or more service rules in the rule storage 235 to enforce. This storage 235 stores service rules based on MDM attribute sets. For instance, in some embodiments, each rule (1) specifies an action, and (2) has a set of MDM attribute values, which the rule processor 220 can try to match with the MDM attribute set of a received data message. When a rule's MDM attribute value set is matched to the MDM attribute set of the received data message, the rule processor 220 performs the action specified by the rule. When the action does not involve dropping the data message or re-routing the data message to another resource outside of the datacenter, the rule processor 220 forwards the data message to the data message's destination in the internal network, after the rule processor 220 performs its action on the data message. In some embodiments, the rule processor 220 forwards the data message to its destination through a set network elements (e.g., switches and routers) in the internal network.

Instead of having one rule processor 220 that uses one rule storage 235 that stores the rules for one or more service actions, the VPN gateway 205 in some embodiments uses multiple rule processors and multiple rule storages for multiple different types of service actions. In other embodiments, the VPN gateway 205 uses one rule processor 220 that uses multiple rule storages that store multiple different types of service rules.

Figure 3:
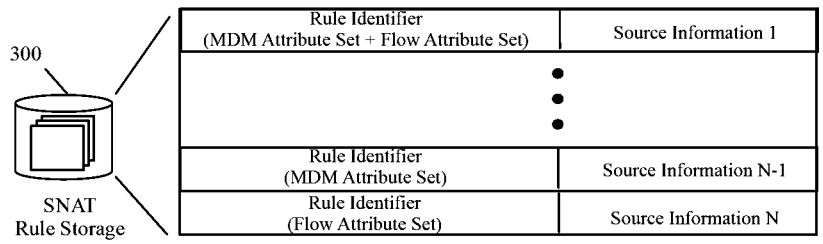
FIGS. 3-7 illustrate examples of different service rule storages for different service actions.
Figure 4:
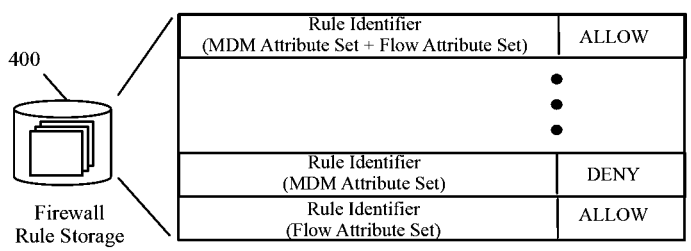
Figure 5:
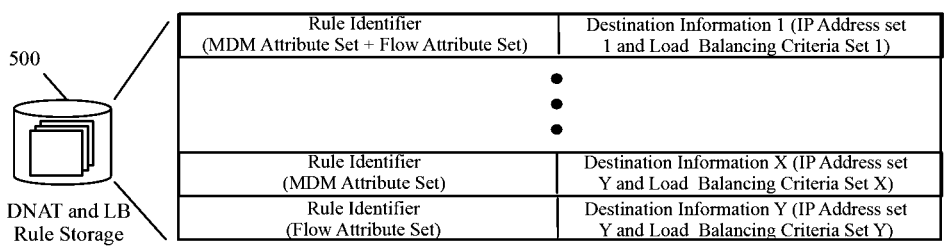
Figure 6:
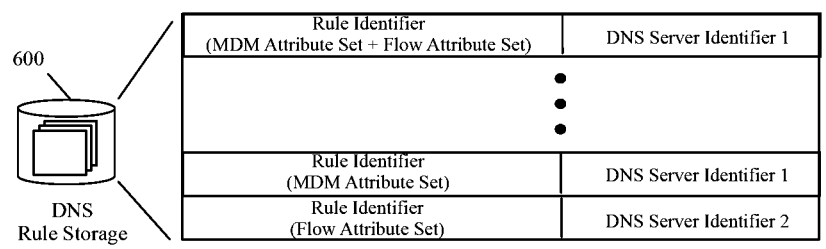
Figure 7:
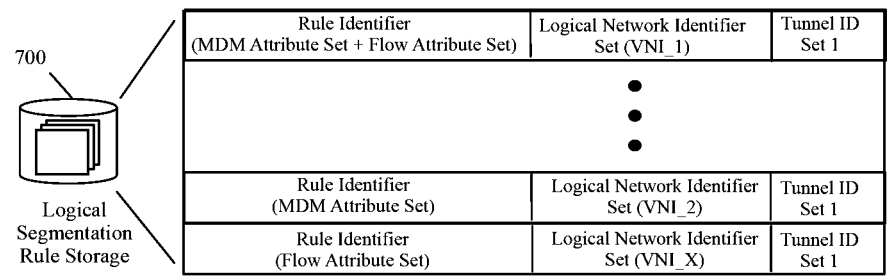

FIGS. 3-7 illustrate examples of different service rule storages for different service actions. Specifically, FIG. 3 illustrates an SNAT rule storage 300, FIG. 4 illustrates a firewall rule storage 400, FIG. 5 illustrates a DNAT rule storage 500, FIG. 6 illustrates an DNS rule storage 600, and FIG. 7 illustrates a logical segmentation rule storage 700. As shown, each of the rules in these rules storages includes a rule identifier that can be defined in some embodiments based on an MDM attribute set and/or a flow attribute set (e.g., L2-L4 packet header values). For a data message with a particular MDM attribute set, the rule processor can try to identify a rule in any of these rule storages 300-700 by comparing the data message's MDM attribute set and/or header values with the rule identifiers of the rules. In some embodiments, the rules in each of the rule storages 300-700 have explicit or implicit priority values (e.g., as specified by an expressed priority value, or as specified by their order in the rule storage). When multiple rules in a rule storage have rule identifiers that match a data message's MDM attribute set and/or header values, the rule processor selects the highest priority rule in the rule storage.

In the SNAT rule storage 300, the SNAT rules store source information (e.g., source IP address and/or source port) for replacing the data message's source information during the SNAT operation. The firewall rules in the firewall rule storage 400 specify firewall actions (allow, deny, redirect, redirect copy, DNAT, etc.) for data messages that have MDM attributes and/or flow attributes that match the firewall rule identifiers.

The DNAT rules in the DNAT rule storage 500 store one or more candidate destination tuples (e.g., multiple sets of destination IP addresses and/or destination ports) for replacing the data message's destination tuple (e.g., the received data message's destination IP and/or destination port) during a DNAT operation. In the example illustrated in FIG. 5, each DNAT rule can also include a set of load balancing criteria that direct the rule processor to select one of the candidate destination tuples in a load balanced manner. The DNS rules in the DNS rule storage 600 of FIG. 6 store a DNS server identifier (that identifies a DNS server) for data messages that have MDM attributes and flow attributes that match the rule identifier of a DNS rule.

Each segmentation rule in the logical segmentation rule storage 700 of FIG. 7 stores a logical network identifier (LNI) that associates a received mobile-device data message with a particular logical network that is implemented by the common shared network and compute resources of the datacenter. In some embodiments, the LNI includes a virtual network identifier (VNI). A VNI in some embodiments identifies a logical switch. In some embodiments, the LNI conjunctively or alternatively specifies other virtual identifiers, such as a virtual distributed router identifier that identifies a logical router. In some embodiments, the VPN gateway connects to the network elements that implement a logical network through a tunnel. In some of these embodiments, a segmentation rule can also specify a set of one or more tunnels to one or more network elements that the rule processor can use to route the data message after encapsulating the message with a tunnel header and inserting the LNI in the tunnel header.

As described above, service rules in the rule data storage 235 are specified by an administrator through a network controller 115. The MDM-based rules are defined by reference to an MDM dictionary and an operator set that the network controller 115 gets from the MDM server 120, as shown in FIG. 2. The network controller 115 stores these rules in the rule data storage 235 through the network controller agent 225 of the VPN gateway 205. This agent 225 communicates with the network controller 115 through a control channel in some embodiments.

A service rule in the rule storage 235 can specify any number of actions. Examples of actions include the above-described SNAT operation, in which the mobile-device data message's source information (e.g., source IP and/or source port) are replaced with new source information that affects forwarding and service operations by network forwarding elements and middlebox elements downstream in the internal network 105. Other example operations include the above-described firewall, DNAT, DNS, and network-segmentation operations. These operations are further described below.

In some embodiments, the VPN processor 210 and authenticator 215 are implemented by a VPN tunnel processing VM that executes on a host computer. As further described below by reference to FIG. 11, this VPN tunnel processing VM executes on its host with other guest VMs (GVMs), service VMs (SVMs), managed software forwarding elements (SFE) and/or hypervisor-based middlebox service modules. In some of these embodiments, the rule processor 220 is a filter module that executes on the same host computer (e.g., is a hypervisor-provided filter module) and that is called by the VNIC (virtual network interface card) of the VPN tunnel processing VM or a port of the host's software switch that connects to this VNIC. This filter module in some embodiments captures the mobile device data messages as the VPN VM decapsulates these messages and directs them to network elements of the internal network. This architecture will be further described below by reference to FIG. 12.

Figure 8:
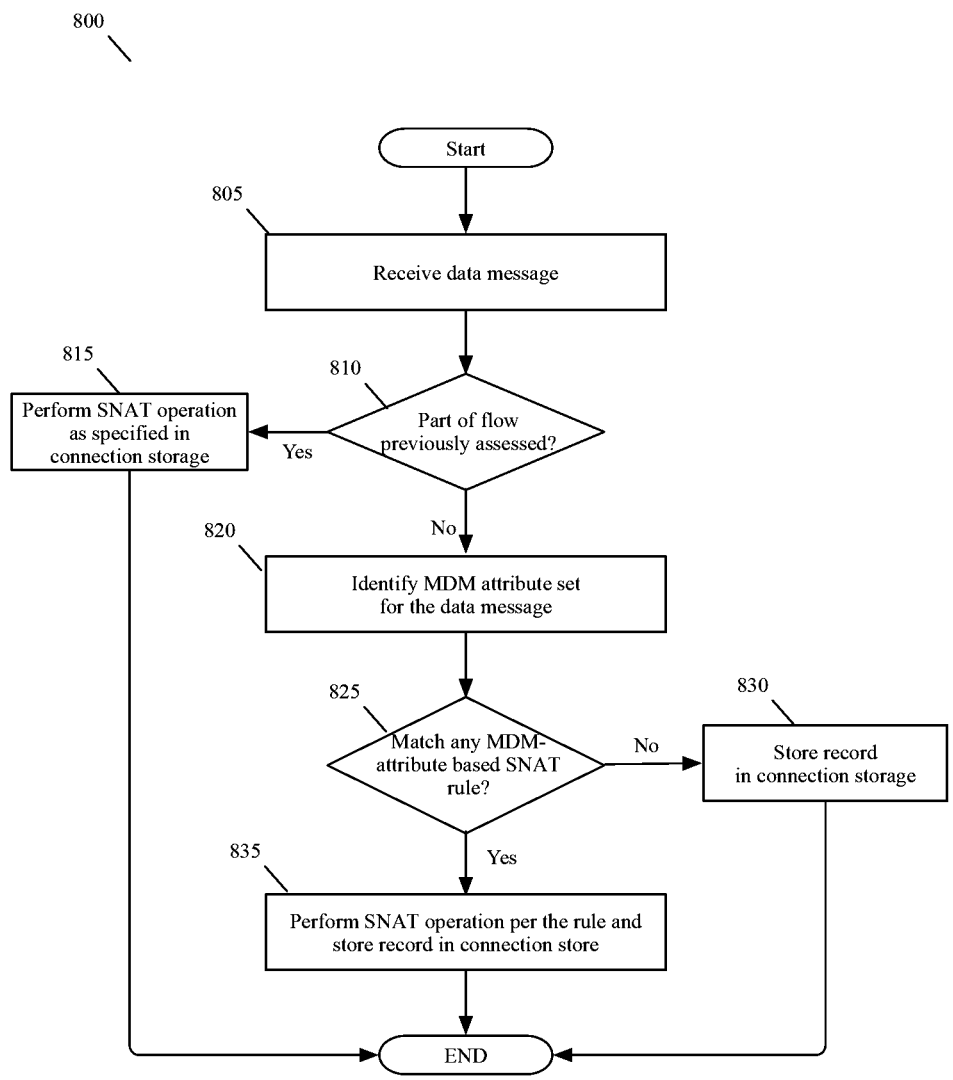
FIG. 8 illustrates a SNAT process that a rule processor of some embodiments performs.

FIG. 8 illustrates a SNAT process 800 that the rule processor 220 performs in some embodiments. This process examines mobile device data messages that the VPN processor 210 passes to the internal network 105. As mentioned above, the rule processor 220 is a filter module of a VPN tunnel processing VM in some embodiments, and it captures these data messages on the egress path from the VM (e.g., from the VPN VM's VNIC or its associated SFE port).

As shown, the process 800 starts when the rule processor 220 receives (at 805) a data message that the VPN processor passes to the internal network 105. The process 800 then determines (at 810) whether the data message is part of a data message flow that it has previously processed. In some embodiments, the rule processor 220 maintains a connection storage that contains a record for each data message flow that the rule processor 220 processes.

In some embodiments, each flow's record in the connection storage specifies (1) a Boolean value that indicates whether an SNAT operation has to be performed for data messages associated with the flow, and (2) if so, the source information (e.g., the new source IP address and/or source port) that should be used to replace the data message's existing source information (e.g., the existing source IP address and/or source port). Each flow's record also specifies a flow identifier (e.g., the flow's five tuple identifier). In some embodiments, the process 800 determines whether the connection storage contains a record for the received data message's flow by comparing the data message's flow identifier (e.g., five tuple identifier) with the flow identifiers of the records stored in this storage, in order to identify a record with a flow identifier that matches the data message's flow identifier.

When the process 800 determines (at 810) that the connection storage stores a record with a flow identifier that matches the received data message's flow identifier, the process determines (at 815) whether the matching record specifies an SNAT operation, and if so, performs the SNAT operation based on the source information contained in the matching record (i.e., replaces the data message's source information with the source information specified by the matching record). When the matching record specifies that no SNAT operation has to be performed, the process 800 allows (at 815) the data message to pass unchanged. After 815, the process ends.

When the process 800 determines (at 810) that it has not previously processed a data message that is part of the same flow as the received data message, the process 800 examines (at 820) the MDM attribute storage 240 to identify the MDM attribute set associated with the received data message. In some embodiments, the MDM attribute storage 240 stores each data message flow's MDM attribute set based on the flow's identifier (e.g., the five tuple identifier). Hence, in these embodiments, the process 800 identifies (at 820) the message's associated MDM attribute set by using the message's flow identifier to find a record in the MDM attribute storage 240 with a matching flow identifier. As described above, other embodiments identify a message's associated MDM attribute set by using the identifier of the tunnel through which the mobile device sent the message.

Next, at 825, the process 800 determines whether the MDM-attribute based rule storage 235 contains a record that specifies an SNAT operation for the received data message's MDM attribute set. In some embodiments, the process 800 makes this determination by comparing the data message's MDM attribute set (identified at 820) with the MDM attribute sets of the records stored in the rule storage 235, in order to determine whether this storage contains a record with a MDM attribute set that matches the data message's MDM attribute set. As mentioned above, the rule identifiers of the rules in the rule storage 235 can also be defined in terms of message flow header values. In some embodiments, each record in the MDM attribute storage specifies an SNAT operation and source information for replacing the data message's source information during the SNAT operation. In some embodiments, each record implicitly specifies an SNAT operation by virtue of storing non-default source information for the SNAT operation.

When the process 800 determines (at 825) that the rule storage 235 stores a record with an MDM attribute set and/or header values that match the received data message's MDM attribute set and/or header values, the process performs (at 835) the SNAT operation of this matching rule. This SNAT operation entails replacing the data message's source information (e.g., source IP address and/or source port) with the source information specified in the matching rule. At 835, the process 800 also creates a record in the connection storage that specifies an SNAT operation has to be performed for the data message's flow, and stores the source information (identified from the rule storage 235 at 825) that needs to be used to replace the source information of subsequently received data messages that are part of the same flow. After 835, the process ends.

When the process determines (at 825) that the rule storage 235 does not store a record with an MDM attribute set that matches the received data message's MDM attribute set, the process determines (at 825) that no SNAT operation has to be performed for the received data message or other data messages that are part of the same flow. Accordingly, at 830, the process 800 creates a record in the connection storage that specifies no SNAT operation has to be performed for the data message's flow, so that this record can be used to quickly process subsequently received data messages that are part of the same flow. After 830, the process ends.

In some embodiments, the rule storage 235 has a catch-all rule that matches the data message flows that do not match any other rule in the rule storage. In these embodiments, the catch-all rule specifies that no SNAT operation has to be performed for a data message flow that only matches this rule. Accordingly, in these embodiments, the process always identifies (at 825) one matching rule in the rule storage 235 and performs the SNAT operation (which includes no SNAT operation) specified by this rule.

After the process 800 analyzes the data message (e.g., leaves the data message source information unchanged, or performs an SNAT operation that replaces a data message's original source information with new source information based on the data message's MDM attribute set), the rule processor 220 forwards the data message, or allows the data message to be forwarded, to the message's destination within the internal network. As the message traverses through the network to its destination, one or more network elements (e.g., one or more forwarding elements or middlebox elements) process the data message according to one or more policies of the network that are defined based on the inserted source network address in the message header. Examples of these operations include routing operations, firewall operations, network address translation operations, and other middlebox operations.

Figure 9:
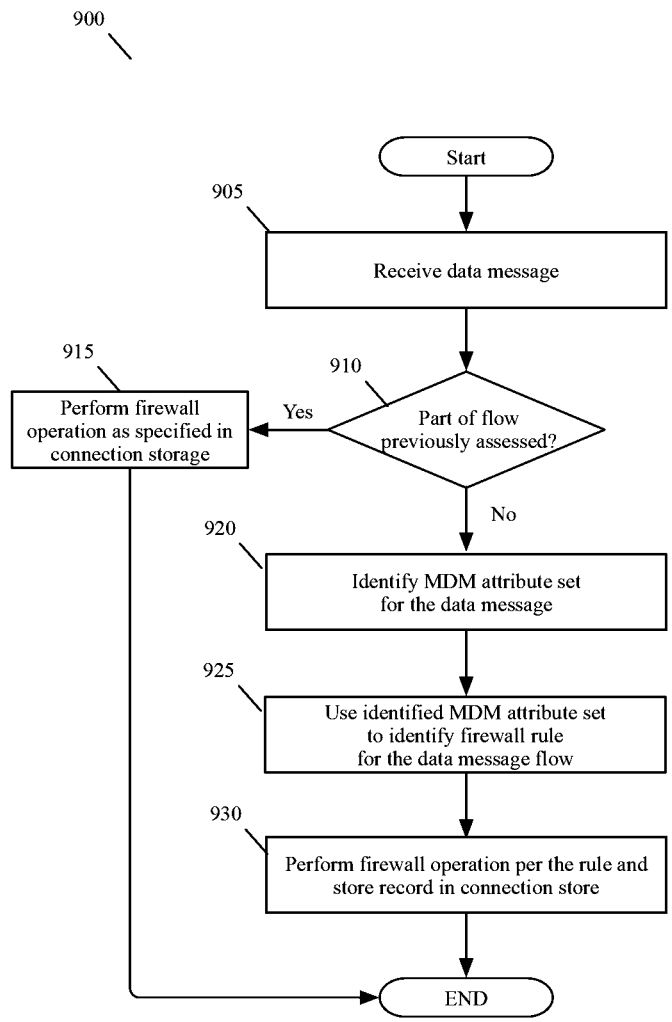
FIG. 9 illustrates a firewall process that the rule processor performs in some embodiments.

FIG. 9 illustrates a firewall process 900 that the rule processor 220 performs in some embodiments. This process examines mobile device data messages that the VPN processor 210 passes to the internal network 105. As mentioned above, the rule processor 220 is a filter module of a VPN tunnel processing VM in some embodiments, and it captures these data messages on the egress path from the VM (e.g., from the VPN VM's VNIC or its associated SFE port).

As shown, the process 900 starts when the rule processor 220 receives (at 905) a data message that the VPN processor passes to the internal network 105. The process 900 then determines (at 910) whether the data message is part of a data message flow that it has previously processed. In some embodiments, the rule processor 220 maintains a connection storage that contains a record for each data message flow that the rule processor 220 processes.

In some embodiments, each flow's record in the connection storage specifies (1) a Boolean value that indicates whether a firewall operation has to be performed for data message's associated with the flow, and (2) if so, the firewall action (e.g., Allow or Deny) that should be performed. Each flow's record also specifies one or more flow identifiers (e.g., the flow's five tuple identifier). In some embodiments, the process 900 determines whether the connection storage contains a record for the received data message's flow by comparing the data message's flow identifiers (e.g., five tuple identifier) with the flow identifiers of the records stored in this storage, in order to find a record with a flow identifier that matches the data message's flow identifier.

When the process 900 determines (at 910) that the connection storage stores a record with a flow identifier that matches the received data message's flow identifier, the process 900 then performs (at 915) the firewall action that is specified in this record. After 915, the process ends. When the process 900 determines (at 910) that it has not previously processed a data message that is part of the same flow as the received data message (i.e., when it cannot identify a record with a matching flow identifier), the process 900 examines (at 920) the MDM attribute storage 240 to identify the MDM attribute set associated with the received data message. In some embodiments, the MDM attribute storage 240 stores each data message flow's MDM attribute set based on the flow's identifier (e.g., the five tuple identifier). Hence, in these embodiments, the process 900 identifies the message's associated MDM attribute set by using the message's flow identifier to find a record in the MDM attribute storage 240 with a matching flow identifier. In some embodiments, the process 900 conjunctively or alternatively uses the identifier of the tunnel through which the data message was received to find a record in the MDM attribute storage 240.

Next, at 925, the process 900 uses the identified MDM attribute set and/or the flow identifier (e.g., the L2-L4 values) of the data message to identify a firewall rule in the rule storage 235. In some embodiments, the rule storage 235 has a catch-all rule that matches the data message flows that do not match any other rule in the rule storage. The process 900 then performs (at 930) the firewall action (Allow or Deny) of the rule identified at 925. At 930, the process also creates a record for the data message's flow in the connection storage. After 930, the process ends.

Figure 10:
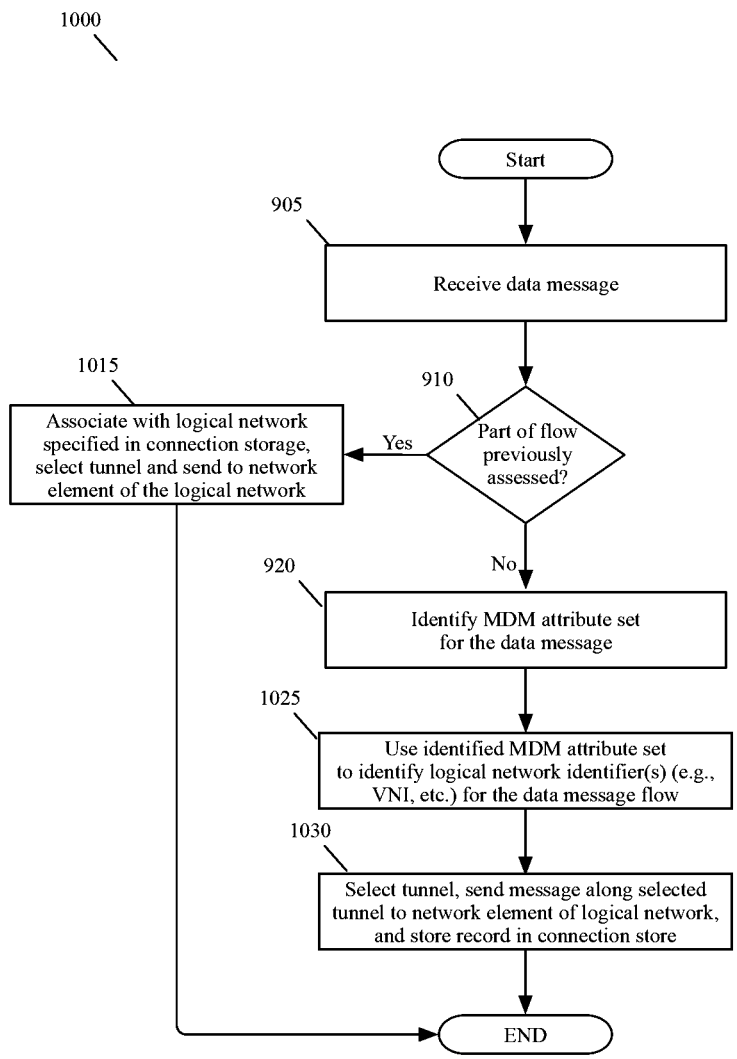
FIG. 10 illustrates a micro-segmentation process of the rule processor in some embodiments.

FIG. 10 illustrates a micro-segmentation process 1000 of the rule processor 220 in some embodiments. This process assigns a received, mobile-device data message to a logical network implemented by the shared network elements of the internal network 105. The process 1000 is similar to the process 900 except in the actions that it performs at 1015, 1025, and 1030.

At 1015, when the process 1000 determines (at 910) that the received data message is part of a previously assessed flow, the micro-segmentation process 1000 associates the data message with a logical network identifier that it identifies from a previously created record in its connection storage. In some embodiments, the connection-storage record also identifies the tunnel to use for sending the data message along with the LNI in the tunnel header. At 1015, the process also selects a tunnel to a network element that is associated with the logical network (that is identified by the associated LNI), encapsulates the message with the tunnel's header, inserts the LNI in the tunnel header and forwards the data message to the network element along the tunnel.

At 1025, after the process identifies an MDM attribute set for a data message that is not part of a previously assessed flow, the segmentation process 1000 identifies a logical network identifier (e.g., a VNI and/or a virtual distributed router, VDRI) for the data message in the rule storage 700 by using the MDM attribute set that the process identifies for the data message at 920. As mentioned above, the identification of the record that specifies this LNI can also be based on the received data message's header values in some embodiments. Also, as mentioned above, a record in the rule storage 700 also specifies a set of one or more tunnels that can be used for the logical overlay network associated with the LNI specified by the record.

At 1030, the process 1000 then selects a tunnel identified by the record identified at 1025. This tunnel is to a network element that is associated with the logical network associated with the logical network identifier. At 1030, the process 1000 encapsulates the message with the tunnel's header, inserts the LNI identified at 1025 in the tunnel header, and forwards the data message to the network element. At 1030, the process also creates a record for the data message's flow in the connection storage, and stores the LNI and tunnel identifier in this record along with the flow's identifier.

Figure 11:
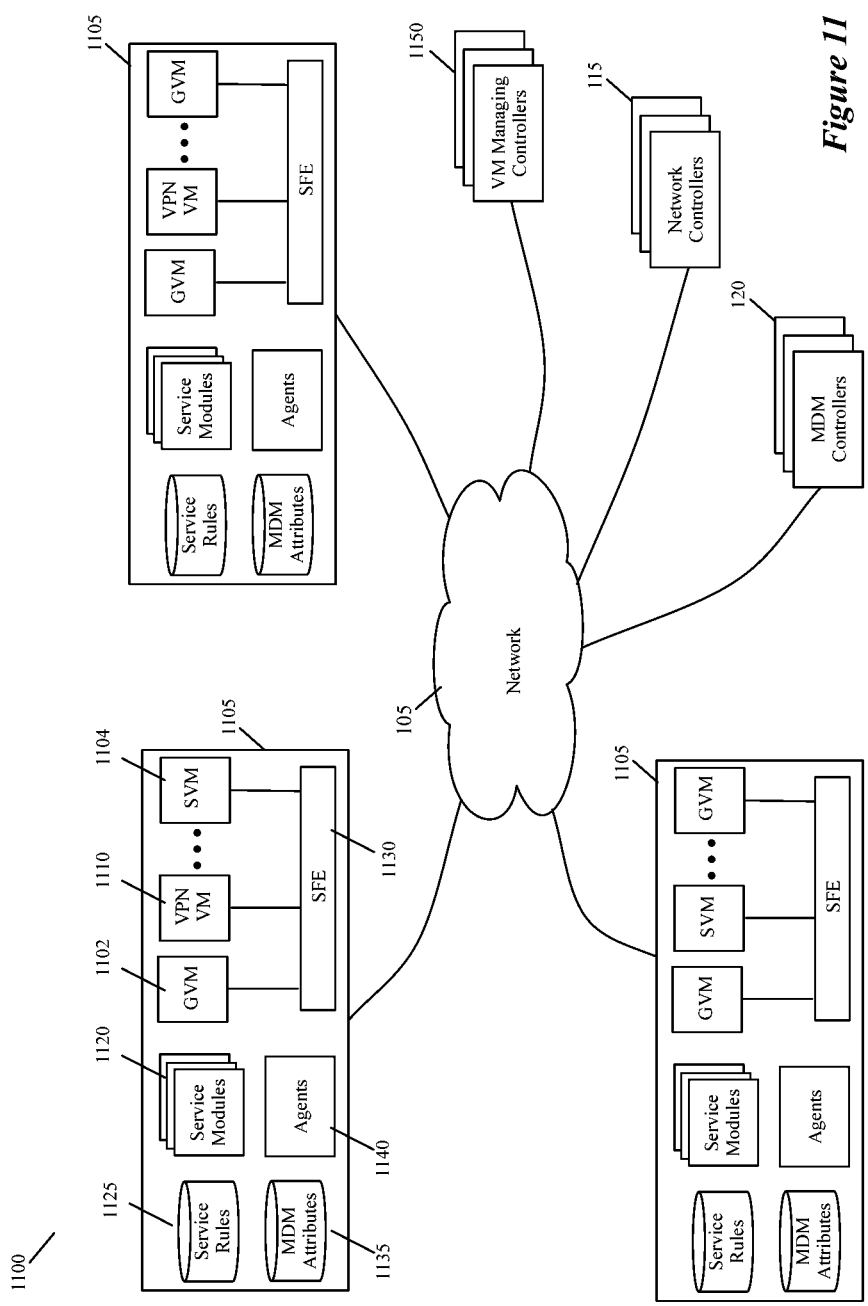
FIG. 11 illustrates a datacenter that has multiple such VPN VMs and service modules executing on multiple hosts.

As mentioned above, the VPN gateway 205 in some embodiments is implemented with (1) a VPN VM that executes on a host computer along with one or more other VMs, and (2) the VPN VM's associated service module. FIG. 11 illustrates a datacenter 1100 that has multiple such VPN VMs 1110 and service modules 1120 executing on multiple hosts 1105. In this datacenter, a VPN VM does not have to execute on each host, but multiple hosts in the datacenter 1100 have a VPN VM executing on them.

Each VPN VM 1110 pairs with one or more service modules 1120 to implement a VPN gateway, like the VPN gateway 205. In this implementation, the service module that pairs with the VPN VM acts as the rule processor 220. This implementation allows multiple VPN gateways to be established on multiple host computers, and thereby allows a distributed VPN gateway architecture to be established. In this distributed architecture, multiple VPN gateways can work on multiple host computers to share the VPN traffic load in the datacenter 1100. Also, in this distributed architecture, the VPN gateways do not need to be placed at the ingress physical edge of the datacenter, as these VPN gateways can distributed among the shared host computers in the datacenter on which other VMs execute.

As shown in FIG. 11, each host computer 1105 can execute (1) one or more guest VMs (GVMs) 1102 that perform compute operations (e.g., webserver, application server, database server operations) for one or more tenants of the datacenter 1100, and/or (2) one or more service VMs 1104 (SVMs) that perform service operations (e.g., firewall operations, load balancer operations, etc.) for the data messages sent by or to the GVMs 1102. In some embodiments, the datacenter 1100 is a private datacenter of an enterprise and all its tenants belong to one entity (e.g., one corporation). In other embodiments, the datacenter is a public datacenter used by many different unrelated tenants.

Each host computer 1105 also executes one or more software forwarding elements 1130, such as a software switch or a software router. The software forwarding elements (SFEs) connect the VMs on their host computer 1105 and connect these VMs to other devices (e.g., other VMs) outside of the host. Each host also executes one or more service modules 1120 that perform one or more service actions, such as encryption operations, logical segmentation operations, firewall operations, load balancing operations, and/or other middlebox service operations.

In some embodiments, one or more service modules 1120 serve as the MDM rule processors 220 for an associated VPN VM 1110. Such a rule-processing service module performs the VPN gateway's MDM-based processing operations (e.g., source network address translation, firewall operation, etc.). Such a service module 1120 captures the mobile device data messages as its associated VPN VM decapsulates these messages and directs them to internal network elements of the network (e.g., directs them to destination nodes identified by the destination tuples in the data messages, or redirects them to other destination nodes). As further described below by reference to FIG. 12, the service modules 1120 of some embodiments are filter modules that are called by the virtual network interface card (VNIC) of the VM or a port of the host's SFE that connects to this VNIC.

The service modules 1120 perform their service operations based on the service rules that are stored in the service rule storage 1125. In some embodiments, a number of these service rules include rule identifiers that are defined in terms of MDM attribute sets. A service module in some embodiments retrieves the MDM attribute set for a data message flow from a MDM attribute data storage 1135 on its host, and then uses the retrieved MDM attribute set to identify a service rule in the service rule storage 1125 to process.

As shown in FIG. 11, one or more agents 1140 execute on each host computer 1105 to interact with various controllers (i.e., various managing servers). These controllers include network controllers 115 and MDM controllers 120, which were described by reference to FIGS. 1 and 2. These controllers also include VM managing controllers 1150 that provision and deploy GVMs and/or SVMs on the hosts. The agents 1140 interact with these controllers 115, 120, and 1150 to provision and configure GVMs, SVMs and service modules. These agents 1140 also interact with the network and MDM controllers 115 and 120 to receive service rules and MDM attribute sets. As shown, the datacenter's network 105 communicatively connects all the hosts and controllers.

Figure 12:
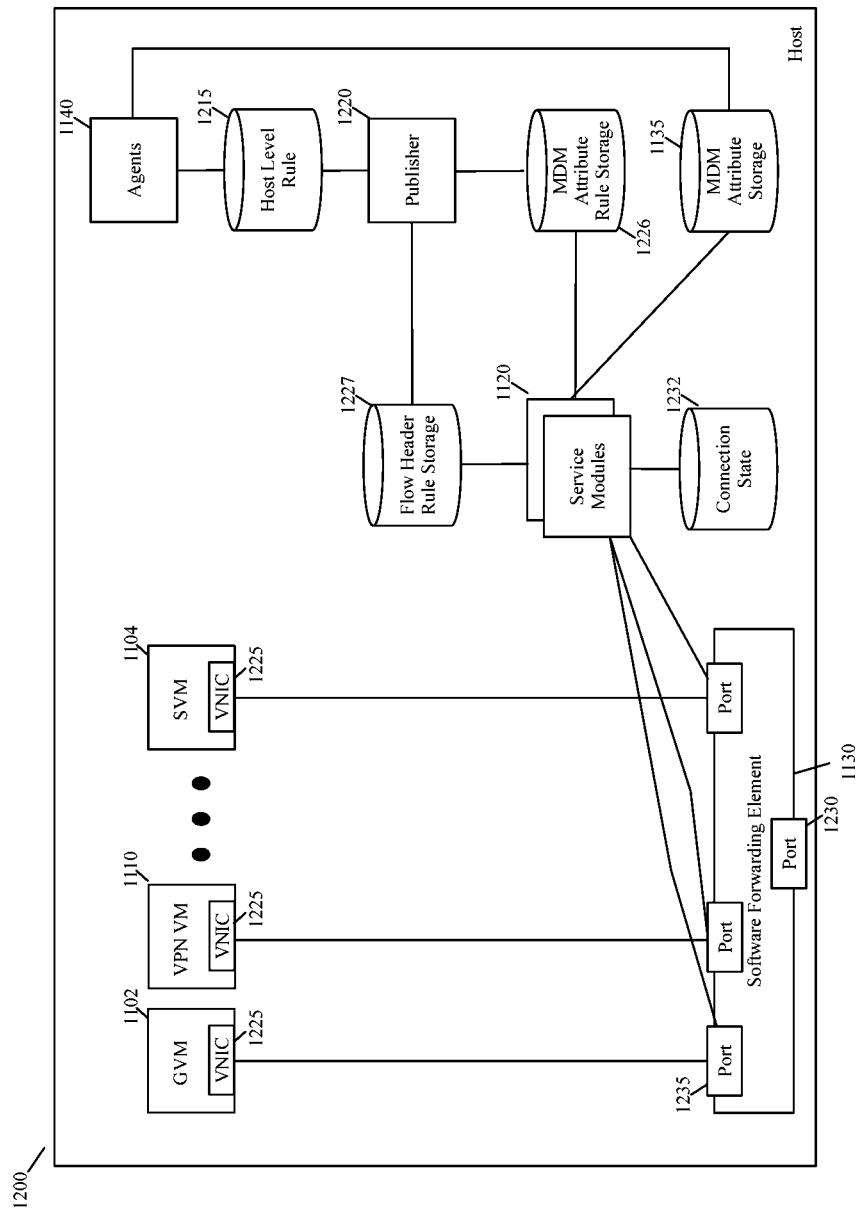
FIG. 12 illustrates in more detail the software architecture of a host computer of some embodiments.

FIG. 12 illustrates in more detail the software architecture of a host computer 1200 of some embodiments. This more detailed view illustrates the insertion of the service modules as filter modules that pair up with VMs executing on the host to capture data messages to and/or from the VMs. One or more of these service modules serve as rule processor(s) 220 of the VPN VM 1110, as further described below.

Like host 1105 of FIG. 11, the host computer 1200 includes (1) one or more GVMs 1102, (2) one or more SVMs 1104, (3) a VPN VM 1110, (4) an SFE 1130, (5) one or more service modules 1120, (6) agents 1140, and (7) an MDM attribute storage 1135. As shown, host 1200 also includes a host level rule storage 1215, a rule publisher 1220, a connection state storage 1232, an MDM attribute rule storage 1226, and a flow header rule storage 1227. The rule storages 1226 and 1227 together serve as the service rule storage 1125 of FIG. 11.

The SFE 1130 executes on the host 1200 to communicatively couple the VMs of the host to each other and to other devices outside of the host (e.g., other VMs on other hosts) through the host's physical NIC (PNIC) and one or more forwarding elements (e.g., switches and/or routers) that operate outside of the host. As shown, the SFE 1130 includes a port 1230 to connect to a PNIC (not shown) of the host. For each VM, the SFE 1130 also includes a port 1235 to connect to a VNIC 1225 of the VM. In some embodiments, the VNICs are software abstractions of the PNIC that are implemented by the virtualization software (e.g., by a hypervisor). Each VNIC 1225 is responsible for exchanging packets between its VM and the SFE 1130 through its corresponding SFE port 1235. As shown, a VM's egress datapath for its data messages includes (1) the VM's VNIC 1225, (2) the SFE port 1235 that connects to this VNIC, (3) the SFE 1130, and (4) the SFE port 1230 that connects to the host's PNIC. The VM's ingress datapath is the same except in the reverse order (i.e., first the port 1230, then the SFE 1130, then the port 1235, and finally the VNIC 1225).

In some embodiments, the SFE 1130 is a software switch, while in other embodiments it is a software router or a combined software switch/router. The SFE 1130 in some embodiments implements one or more logical forwarding elements (e.g., logical switches or logical routers) with SFEs executing on other hosts in a multi-host environment. A logical forwarding element in some embodiments can span multiple hosts to connect VMs that execute on different hosts but belong to one logical network. In other words, different logical forwarding elements can be defined to specify different logical networks for different users, and each logical forwarding element can be defined by multiple SFEs on multiple hosts. Each logical forwarding element isolates the traffic of the VMs of one logical network from the VMs of another logical network that is serviced by another logical forwarding element. A logical forwarding element can connect VMs executing on the same host and/or different hosts.

Through its port 1230 and a NIC driver (not shown), the SFE 1130 connects to the host's PNIC to send outgoing packets and to receive incoming packets. The SFE 1130 performs message-processing operations to forward messages that it receives on one of its ports to another one of its ports. For example, in some embodiments, the SFE tries to use header values in the data message to match the message to flow based rules, and upon finding a match, to perform the action specified by the matching rule (e.g., to hand the packet to one of its ports 1230 or 1235, which directs the packet to be supplied to a destination VM or to the PNIC). In some embodiments, the SFE extracts from a data message a logical network identifier (e.g., a VNI) and a MAC address. The SFE in these embodiments uses the extracted VNI to identify a logical port group, and then uses the MAC address to identify a port within the port group.

The SFE ports 1235 in some embodiments include one or more function calls to one or more service modules 1120 that implement special input/output (I/O) operations on incoming and outgoing packets that are received at the ports. Examples of such I/O operations include middlebox operations (e.g., firewall operations, load balancing operations, DNAT operations, DNS re-route operations, etc.), ARP proxy operations, message encapsulation operations (e.g., encapsulation operations needed for sending messages along tunnels to implement overlay logical network operations), etc. By implementing a stack of such function calls, the ports can implement a chain of I/O operations on incoming and/or outgoing messages in some embodiments. Instead of calling the I/O operators (including the service modules 1120) from the ports 1235, other embodiments call these operators from the VM's VNIC or from the port 1230 of the SFE.

Three types of service operations of the service modules 1120 are particularly relevant to the MDM-attribute based processing of the mobile-device data messages passed by the VPN VM 1110. These are: (1) MDM-attribute based service operations that are performed on the host that executes the VPN VM, (2) tunnel encapsulation operations that insert MDM attribute sets in tunnel headers of tunnels so that the MDM attribute sets can be forwarded inband to forward mobile-device data messages to other service nodes, and (3) service operations that are performed by these other service nodes on the data messages based on the inband transmitted MDM attribute sets.

In some embodiments, the first type of service operation involves the service module 1120 of the VPN VM 1110 performing an MDM-attribute based service operation on data messages that it intercepts from the VPN VM's egress datapath. In some of these embodiments, multiple service modules 1120 can be associated with the VPN VM, ad these service modules can perform multiple different MDM-attribute based service operations on the data messages that they intercept from the VPN VM's egress datapath. In such situations, the SFE port 1235 connected to the VPN VM's VNIC 1225 calls the MDM-attribute processing service modules as it steps through the function call list that it processes for a data message that it receives from the VPN VM.

For a data message of a new data flow, a service module 1120 of a VPN VM 1110 performs MDM-attribute based service processing by initially retrieving the message's MDM attribute set from the attribute storage 1135. In some embodiments, the VPN VM 1110 stores some or all of this MDM attribute set in the storage 1135 after getting MDM attribute data from the remote device and/or inband from an MDM server (e.g., as part of the authentication process). Conjunctively, or alternatively, the agent 1140 stores some or all of the MDM attribute set in the MDM storage 1135 upon getting this data OOB (out of band) from the MDM server as part of the authentication process.

Some embodiments store the MDM attribute sets in the MDM attribute storage 1135 based message flow header values. Accordingly, in these embodiments, the service module 1120 retrieves the message's MDM attribute set from the storage 1135 by using the message's flow header values to identify an MDM attribute set with a matching set of flow values. After retrieving the message's MDM attribute set, the VPN VM's service module 1120 uses this attribute set and/or message's flow header values (e.g., L2-L7 parameters) to identify a service rule in the rule storages 1226/1227 for processing the data message. In some embodiments, both storages 1226 and 1227 store just one copy of the service rules but they use different index structures for quickly identifying rules that match a data message's flow header values and MDM attribute values. Some embodiments use a radix tree index structure for the flow header values, and an MDM-attribute tree structure for the MDM attributes. These structures are further described below.

The service module 1120 then performs a service on the message based on the identified service rule, and then creates a record in the connection state storage 1232 of the service rule and/or operation that it performed. The service module 1120 can then use this record in the connection storage to process other data messages that are part of the same data message flow. When the service operation does not require the data message to be discarded, the service module 1120 then returns the data message to the VPN VM's associated SFE port 1235 so that the data message can be processed by the next service module 1120 or it can be forwarded by the SFE 1130 to its destination.

As shown, the service rules are distributed to the rule storages 1226 and 1227 by the publisher 1220. In some embodiments, the agents 1140 receive flow-based rules and MDM-attribute based rules from the network controllers and store these rules in the host-level rule storage 1215. In some embodiments, the publisher 1220 then stores these rules to different tables in the MDM-attribute based and flow-based rule storages 1226 and 1227. Other embodiments specify different rule storages 1226 and 1227 (and connection state storages 1232) for different service modules. In these embodiments, the publisher 1220 distributes the service rule sets for a service module 1120 to the service module's respective MDM-attribute based and flow-based rule storages 1226 and 1227.

Two other types of service operations that are relevant to the MDM-attribute based processing are for embodiments that forward a data-message's associated MDM attributes inband to another service node (e.g., an SVM or service module on another host, or to a standalone service appliance) for the other service node to perform the MDM-attribute based processing of the data message. In such embodiments, the second type of service operation involves the service module 1120 of the VPN VM 1110 encapsulating the data message with a tunnel header for a tunnel between the SFE 1130 of the host 1200 and the service node that will perform the MDM-based processing of the data message or will forward the data message to the service node that will perform the MDM-based processing. In encapsulating the data message, the service module 1120 inserts the MDM attribute set for the data message in the tunnel's header. In some embodiments, the tunnel is a Geneve or VXLAN tunnel that can have a variable length header.

When the MDM attributes are sent to a service module that executes another host, the tunnel is between the SFEs of the two hosts in some embodiments. Also, in some embodiments, the identified destination for the data message and its MDM attributes is not the service module, but rather is the service module's associated VM. Nonetheless, the service module performs its service operation based on the received data message's MDM attributes, before allowing the data to be passed its VM.

When the service node receives a data message and its MDM attribute set along a tunnel, the service node decapsulates the tunnel header, parses the MDM attribute set from the tunnel header, and stores the MDM attribute set (e.g., in the MDM attribute storage 1135) in some embodiments. In some embodiments, a service module 1120 associated with the data message's destination node (e.g., destination GVM) performs (1) the decapsulation operation by intercepting the data message along the destination node's ingress datapath, and (2) the storage operation to store the MDM attributes retrieved from the tunnel header in an MDM attribute storage. In some embodiments, this decapsulating service module is called by either port 1230 or 1235 of the SFE of the host that executes the destination node.

This decapsulating service module or another service module in the ingress datapath of the destination node then performs the third type of MDM-attribute based processing of the remote-device data messages. Specifically, this service module retrieves the message's MDM attribute set from the storage 1135 in which the attribute set was stored after the tunnel header decapsulation, and then uses this attribute set and/or flow header values to identify a service rule in the rule storages 1226/1227 for processing the data message.

In some embodiments, this service module 1120 stores in the connection storage 1232 the service rule and/or operation to perform on a data message flow after processing one data message for the flow. For subsequent data messages of the flow, the service module 1120 then uses this service rule and/or operation instead of searching the rule data storages 1226 and 1227 for a service rule to perform.

Similarly, in some embodiments, the encapsulating service module and decapsulating service module do not insert and/or parse the MDM attribute set for a data message flow for each data message in the flow. For example, in some embodiments, these modules perform these operations for only the first data message or first few data messages in the flow. This is because in some embodiments, the MDM attribute set for a remote data message flow cannot change in the middle of the flow. In other embodiments, the MDM attribute set can change in the middle of the flow. Hence, in these embodiments, the encapsulating and/or decapsulating service modules insert and/or parse the MDM attribute sets for a data message flow repeatedly, periodically, or occasionally. In these embodiments, the decapsulating service module might not always rely on a previously created record in the connection storage 1232 for a data message flow, as it might have to update the record based on a new MDM attribute set for the data message flow.

Different embodiments use different combinations of MDM-attribute based service processing. Some embodiments only perform MDM-attribute based service processing at the service module(s) that execute on the same host as a VPN VM and capture the data messages along the VPN VM's egress datapath. Other embodiments only perform MDM-attribute based service processing on service nodes that execute on devices that connect to the VPN VM's host through a tunnel and that receive MDM attribute sets inband from the VPN VM's service module through the tunnel. Yet other embodiments perform some MDM-attribute based service processing at the VPN VM's service module, while performing other MDM-attribute based service processing on a separate device based on MDM attribute sets that are passed along inband by a service module of the VPN VM.

Also, in some embodiments, an SVM 1104 that executes on the same or different host as the VPN VM performs MDM-attribute based service processing based on MDM attribute sets of the data messages that the VPN VM passes to the network. In some of these embodiments, the SVM 1104 has direct access or indirect access (e.g., through APIs) to the MDM attribute storage 1135, or the records in this storage 1135 are synchronized with records of a storage of the SVM 1104.

Several examples of performing MDM-attribute based service operations will now be described by reference to FIGS. 13-24. FIGS. 13-20 illustrate a first set of examples, in which the service operations are performed by the service modules of the VPN VMs. FIGS. 21-24 illustrate a second set of examples in which the service operations are performed by service nodes that are not on the hosts that execute the VPN VM. In the second set of examples, the service modules of the VPN VMs forwards MDM attribute sets inband to the service nodes (i.e., encapsulate MDM attribute sets in tunnel headers as they forward data messages output by the VPN VMs to the service nodes).

Figure 13:
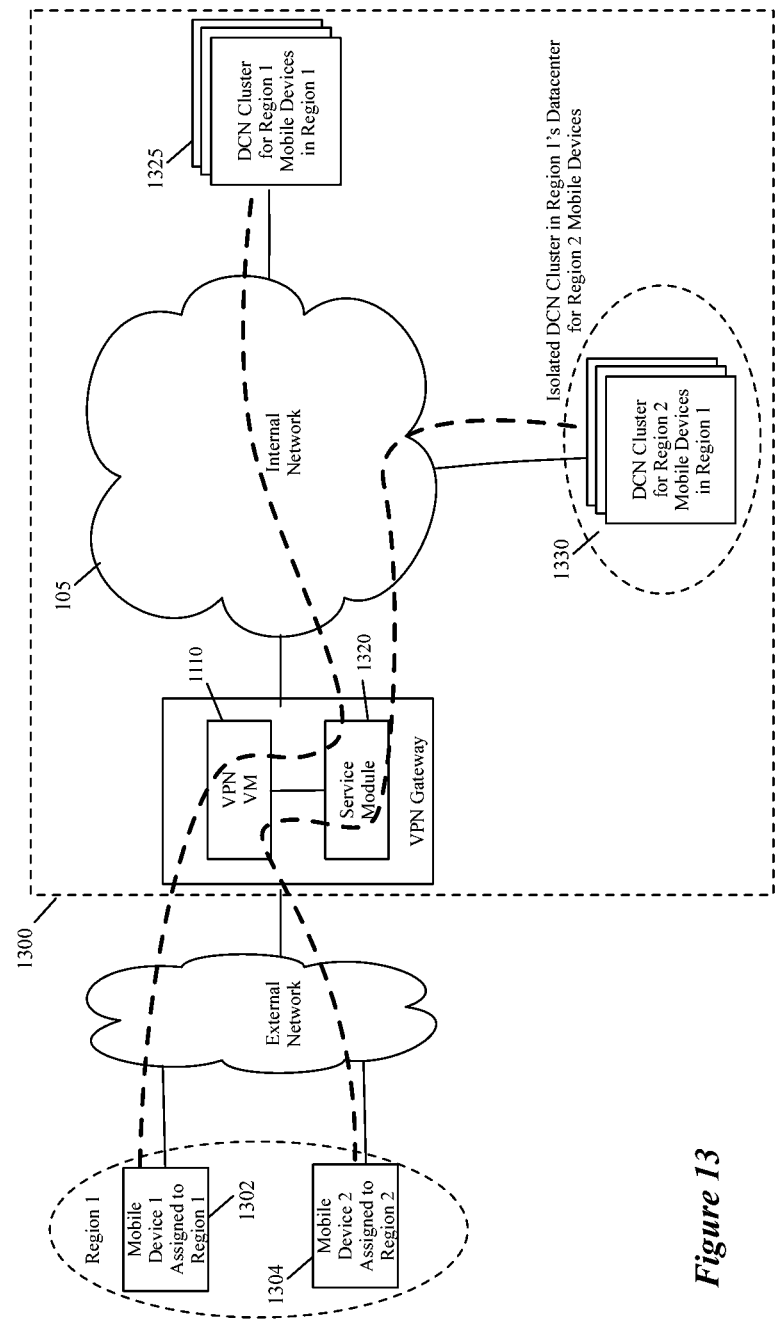
FIG. 13 illustrates two different ways that a VPN VM's service module performs DNAT operations based on the locations that are associated with the mobile device.

FIG. 13 illustrates two different ways that a VPN VM's service module performs DNAT operations based on the locations that are associated with the mobile device. The two mobile devices 1302 and 1304 in this example are part of one entity (e.g., one company) but are associated with offices in two different regions (e.g., two different countries, such as the U.S. and Germany). Also, in this example, the datacenter 1300 is associated with the first region of the first mobile device 1302, and both mobile devices are located in the first region when they access the datacenter 1300.

For regulatory, security, or other reasons, the second mobile device 1304 should not access the same cluster of data compute nodes (DCNs) in the datacenter 1300 as the first mobile device 1302. Thus, once the VPN VM 1110 establishes a VPN connection with a mobile device, the VPN VM 1110 allows the data messages from the mobile device to pass along to the DCNs identified by destination tuples of the data messages. In this example, the destination IP address of the data messages is a virtual IP (VIP) address that is associated with a DCN cluster (e.g., a webserver cluster, or an application server cluster).

The VPN VM's service module 1320 intercepts the data messages from the VPN VM's egress datapath. When it initially intercepts the data message from the first mobile device 1302, the DNAT service module 1320 retrieves the MDM attribute set associated with this data message from the MDM attribute data storage 1135 (not shown). In some embodiments, the service module retrieves the MDM attribute set by using the data message flow header values.

The service module 1320 then uses this MDM attribute set to identify a DNAT rule in the MDM attribute rule storage 1226 (not shown) that has a rule identifier that matches the retrieved MDM attribute set. This rule specifies that no DNAT operation needs to be performed for the data messages of the first mobile device 1302. This is because the first mobile device 1302 can access the DCN server cluster 1325 in the first region for mobile devices that are associated with the first region. Hence, the service module 1320 does not perform a DNAT operation to re-route the data message, and allows the data message from the first mobile device to pass to the DCN server cluster 1325. The service module 1320 also creates a record in its connection storage of this operation so that it can use this record to quickly process subsequent messages from the first mobile device that are part of the same flow.

When the DNAT service module 1320 initially intercepts the data message from the second mobile device 1304, this service module again retrieves the MDM attribute set associated with this data message from the MDM attribute data storage 1135 (not shown), and then uses this MDM attribute set to identify DNAT rule in the MDM attribute rule storage 1226 (not shown). However, this time, the identified rule specifies that a DNAT operation needs to be performed for the data messages of the second mobile device 1304 in order to re-route them to a DCN server cluster 1330 in the first region that has been segregated from other DCN server clusters and other resources in this region specifically for secure, private use by second-region mobile devices that access the datacenter resources in the first region. In some embodiments, the segregated DCN server cluster 1330 is protected from other resources in the datacenter 1300 by various firewall appliances and/or other security devices.

To re-route the second-mobile device's data message to the segregated DCN server cluster 1330, the DNAT service module 1320 in some embodiments replaces the VIP of the first DCN server cluster 1325 with the VIP of the second DCN server cluster 1330 in the destination IP address field of the data message. The service module 1320 also creates a record in its connection storage of this operation so that it can use this record to quickly process subsequent messages from the second mobile device 1304 that are part of the same flow.

Figure 14:
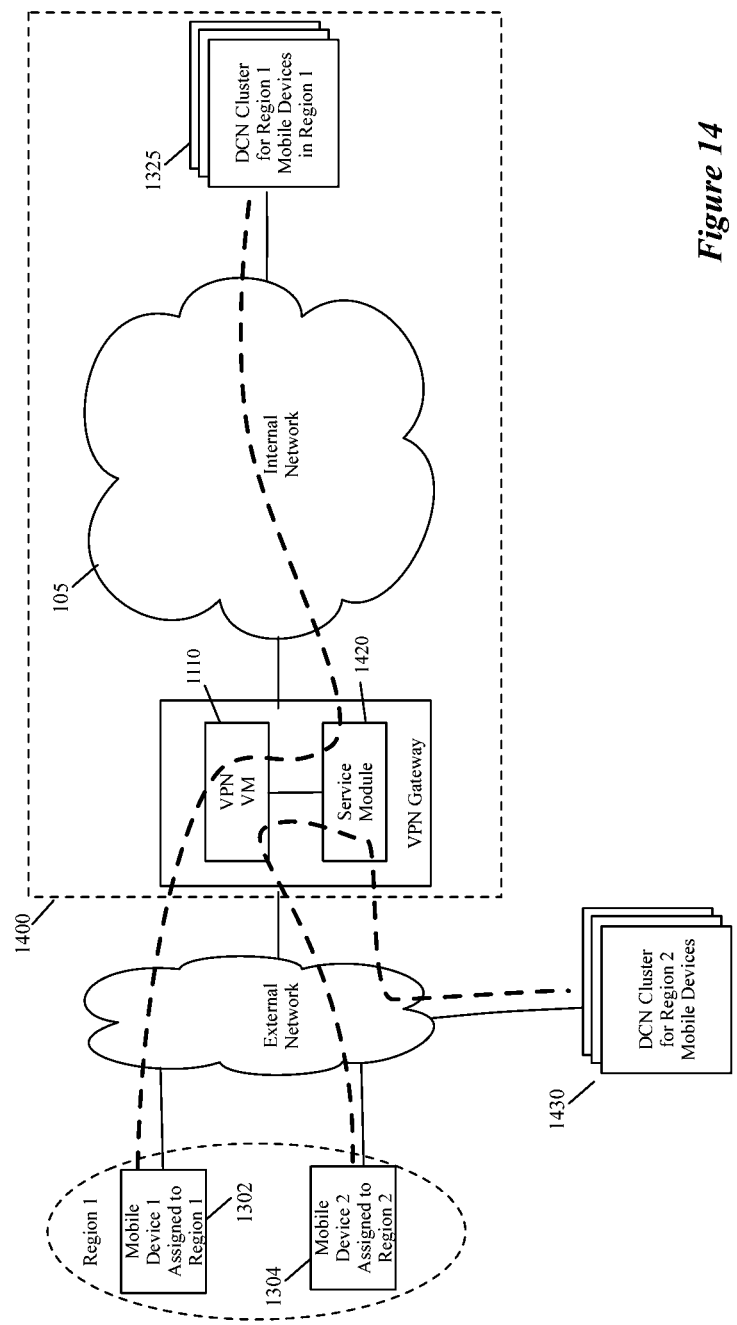
FIG. 14 illustrates the VPN VM's service module performing an MDM-attribute based DNAT operation that re-routes the data messages of the second mobile device out of the datacenter to a DCN server cluster for second region mobile devices that access the datacenter DCN cluster in the first region.

Instead of re-routing the data messages of the second mobile device 1304 to a second DCN server cluster 1330 in the datacenter 1300 of the first region, some embodiments re-route the data messages to a DCN server cluster in the second region or in another region. FIG. 14 illustrates one such example. Specifically, this figure illustrates the VPN VM's service module 1420 performing an MDM-attribute based DNAT operation that re-routes the data messages of the second mobile device 1304 out of the datacenter 1400 to a DCN server cluster 1430 for second region mobile devices that access the datacenter DCN cluster 1325 in the first region. The DCN server cluster 1430 is in the second region in some embodiments, while it is in another region in other embodiments. In some embodiments, the DNAT re-routing operation uses a tunnel to forward the second mobile device's data messages from the datacenter 1300 to the DCN server cluster 1430.

Figure 15:
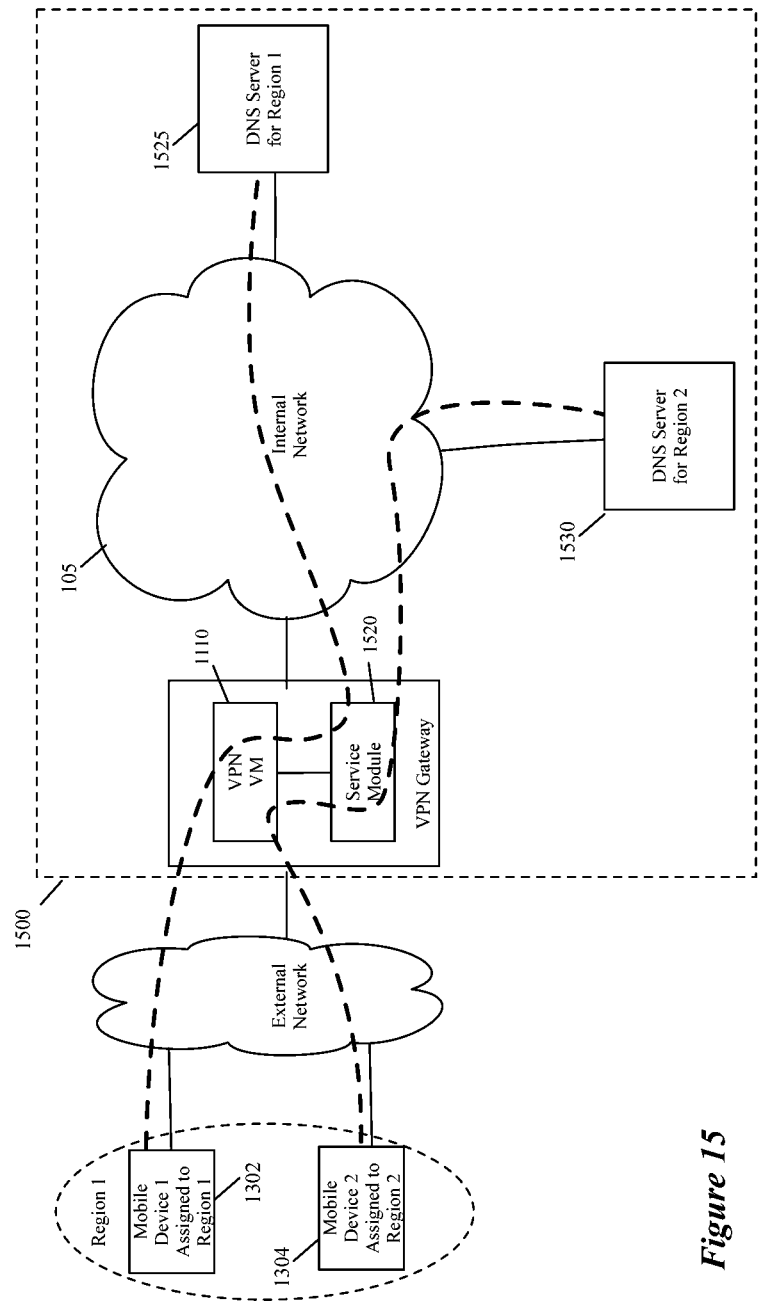
FIG. 15 illustrates a VPN VM's service module redirecting mobile-device data messages that require DNS lookups to two different DNS servers based on the associated regions of the mobile devices that sent these data messages.
Figure 16:
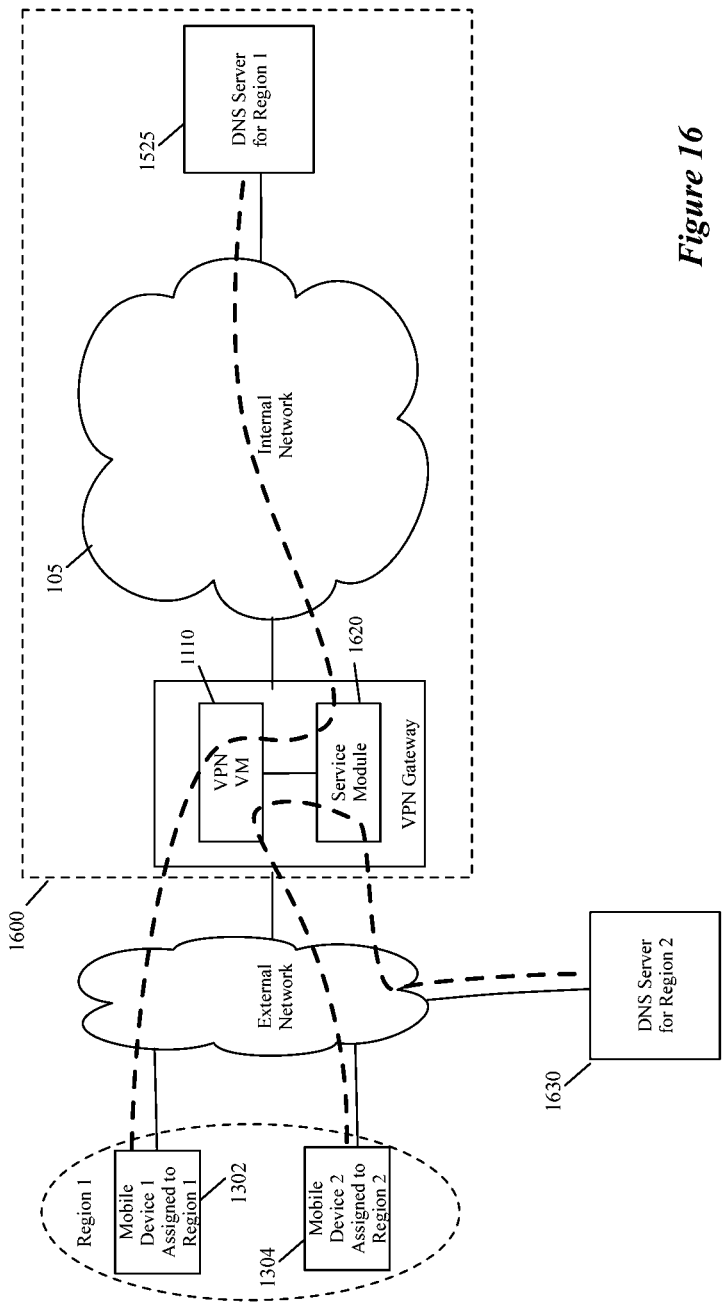
FIG. 16 illustrates the VPN VM's service module performing an MDM-attribute based DNS operation that re-routes the DNS name query of the second mobile device out of the datacenter to a DNS server for second-region mobile devices that access the datacenter DNS server in the first region.

FIGS. 15 and 16 illustrate two other examples of MDM-attribute based re-routing operations. In these examples, the re-routing operations redirect DNS name queries. FIG. 15 illustrates a VPN VM's service module redirecting mobile-device data messages that require DNS lookups to two different DNS servers based on the associated regions of the mobile devices that sent these data messages. As before, the two mobile devices 1302 and 1304 in this example are associated with two different regions (e.g., two different countries, such as the U.S. and Germany), but are both located in the first region when they access the datacenter 1500, which is associated with the first region of the first mobile device 1302 (e.g., is in the first region). Also, in this example, for regulatory, security, or other reasons, the second mobile device 1304 that is associated with the second region has to access a different DNS server than the first mobile device 1302 that is associated with the first region.

Once the VPN VM 1110 establishes a VPN connection with a mobile device, the VPN VM 1110 receives a DNS name query, which it allows to pass to the default DNS server 1525 of the datacenter. The VPN VM's service module 1520 intercepts the DNS name queries for both mobile devices 1302 and 1304. In some embodiments, the service module 1520 determines that the data message is a DNS associated message based on the destination tuples (e.g., destination port) of the data message. In other embodiments, the VPN VM or the service module perform a soft termination for the message so that it can examine the packet to identify the DNA name query inside the packet.

When it initially intercepts the data message from the first mobile device 1302, the service module 1520 retrieves the MDM attribute set associated with this data message from the MDM attribute data storage 1135 (not shown). In some embodiments, the service module retrieves the MDM attribute set by using the data message flow header values. The service module 1520 then uses this MDM attribute set to identify a DNS rule in the MDM attribute rule storage 1226 (not shown) that has a rule identifier that matches the retrieved MDM attribute set. This rule specifies that no DNS reroute operation needs to be performed for the data messages of the first mobile device 1302. This is because the first mobile device 1302 is associated with the first region and can access the DNS server 1525 of the first region. Hence, the service module 1520 allows the data message from the first mobile device 1302 to pass to the DNS server 1525 unchanged.

When the service module 1520 initially intercepts the data message from the second mobile device 1304, this service module 1520 again retrieves the MDM attribute set associated with this data message from the MDM attribute data storage 1135 (not shown), and then uses this MDM attribute set to identify DNS rule in the MDM attribute rule storage 1226 (not shown). However, this time, the identified rule specifies that a DNS reroute operation needs to be performed for the DNS name queries of the second mobile device 1304 in order to re-route them to a DNS server 1530 in the first region that is for second-region mobile devices that access the first region's datacenter 1500.

In some embodiments, the second region's DNS server 1530 may resolve one or more DNS name queries differently than the first region's DNS server 1525, in order to comply with regulatory, security, or other criteria for the second-region mobile devices. To re-route the second-mobile device's DNS name query, the service module 1520 in some embodiments replaces the destination IP address in the DNS name query message from the destination IP address of the DNS server 1525 to the destination IP address of the DNS server 1530.

Instead of re-routing the DNS name query of the second mobile device 1304 to a second DNS server 1530 in the datacenter 1500 of the first region, some embodiments re-route this data message to a DNS server in the second region or in another region. FIG. 16 illustrates one such example. Specifically, this figure illustrates the VPN VM's service module 1620 performing an MDM-attribute based DNS operation that re-routes the DNS name query of the second mobile device 1304 out of the datacenter 1600 to a DNS server 1630 for second-region mobile devices that access the datacenter DNS server in the first region. The DNS server 1630 is in the second region in some embodiments, while it is in another region in other embodiments. In some embodiments, the DNS re-routing operation uses a tunnel to forward the second mobile device's data messages from the datacenter 1600 to the DNS server 1630.

Network micro-segmentation is an example of another processing operation that the VPN gateway of some embodiments performs based on the MDM attribute set associated with mobile-device data messages received through the tunnel. Some embodiments implement multiple logical networks on a shared set of network elements (e.g., forwarding elements, middlebox elements, etc.) of the network. In some embodiments, each logical network is implemented as an overlay network that is decoupled from the underlying physical topology. An overlay network in some embodiments is created by using a logical network identifier (e.g., a virtual network identifier, VNI) and by using tunnels between managed network elements in the network.

Figure 17:
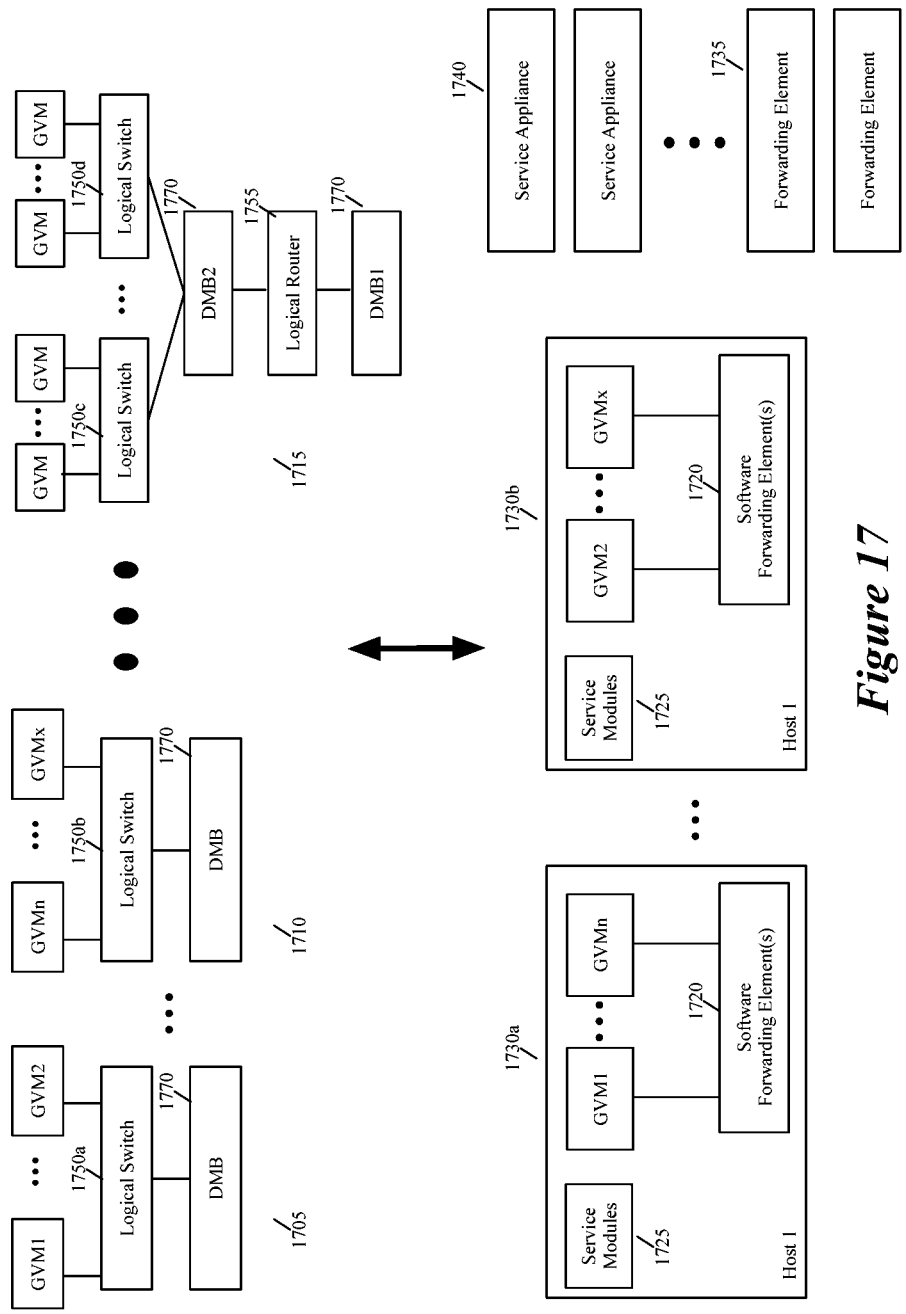
FIG. 17 illustrates an example of three logical overlay networks that are defined (1) across a shared set of software forwarding elements and service modules that execute on a shared set of hosts and (2) across multiple standalone shared forwarding elements and shared middlebox elements (or service appliances).

To illustrate the concept of logical network constructs, FIG. 17 illustrates an example of logical overlay networks 1705, 1710, and 1715 that are defined (1) across a shared set of software forwarding elements 1720 and service modules 1725 that execute on a shared set of hosts 1730 and (2) across multiple standalone shared forwarding elements 1735 and shared middlebox elements (or service appliances) 1740. Specifically, this figure illustrates a number of GVMs that execute on several hosts 1730, which execute software forwarding elements 1720 and service modules 1725, respectively.

The shared software forwarding elements 1720 and standalone shared forwarding elements 1735 (e.g., Top of Rack switches (TORs)) can implement any arbitrary number of logical switches 1750 and logical routers 1755. As shown, one logical network (e.g., network 1715) can have multiple logical switches and/or logical routers, while another logical network (e.g., network 1705) can have just one logical forwarding element (e.g., a logical switch). One logical forwarding element can communicatively connect VMs on different hosts. For example, FIG. 17 illustrates the logical switch 1750a connecting GVMs 1 and 2 that execute on hosts 1730a and 1730b, while logical switch 1750b connects GVMn and GVMx that execute on these two hosts.

The logical forwarding element or elements of one logical network isolate the data message communication between their network's VMs (i.e., the GVMs and SVMs that they interconnect) from the data message communication between another logical network's VMs. In some embodiments, this isolation is achieved through the association of logical network identifiers (LNIs) with the data messages that are communicated between the logical network's VMs. In some of these embodiments, such LNIs are inserted in tunnel headers of the tunnels that are established between the shared network elements (e.g., the hosts, standalone service appliances, standalone forwarding elements, etc.).

In hypervisors, software switches are sometimes referred to as virtual switches because they are software and they provide the VMs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in Mahalingam, Mallik; Dutt, Dinesh G.; et al. (2013 May 8), VXLAN: A Framework for Overlaying Virtualized Layer 2 Networks over Layer 3 Networks, IETF.

As further shown, the host service modules 1725 and the standalone service appliances 1740 can also implement any arbitrary number of logical distributed middleboxes 1770 for providing any arbitrary number of services in the logical networks. Examples of such services include firewall services, load balancing services, DNAT services, etc. As shown, one logical network (e.g., network 1715) can implement multiple distributed middlebox service elements 1770, while another logical network (e.g., network 1705) can implement just one distributed middlebox service element.

Figure 18:
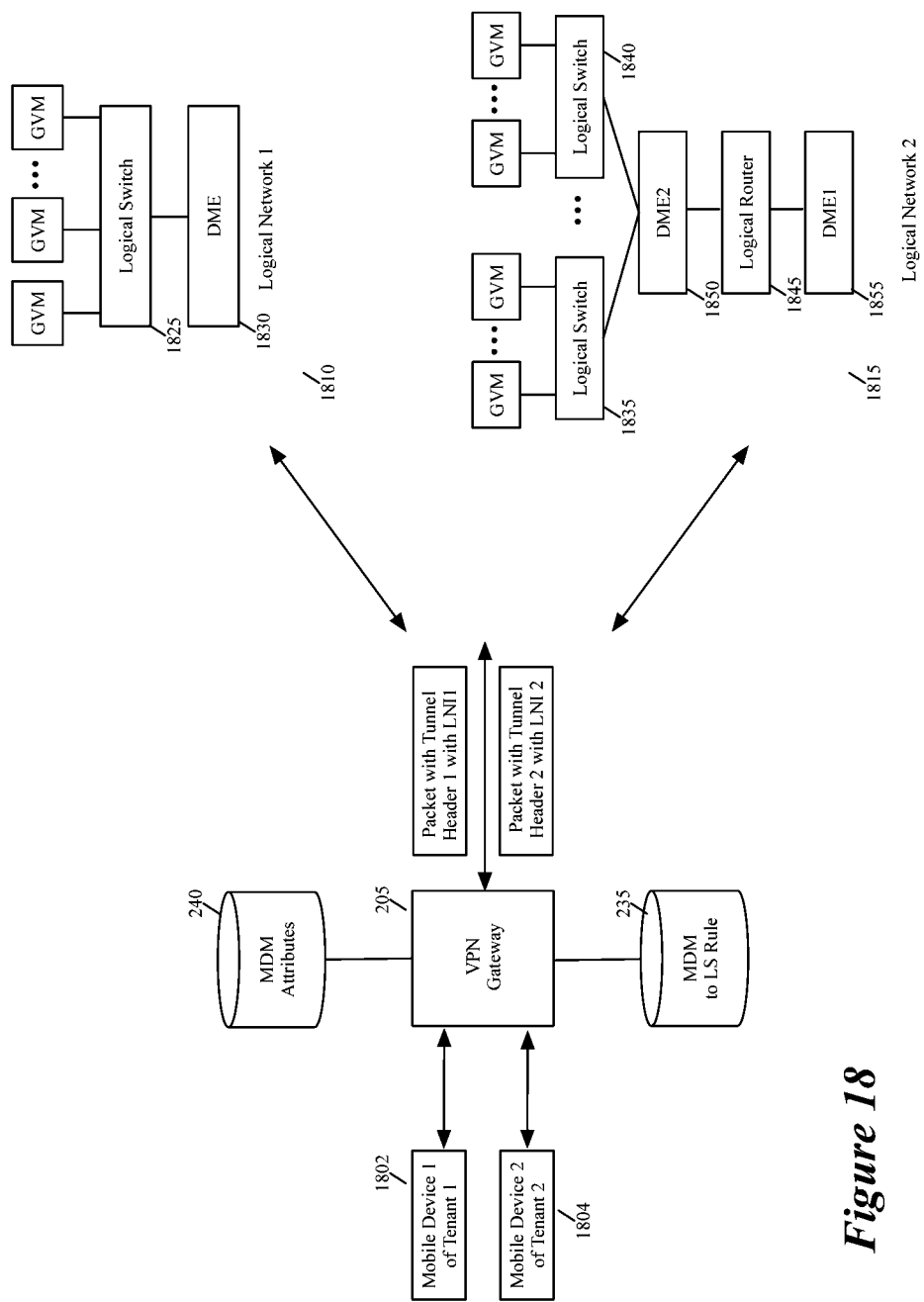
FIG. 18 illustrates a VPN gateway that associates data messages from a first mobile device of a first tenant with a first logical network identifier of a first logical network, and associates data messages from a second mobile device of a second tenant with a second logical network identifier of a second logical network.
Figure 19:
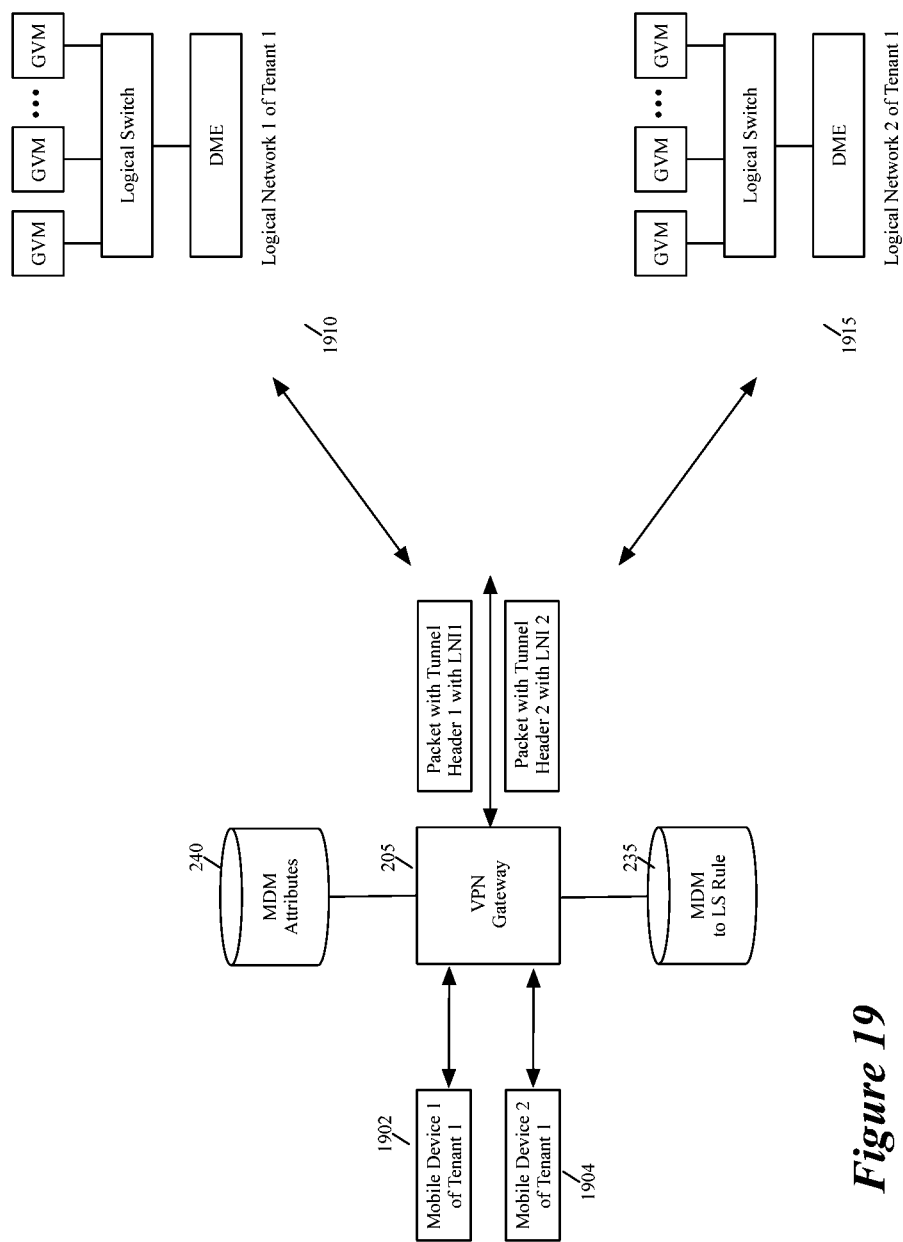
FIG. 19 illustrates a VPN gateway that associates data messages from two mobile devices of the same tenant to two different logical networks.
Figure 20:
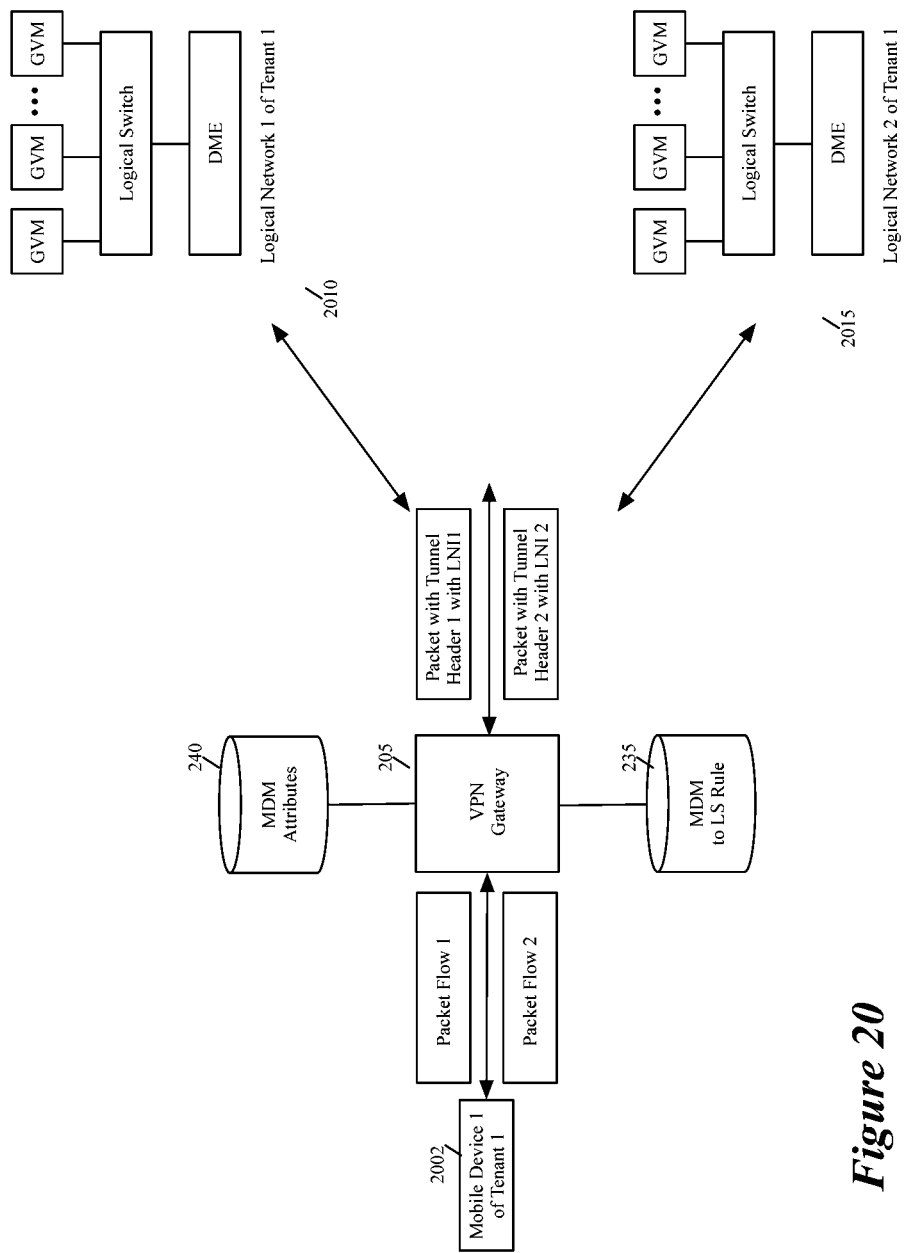
FIG. 20 illustrates a VPN gateway that associates two different data messages flows from the same mobile device to two different logical networks.

FIGS. 18-20 present three examples that illustrate three different ways in which a VPN gateway of some embodiments associates different mobile device data messages with different logical networks based on the MDM attribute sets of the data messages. FIG. 18 illustrates a VPN gateway 205 that associates data messages from a first mobile device 1802 of a first tenant with a first logical network identifier (LNI1) of a first logical network 1810, and associates data messages from a second mobile device 1804 of a second tenant with a second logical network identifier (LNI2) of a second logical network 1815.

The first logical network 1810 connects the GVMs of the first tenant, while the second logical network 1815 connects the GVMs of the second tenant. As shown, the logical network 1810 includes a logical switch 1825 and a distributed middlebox element 1830 that are implemented on the shared compute, forwarding and service fabric of the datacenter, while the logical network 1815 includes two logical switches 1835 and 1840, one logical router 1845 and two distributed middlebox elements 1850 and 1855 are implemented on the shared compute, forwarding and service fabric of the datacenter. Each logical network isolates the data messages that are sent to and from its GVMs from the VMs of the other logical networks.

The VPN gateway 205 associates the mobile-device data messages with a logical network based on the MDM attribute set of the data messages. For example, in some embodiments, the VPN gateway 205 is implemented by a VPN VM and its associated service module that executes on the same host. Once the VPN VM establishes a VPN connection with a mobile device, the VPN VM allows the data messages form the mobile device to pass along to its addressed destination in the datacenter. The VPN VM's service module intercepts the data messages from the VPN VM's egress datapath.

When it intercepts an initial data message from a mobile device, the service module retrieves the MDM attribute set associated with this data message from the MDM attribute data storage 240. In some embodiments, the service module retrieves the MDM attribute set by using the data message flow header values. The service module then uses this MDM attribute set to identify a LS (logical segmentation) rule in the MDM attribute rule storage 235 that has a rule identifier that matches the retrieved MDM attribute set.

In the example illustrated in FIG. 18, each LS rule specifies a rule identifier that includes a tenant identifier. This rule also specifies an LNI to use for data messages from the mobile devices associated with the tenant identifier. Hence, as the retrieved MDM attribute set includes a tenant identifier in some embodiments, the service module uses the tenant identifier to identify an LS rule that specifies the LNI to use for the data messages from a mobile device of a particular tenant. The service module then inserts the identified LNI (e.g., LNI1 for data messages from mobile devices of tenant 1 and LNI2 for data messages from mobile devices of tenant 2) in a tunnel header of a tunnel that the VPN gateway 205 uses to forward the data message to a forwarding element or middlebox element associated with the logical network.

In some embodiments, the identified LS rule also specifies a tunnel identifier that identifies the tunnel to use to forward the mobile device's data messages. In some embodiments, data messages for different tenants can be sent along the same tunnel so long as each data message's tunnel header includes the message's associated LNI. In other embodiments, data messages for different tenants have to be sent along different tunnels, even when they are traversing between the same two devices.

After identifying the LNI for a data message from a mobile device, the service module creates a record in its connection storage to store this LNI for subsequent data messages from the mobile device. In this record, the service module stores the data message flow attributes (e.g., header values) and/or the retrieved MDM attribute set so that it can later use this stored data to identify this record for subsequent data messages from the mobile device that have matching flow and/or MDM attributes. The connection store record allows the service module to quickly process subsequent messages from the mobile device that are part of the same flow.

FIG. 19 illustrates a VPN gateway 205 that associates data messages from two mobile devices 1902 and 1904 of the same tenant to two different logical networks 1910 and 1915. The VPN gateway 205 can do this by relying on more than just the tenant identifier in the retrieved MDM attribute sets that are associated with the mobile device data messages. For example, in some embodiments, the rule identifiers of the LS rules in the MDM attribute rule storage 235 are not only defined in terms of the tenant identifiers, but are also defined by one or more other MDM attributes that can be used to distinguish different mobile devices of a tenant. Examples of other such MDM attributes include user identifier, group identifier, department identifier, the mobile device's jailbroken status, location identifier, etc. Different LS rules can specify different LNIs for the same tenant identifier, by also using any one of these other attributes (user identifier, group identifier, department identifier, the mobile device's jailbroken status, location identifier, etc.) in the rule identifiers of the LS rules.

Jailbroken devices are devices on which a jailbreaking process has been performed. Jailbreaking is a process that removes software or hardware restrictions on a device that are imposed by the operating system (OS) of the device. These restrictions can limit the software that executes on the device, or can be defined for other security reasons. In some cases, the device restrictions are defined by a digital right management (DRM) layer that executes on the device. In such devices, jailbreaking is the hacking process that bypasses the DRM restrictions to allow the loading of unauthorized software and to make other changes to the OS. In some embodiments, jailbreaking permits root access to the OS file system and manager, allowing the download of unauthorized applications and extensions. In some cases, jailbreaking involves the installation of a set of kernel patches (with the kernel being a supervisor of the OS) to allow the execution of unsigned code. It also provides root-level access, which would otherwise be unavailable. As used here, root-level access refers to a super user access level that has unrestricted rights and permissions to all files.

By using the jailbroken status of the devices, the LS rules can direct the VPN gateway 205 to associate the data messages from a first mobile device 1902 of the tenant that is jailbroken to a first logical network 1910, while associating the data messages from a second mobile device 1904 of the tenant that is not jailbroken to a second logical network 1915. In some embodiments, the first logical network has access to fewer resources than the second logical network, because jailbroken devices are viewed as less secure device. This approach would allow the jailbroken devices to have remote access to some resources, while being segregated from other resources that they should not be able to access.

Similarly, by using the group or department identifiers, the LS rules can direct the VPN gateway 205 to associate the data messages from a first mobile device 1902 of the tenant that is associated with a first user group (e.g., executives) to a first logical network 1910, while associating the data messages from a second mobile device 1904 of the tenant that is associated with a second user group (e.g., employees) to a second logical network 1915. Placing different groups on different logical networks allows the remote access to the resources to be segregated, such that one group of users (e.g., executives) have greater access to some of the resources than the other group of users (e.g., employees).

FIG. 20 illustrates a VPN gateway 205 that associates two different data messages flows from the same mobile device 2002 to two different logical networks 2010 and 2015. The VPN gateway 205 can do this by relying on MDM attributes and/or flow based header values that differentiate one data message flow from the mobile device 2002 from another data message flow from the mobile device. For example, in some embodiments, the rule identifiers of the LS rules in the MDM attribute rule storage 1226 are not only defined in terms of the tenant identifiers, but are also defined in terms of application identifiers that identify the mobile device application that is attempting the remote access. By using the application identifier, the LS rules can direct the VPN gateway 205 to direct data messages from a first application (e.g., a browser application) to a first logical network 2010, while directing data message from a second application (e.g., a native enterprise application) to a second logical network 2015.

The examples illustrated in FIGS. 13-20 are just a few examples of the types of service operations that the VPN gateway 205 can perform based on MDM-attribute specified service rules. One of ordinary skill will realize that the VPN gateway of some embodiments can perform many other examples of MDM-attribute based service operations. These other examples include firewall operations, load balancing operations, other middlebox service operations, etc.

In some embodiments, the VPN gateway passes the MDM attribute set that it associates with a remote device's data messages to one or more network elements within the network so that these elements can perform one or more operations based on the MDM attribute set. FIGS. 21-24 illustrate several such examples in which the VPN gateways forward MDM attribute sets inband to the service nodes. In these examples, the VPN gateways encapsulate MDM attribute sets in tunnel headers as they forward remote-device data messages to the service nodes for processing. In some of these embodiments, the tunnels are Geneve tunnels that can have variable length tunnel headers that allow different amounts of MDM attributes to be forwarded along different tunnels.

Figure 21:
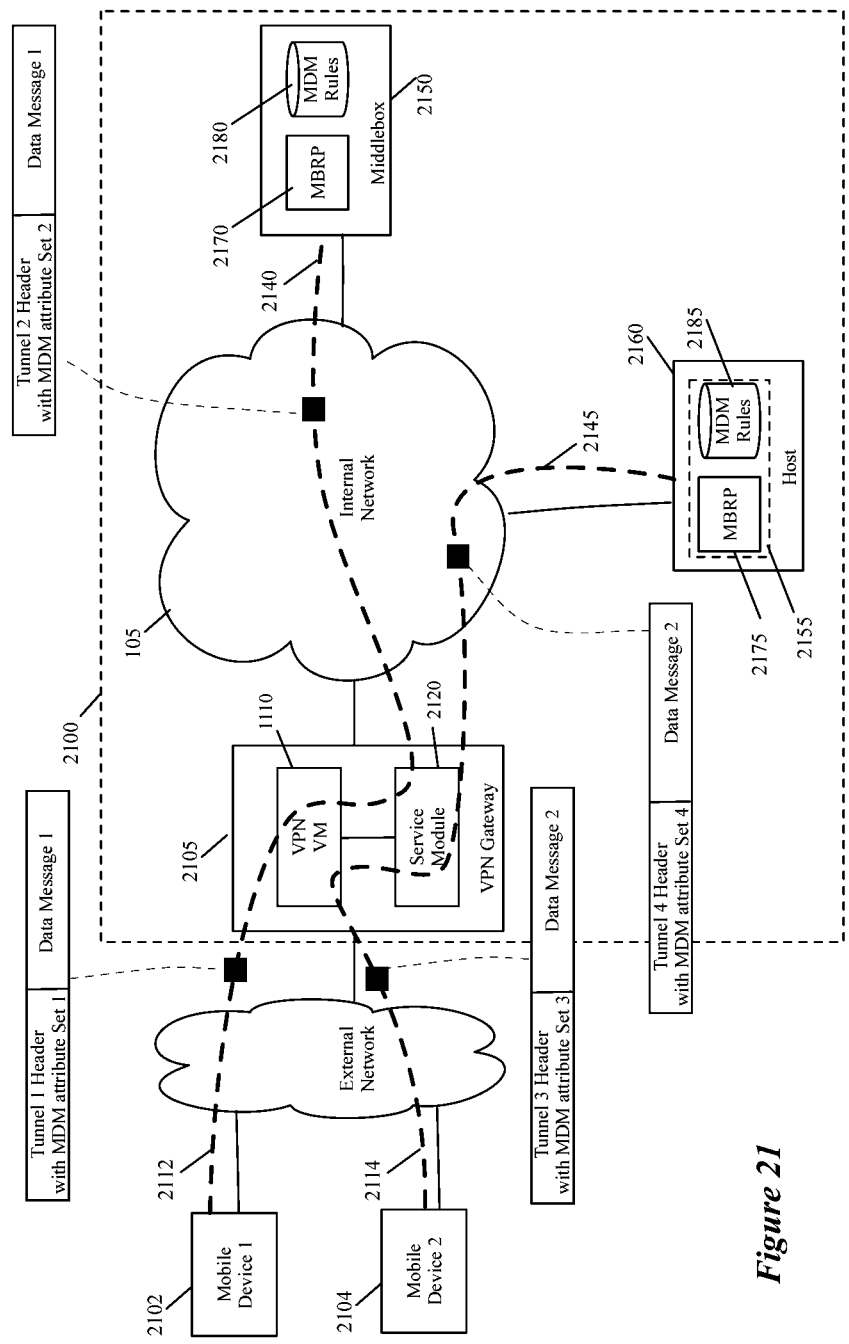
FIG. 21 illustrates an example of a VPN gateway forwarding data messages from two different mobile devices to two different interior service nodes along with the MDM attribute sets for these data messages, so that the service nodes can process the data messages based on the MDM attribute sets.

FIG. 21 illustrates an example of a VPN gateway 2105 forwarding data messages from two different mobile devices 2102 and 2104 to two different interior service nodes 2150 and 2155 along with the MDM attribute sets for these data messages, so that the service nodes can process the data messages based on the MDM attribute sets. In this example, the VPN gateway 2105 is implemented by a VPN VM 1110 and its associated service module 2120 that execute on a host computer along with other VMs.

Through two VPN tunnels 2112 and 2114, the VPN VM 1110 receives two different data message flows from first and second mobile devices 2102 and 2104. As shown, the header of each tunnel 2112 or 2114 includes an MDM attribute set that the mobile device 2102 or 2104 sends to the VPN gateway 2105. In decapsulating the VPN tunnel header, the VPN VM stores the MDM attribute set from the mobile device in the MDM attribute storage (not shown). This storage also stores MDM attributes that the MDM servers provide for a data message flow after authenticating the VPN connection session.

Once the VPN VM 1110 passes the data message received from the mobile device, this VM's associated service module 2120 retrieves the MDM attribute set for the data message from the MDM attribute storage. The retrieved MDM attribute set in some embodiments includes MDM attribute(s) received from the mobile device and MDM attribute(s) received from the MDM server. The service module 2120 then encapsulates the data message with a new tunnel header (e.g., a Geneve tunnel header), inserts the retrieved MDM attribute set in the tunnel header, and sends the encapsulated data message along its tunnel to a service node connected to the tunnel.

FIG. 21 illustrates the service module 2120 forwarding the data message (e.g., data packet) from the first mobile device 2102 to a standalone middlebox appliance 2150 along a tunnel 2140, while forwarding the data message from the second mobile device 2104 to a service module 2155 (that executes on a host 2160) along a tunnel 2145. This figure shows that the first mobile device's data message is received with one MDM attribute set in the header of the VPN tunnel 2112 but this data message is sent with another MDM attribute set to the middlebox 2150 in the header of tunnel 2140. Similarly, it shows the second mobile device's data message is received with one MDM attribute set in the header of the VPN tunnel 2114, but this data message is sent with another MDM attribute set to the service module 2155 in the header of tunnel 2145. This is because the service module 2120 might not forward all the MDM attributes that the mobile devices send. Also, the service module 2120 might forward additional MDM attributes that are provided by the MDM server to the service nodes.

As shown, both service nodes 2150 and 2155 include rule processors 2170 and 2175 that uses the MDM attribute sets that are provided in the headers of the tunnels 2140 and 2145 to identify MDM-attribute based rules in their MDM rule storages 2180 and 2185. After identifying a matching rule, each service node 2150 or 2155 then performs the service operation specified by the service rule on the received data message. Examples of such operations include the MDM-attribute based firewall operations, DNS operations, DNAT operations, and/or other middlebox or forwarding operations.

In some embodiments, the service module 2120 has to examine its own rule data storage in order to determine which service node or service node cluster it should select for processing the data message. Also, in some embodiments, this service module 2120 performs a load balancing operation to select among several plausible service nodes in a service node cluster to perform a service operation for a data message flow from a mobile device. In some of these embodiments, the service node's rule data storage and/or its load balancing operations can be based on MDM attributes of the mobile device data messages.

Figure 22:
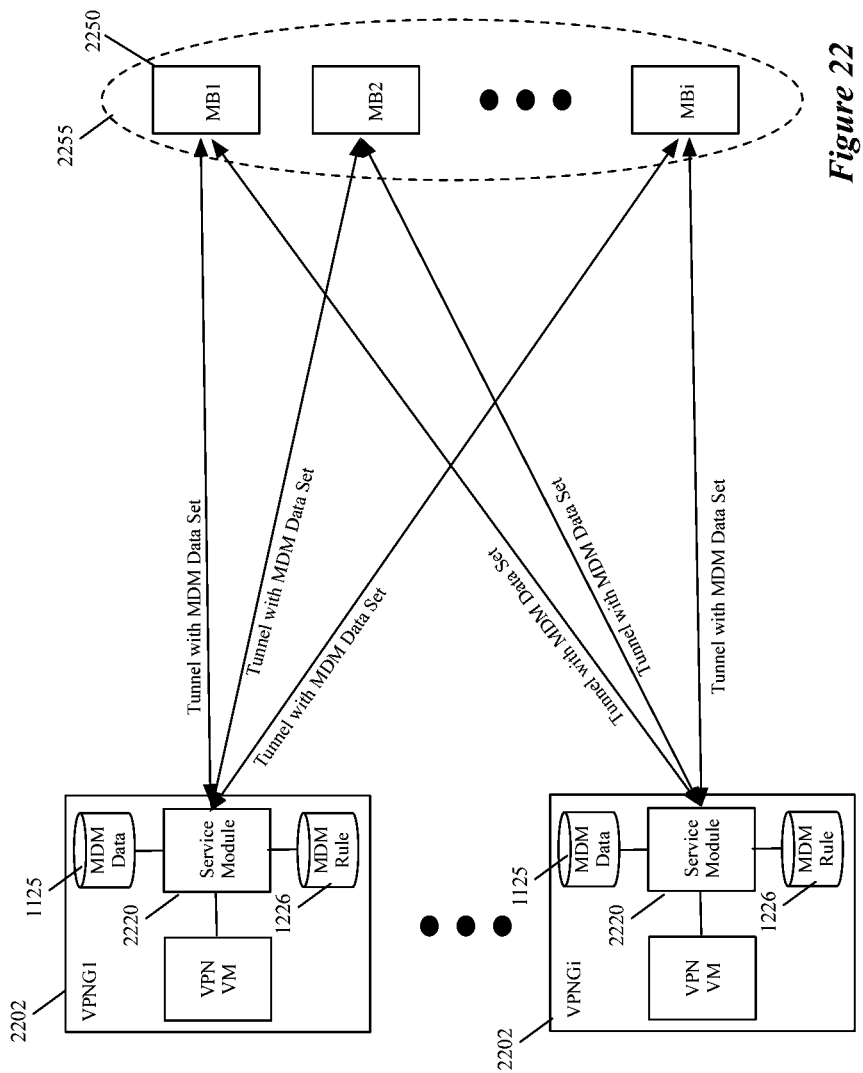
FIG. 22 illustrates the service modules of two VPN gateways distributing service operations for different mobile device data message flows across several middlebox service nodes in a service node cluster.

FIG. 22 illustrates one such example. This figure illustrates the service modules 2220 of two VPN gateways 2202 and 2204 distributing service operations for different mobile device data message flows across several middlebox service nodes 2250 in a service node cluster 2255. Based on a data message flow's header values, each service module 2220 retrieves the MDM attribute set for the data message flow from the MDM attribute store 1125.

Based on the retrieved MDM attribute set, the service module 2220 identifies a service rule in its MDM-attribute based rule data storage 1226. In some embodiments, this service rule identifies a set of tunnels to the service node cluster that perform one type of service operation (e.g., a firewall operation). In some embodiments, the identified service rule also specifies a set of load balancing criteria for specifying how the service module 2220 should distribute the mobile-device data message flows among the service nodes of the service node cluster 2255. Examples of such load balancing criteria include a set of weight values that control how the service module 2220 performs a weighted round robin selection of service nodes for new data message flows.

In some embodiments, the identified service rule does not specify a set of load balancing criteria. For example, in some embodiments, the service module 2220 is configured with one set of load balancing criteria that it uses for all load balancing operations that it performs to distribute load among the service nodes of any service node cluster. Regardless of how the load balancing criteria are defined, the service module 2220 uses the criteria to select a service node 2250 in the cluster 2255 for a new mobile device data message flow, and it then uses this selected service node's tunnel to forward the data messages in this flow to the selected service node. In forwarding the data messages, the service module 2220 forwards the MDM attribute data set that it retrieves from the MDM attribute storage 1125 for the data message flow.

Figure 23:
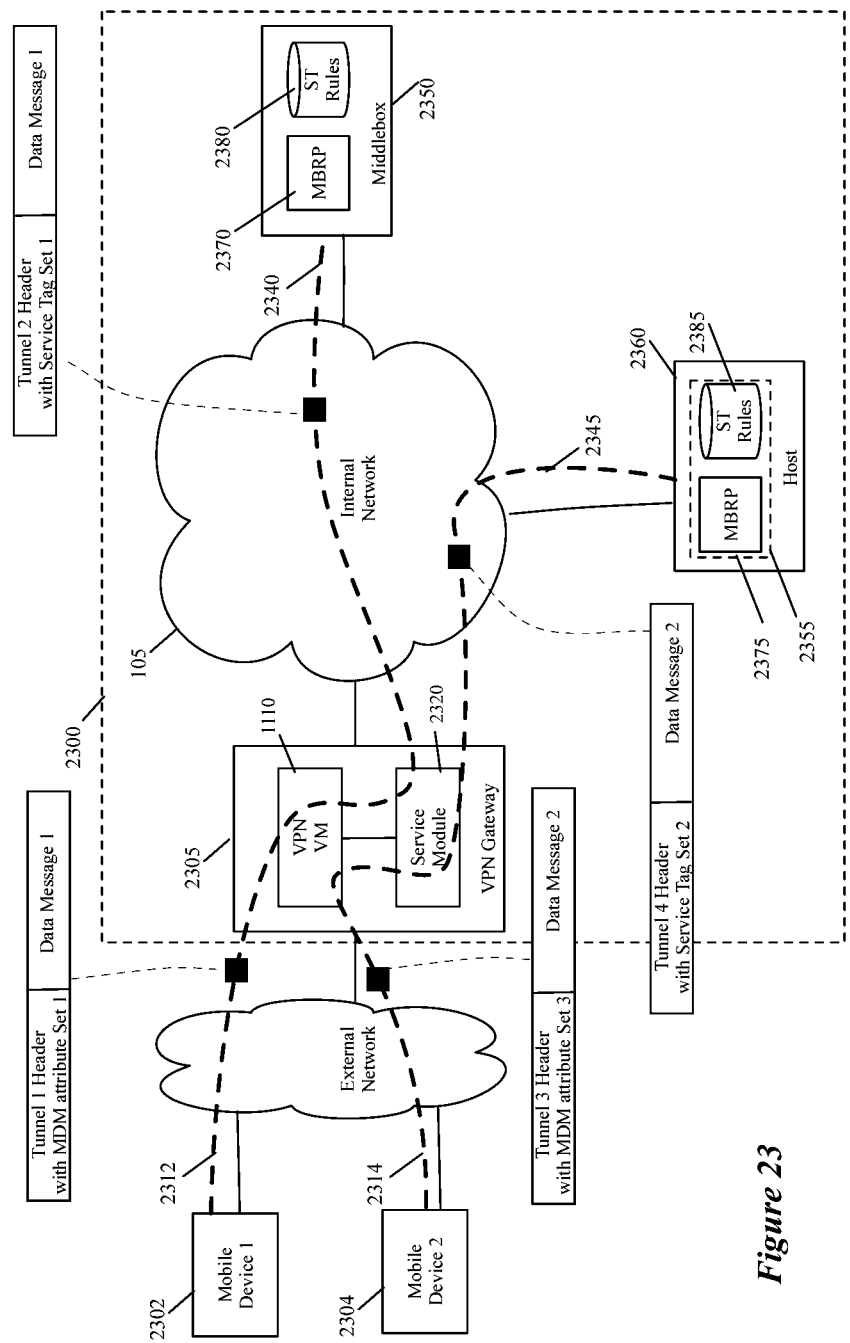
FIG. 23 illustrates a VPN gateway of some embodiments (1) analyzes the MDM attribute set associated with a data message flow, (2) based on this analysis, identifies one or more service tags, and (3) forwards the identified service tag(s) inband to the network elements with the data message flow.

Instead of forwarding MDM attributes inband to network elements (e.g., service nodes and/or forwarding elements) inside of the datacenter, the VPN gateway of some embodiments (1) analyzes the MDM attribute set associated with a data message flow, (2) based on this analysis, identifies one or more service tags, and (3) forwards the identified service tag(s) inband to the network elements with the data message flow. FIG. 23 illustrates one such VPN gateway 2305.

The VPN gateway 2305 is similar to the VPN gateway 2105, except that its service module 2320 identifies service tags for the data message flows based on the MDM attribute sets associated with the flows, and forwards inband the identified service tags to the middlebox service appliance 2350 and service module 2355 respectively along tunnels 2340 and 2345. The service appliance 2350 and service module 2355 then uses the service tags that they receive to identify service rules in their service-tag rule storages 2380 and 2385. In some embodiments, each of these service rules has (1) a rule identifier that can specify a service tag, and (2) a service action that specifies a service operation to perform on a data message with a matching service tag. Thus, after receiving a new data message with a service tag, the service node 2350 or 2355 uses the service tag to identify a service rule in its rule storage 2380 or 2385 with a matching rule identifier. Once it finds the matching rule, the service node 2350 or 2355 then performs the matching rule's service action on the data message.

This service-tag approach allows the service module 2320 to map several different MDM attribute sets to the same service tag, in order to reduce the number of service rules that the service nodes have to process downstream. This is because several different MDM attribute sets can be indicative of the same condition. Hence, mapping a larger number of MDM attribute sets to a smaller number of service tags can simplify the service rule processing downstream.

For example, in some embodiments, the service tags are security tags that can quantify different security risk assessments for different data message flows. In these embodiments, different MDM attribute sets might be viewed as posing the same level of security risk. For instance, accessing the datacenter from a jailbroken device might be viewed as just as risky an activity as accessing the datacenter from a particular country. In this situation, the service module 2320 can associate the data message flows with a High Risk service tag by analyzing their MDM attribute sets. Service nodes 2350 and 2355 can then perform service operations on these data message flows based on the High Risk service tag. Examples of such operations include the MDM-attribute based logical segmentation operations, firewall operations, DNS operations, DNAT operations, and/or other middlebox or forwarding operations.

Figure 24:
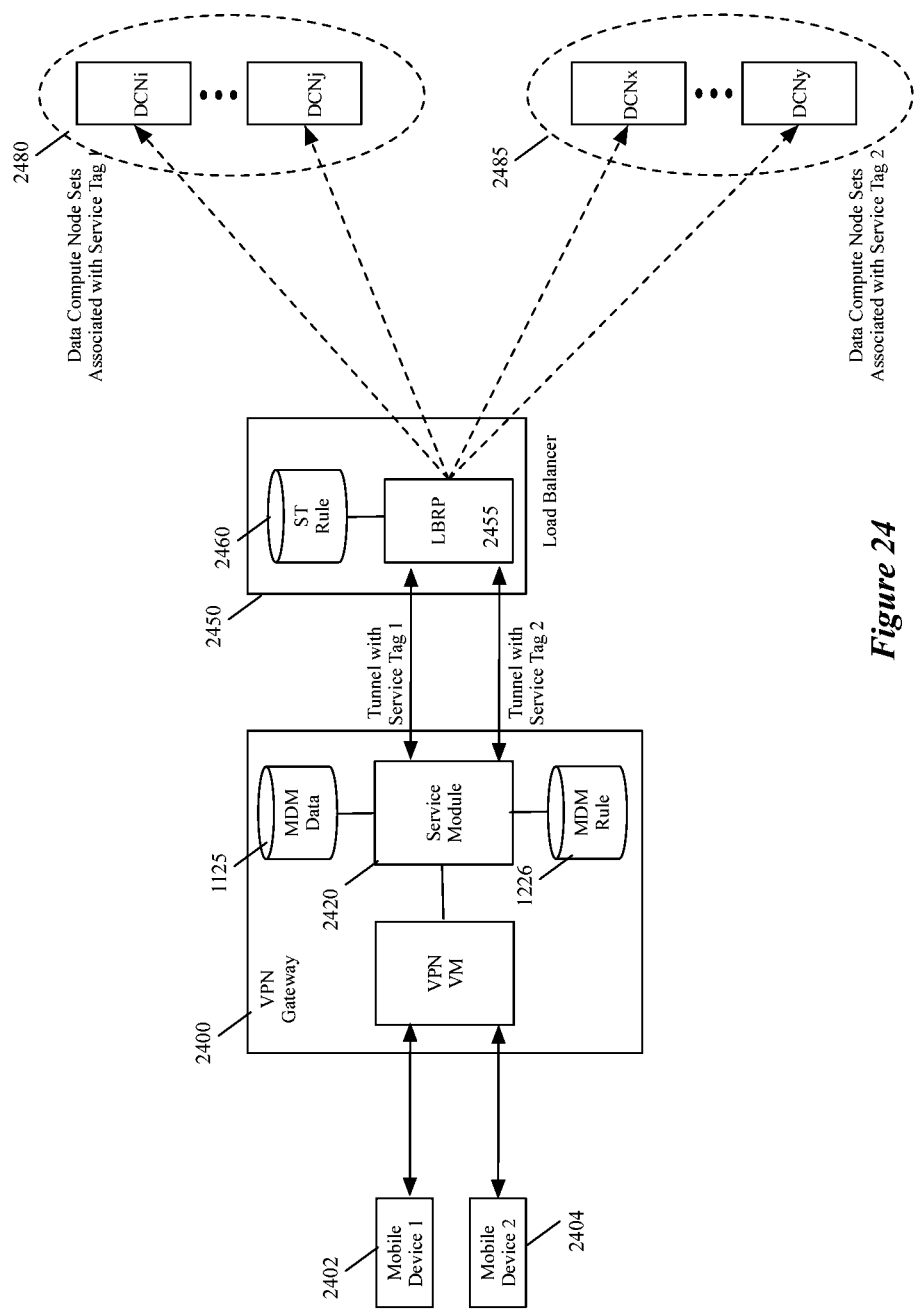
FIG. 24 illustrates an example of a load balancing operation that a service node performs on two mobile device data message flows based on the service tags, which the VPN gateway assigns after analyzing the MDM attribute sets associated with the data message flows.

FIG. 24 illustrates an example of a load balancing operation that a service node performs on two mobile device data message flows based on the service tags, which the VPN gateway assigns after analyzing the MDM attribute sets associated with the data message flows. The VPN gateway 2400 includes a service module 2420 that retrieves MDM attribute sets for the data message flows from the MDM attribute store 1125, based on the data message flow's header values. For each data message flow, the service module 2420 uses this flow's retrieved MDM attribute set to identify a service rule in its MDM-attribute based rule data storage 1226. In some embodiments, this service rule identifies a service tag to associate with the data message flow and a tunnel to the load balancing service node 2450.

The service module 2420 forwards the data messages for each flow along the identified tunnel to the load balancer 2450. For some or all of the data messages of each flow, the service module 2420 includes the service tag that it identified for the flow in the tunnel header. Thus, as shown, the service module 2420 sends the load balancer 2450 (1) service tag 1 for some or all of the data messages coming from the first mobile device 2402, and (2) service tag 2 for some or all of the data messages coming from the second mobile device 2404. As an example, service tag 1 might be a High Risk security tag because mobile device 1 is a jailbroken device, while service tag 2 might be a Low Risk security tag because mobile device 2 is not a jailbroken device. By assessing the risk factor associated with the data message flows, the security tag in effect is assessing the trustworthiness of the mobile device or the application from which the data message flow emanates. Instead of just two trust factors (i.e., High and Low Risk), the service module 2420 can specify a service tag from a larger group of service tags that quantify three or more levels of device and/or application trustworthiness.

The load balancer 2450 has a load balancing rule processor 2455 that uses the service tag that it receives for a data message flow to identify a cluster of DCNs and to pick one DCN in the identified cluster for receiving the data message flow. As shown, the rule processor 2455 uses the service tag to identify a rule in a service tag rule storage 2460. The identified rule then (1) identifies the DCN cluster to use (e.g., identifies the DCNs in this cluster or a DCN record in another storage that identifies the DCNs in this cluster) and (2) a set of load balancing criteria (e.g., a set of weight values for performing a weighted round robin load balancing operation).

In some embodiments, the identified service rule does not specify a set of load balancing criteria (e.g., the set of load balancing criteria can be preconfigured). Regardless of how the load balancing criteria are defined, the rule processor 2455 uses the criteria to select a DCN in a DCN cluster for a new mobile device data message flow, and it then forwards the data messages in this flow to the selected DCN. The two DCN clusters 2480 and 2485 in this example are associated with the two service tags. For example, one DCN cluster 2480 could be associated with High Risk data messages, while the other DCN cluster 2485 could be associated with Low Risk data messages. The DCNs in the High Risk cluster 2480 might provide a more limited set of functionalities (e.g., data access functionalities, etc.).

In some embodiments, the service node that associates the service tags with the mobile device data messages based on MDM attributes operates outside of the device on which the VPN gateway operates. Also, one of ordinary skill will realize that other embodiments can use other types of service tags than those described above. For instance, in some embodiments, service tags can identify whether the device is accessing the datacenter from another country (e.g., can identify the location of the device). In some embodiments, service tags have no overlap with the MDM attribute set, while in other embodiments service tags can have some overlap with the MDM attribute sets so long as they also contain attributes not in the MDM attribute sets.

Service tags can also be used to identify different groups of users and/or devices. By way of example, assume that one of the tenants of a datacenter is a hospital that employs doctors, nurses, and administrators. For such a tenant, the network controllers of some embodiments allow the hospital's network administrators to specify service rules in terms of group designations (i.e., in terms of Doctor, Nurse, and Administrator service tags). These network controllers also define MDM-attribute based rules for the hospital's VPN gateway service module that allows this module to map the mobile device data message flows to service tags. Using these rules, the service module associates each data message flow from each mobile device to a group designation tag (i.e., to Doctor, Nurse, and Administrator service tags). Service nodes downstream in the datacenter can then use these group designation tags to differently process remote service access from different groups (e.g., route different remote user group members to different DCN clusters, etc.). The service nodes can also specify different service operations for different groups (e.g., specify that remote communications of doctors and nurses should be encrypted, etc.).

As mentioned above, the network controller set receives from the MDM server set (1) the definition of various MDM attributes, and (2) a set of operators for interrelating these MDM attributes to each other and to their values. In some embodiments, the MDM server set provides the MDM attribute definitions as part of a dictionary that defines the MDM attributes and possible values for these attributes. The network controller set then allows an administrator to define policies and/or rules for the network elements (e.g., service rules for middlebox elements, routing rules for routers, etc.) based on the received MDM attribute definitions and the associated set of operators. In some embodiments, the administrator can program the service policies and/or service rules through a user interface (UI) or a set of APIs (application programming interface) of the network controller set.

Figure 25:
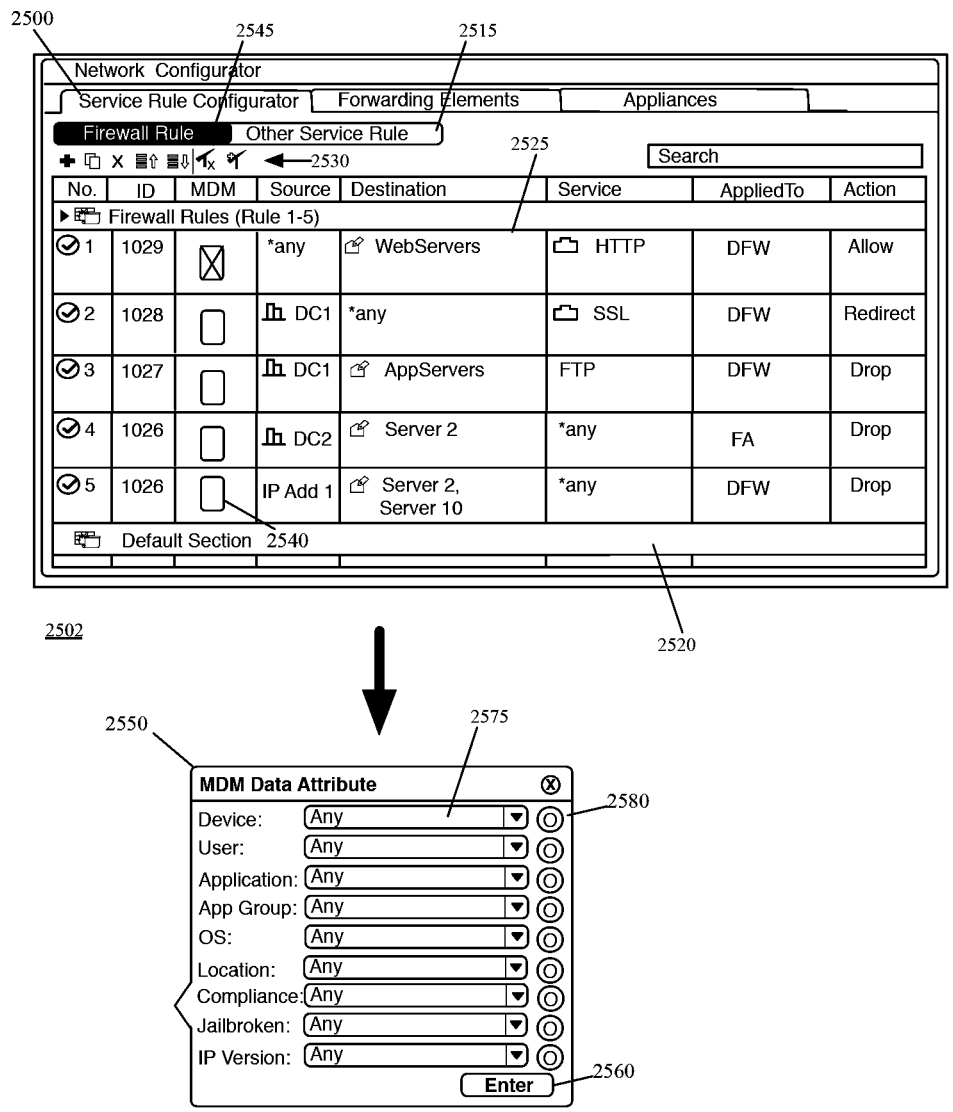
FIG. 25 illustrates an example of the UI of a service rule management console that the network controller set provides in some embodiments in order to allow an administrator to specify service rules based on MDM attribute sets and flow header values.
Figure 26:
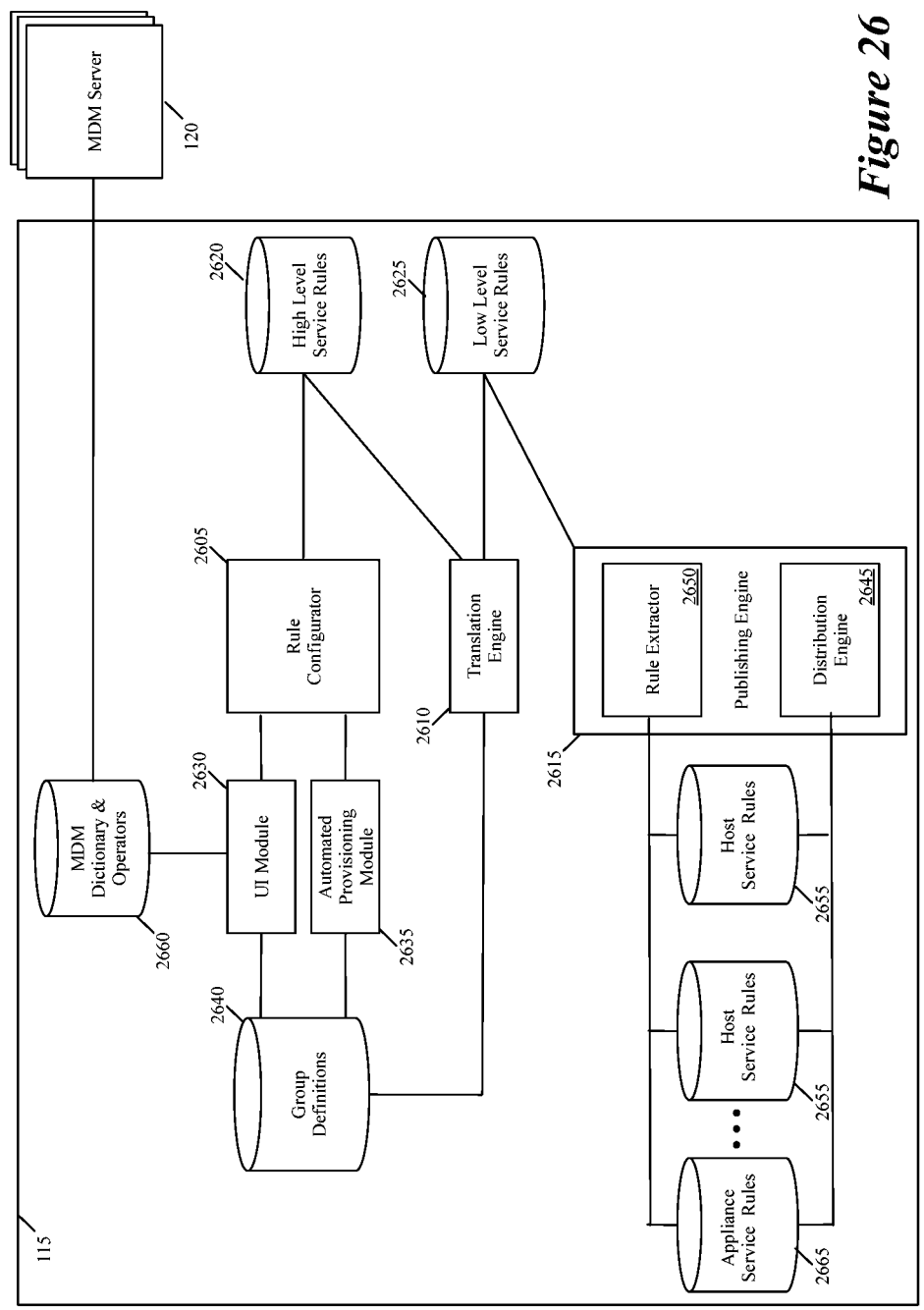
FIG. 26 illustrates a network controller of some embodiments of the invention.

To provide illustrative examples, FIGS. 25 and 26 present how some embodiments define and distribute MDM-attribute based service rules. FIG. 25 illustrates an example of the UI of a service rule management console 2500 that the network controller set provides in some embodiments in order to allow an administrator to specify service rules based on MDM attribute sets and flow header values. As shown, this console in some embodiments is part of a network configurator console (i.e., is one tab in a series of tabs in this console) through which other managed network elements (e.g., managed forwarding elements, gateways, top-of-rack switches, etc.) can be managed to implement desired network functionality (e.g., logical overlay functionality). In other embodiments, this service rule management console 2500 is a standalone interface, or is part of another datacenter management interface.

In FIG. 25, the example illustrated in two operational stages 2502 and 2504. The first stage 2502 illustrates the service rule management (SR) console 2500 through which service rules can be defined for one or more services, such as firewall rules, load balancing rules, etc. As shown, the SR management console 2500 has a service tab section 2515 and a rule section 2520. The service tab section 2515 has multiple tabs for multiple types of service. In this example, the service tab for the firewall rules has been selected. One of ordinary will realize that the discussion in this figure is equally applicable for defining other MDM-attribute based rules.

Whenever one of the service tabs is selected in the service tab section 2515, the console displays the rule section 2520 for the service type associated with the selected service tab. As shown, the rule section 2520 displays a rule list 2525 and several UI controls 2530. In the first stage 2502, the rule list 2525 displays several firewall rules, and the UI controls 2530 relate to firewall rules, as the firewall service tab 2545 has been selected in the service tab section 2515. In some embodiments, these UI controls 2530 includes (1) controls for adding firewall rules, (2) copying firewall rules, (3) deleting firewall rules, (4) moving firewall rules up and down in the rule section list being displayed, (5) applying filters to filter out rules in the rule section list that do not meet one or more filtering criteria, (6) removing filters, and (7) searching for firewall rules that meet certain criteria. In some embodiments, moving a firewall rule up or down on the rule list changes its priority in the list of firewall rules. These controls are further described in U.S. patent application Ser. No. 14/788,689, now issued as U.S. Pat. No. 9,787,641, which is incorporated herein by reference.

As shown in the first stage 2502, each firewall rule in the rule list 2525 can be defined in terms of one or more types of tuples, which include MDM tuple(s), source tuple, destination tuple, and service tuple. A firewall rule can be defined in terms of just one of these tuple types, or in terms of several of these tuple types. As shown, each rule also has an action tuple and an AppliedTo tuple, which will be described below.

In some embodiments, the source and destination tuples can be used to specify source and destination header values of data messages for which the firewall node processes the firewall rules. In other words, the firewall rule identifiers can be defined in terms of source and destination header values of data messages. For L3/L4 firewall rules, the source and destination header values can specified in terms of IP addresses and/or port values (e.g., TCP, UDP, or other L4 port values). For Ethernet firewall rules, the source and destination header values can be specified in terms of the data message L2 parameter values, such as MAC addresses, L2 services (protocols), etc.

In some embodiments, the service tuple can be used to define service protocols that the data messages use. In other words, the firewall rule identifiers can be defined not only in terms of source and destination header values of data messages, but also the service protocols specified in the data message headers. As shown, the rule list 2525 allows the source, destination and service tuples to be defined at various level of granularity because this console is supported by a backend engine that resolves higher level tuple values (e.g., datacenter (DC1, DC2), compute cluster, server type (Webservers, AppServers, etc.), logical switch, logical router, higher level service constructs) into lower level values (e.g., IP addresses, MAC addresses, service protocol names, etc.), as further described below.

The action tuple of each firewall rule specifies the action to perform with respect to a data message that has header values that match the rule's message matching tuples (e.g., the source, destination and service tuples). Examples of action tuple values include allow, deny (also called drop or block), re-direct, etc. The AppliedTo tuple of each firewall rule allows a set of firewall enforcement points in the network to be defined for the rule. Examples of such enforcement points include host-level firewall engines (referred to as distributed firewalls, DFWs) and perimeter firewall devices (e.g., firewall appliances).

Like the source, destination and service data tuples, the AppliedTo tuple in some embodiments can be defined in terms of high or low level constructs, as the firewall management console's backend engine resolves the high level constructs to lower level constructs. In the example illustrated in FIG. 25, all of the firewall rules except the fourth one are defined for the distributed firewall (DFW) nodes of a logical network, while the fourth firewall rule is defined for a firewall appliance (FA).

The MDM tuple control 2540 of a firewall rule allows one or more MDM attributes to be specified for the firewall rule's identifier. Selection of this control directs the console to open a window 2550 over the rule section 2520. The second stage 2504 shows this window 2550. As shown, this window lists a number of MDM attributes and a field 2575 for each attribute to define the acceptable value or values for this attribute. After selecting an MDM attribute's field, the administrator in some embodiments can type the acceptable value, values, or value ranges for the attribute or can select the value/values/ranges from a drop down window that opens below this field upon its selections.

In the example of FIG. 25, the window 2550 displays the following MDM attributes: device identifier, user identifier, application identifier, application group identifier, operating system, mobile device location, mobile device compliance status, mobile device jailbroken status, and Internet Protocol version. In some embodiments, a firewall rule can be specified in terms of one or more of these MDM attributes (i.e., the firewall rule identifier can be specified in terms of one or more of these attributes), in terms of flow header values (i.e., source, destination and protocol tuples), or in terms of both of the MDM and flow header values. Also, in some embodiments, the window 2550 lists other MDM attributes as the MDM-based firewall rules can be defined in terms of such other MDM attributes.

In specifying the value(s) for each MDM attribute, the administrator can use one or more operators in some embodiments to relate the value(s) to the MDM attribute. Examples of such operators include equal to, greater than, less than, greater than or equal to, less than or equal to, not equal to, etc. In some embodiments, the MDM server set specifies these operators along with the MDM attribute sets for the network controller set.

Also, as shown, the window 2550 displays an operator control 2580 next to each MDM attribute. In some embodiments, this control can specify an AND operator, a NOT AND operator or an OR operator. When one or more values are specified for an MDM attribute in the window, the value of the operator control specifies whether the specified MDM attribute's value or values should be AND'd, NOT AND'd or OR'd with the specified values of any other MDM attribute.

In some embodiments, the service rule console 2500 also provides an operator control (not shown) that allows an administrator to specify how the specified MDM attributes can be combined with any flow header values (e.g., source, destination and protocol tuples) specified for the firewall rule. In other embodiments, the MDM attributes specified through window 2550 are AND'd with any flow based attributes that are defined by reference to source, destination and protocol tuples. Some embodiments also provide UI controls that allow the administrator to define nested combinations of MDM attributes, with operators defining relationship between different nested groups. Alternatively, other embodiments only allow firewall rule identifiers to be specified in terms of MDM and/or flow tuple attributes that are AND'd with each other. Some of these embodiments do not provide operator controls 2580 for specifying AND, NOT AND or OR operators, as the operator by default is an AND operator.

After specifying one or more values for one or more MDM attributes in window 2550, the administrator can select the Enter control 2560 to direct the service rule console 2500 to add the selected MDM attribute(s) and specified value(s) to the definition of the selected firewall rule (i.e., of the firewall rule that is associated with the selected MDM control 2540 that resulted in the opening of the window 2550). As mentioned above, the selected firewall rule can also specify one or more flow header values for its rule identifier, or this rule can be just defined in terms of the specified MDM attribute set.

The network controller set distributes the MDM-based policies or MDM-based rules to one or more network elements (e.g., pushes the policies/rules to the network elements, or allows the network elements to pull these policies/rules). In some embodiments, the network elements convert any MDM-based policies that they receive to MDM-based rules that they enforce. In some embodiments, MDM-based policies are rules that are specified in terms of higher level constructs (e.g., datacenter, compute cluster, server type, logical switch, logical router, higher level service constructs).

The network controller in some embodiments distributes MDM-based rules that are defined in terms of lower level constructs (e.g., IP addresses, MAC addresses, service protocol names, etc.). When the administrator-specified MDM-based policies are defined in terms of higher level constructs, the network controller in these embodiments resolves higher level tuple values (e.g., datacenter, compute cluster, computer server type, logical switch, logical router, higher level service constructs) into lower level value (e.g., IP addresses, MAC addresses, service protocol names, etc.), before distributing the MDM-based rules to the network elements (e.g., to the agents 1140 executing on the hosts 1200).

FIG. 26 illustrates a network controller 115 of some embodiments of the invention. This controller can define firewall and other service rules in terms of higher-level identifiers, but distributes these rules in terms of lower-level identifiers. The controller 115 includes a rule configurator 2605, a translation engine 2610, a publishing engine 2615, a high-level rule storage 2620, a low-level rule storage 2625, a user interface (UI) module 2630, an automated provisioning module 2635, a group-definition data storage 2640, MDM dictionary and operator data storage 2660, and several enforcing-device data storages 2655 and 2665.

The rule configurator 2605 configures the service rules (e.g., firewall rules, load balancing rules, DNAT rules, etc.) by interacting with users (e.g., network administrators) through the UI module 2630. As shown, the UI module 2630 allows MDM-attribute based service rules to be defined by reference to the MDM dictionary and operators stored in storage 2660. As further shown, the network controller 115 receives this dictionary and the operators from the MDM servers 120.

The rule configurator 2605 also configures the service rules at the direction of automated provisioning module 2635 that directs the rule configurator 2605 to specify these rules as part of the provisioning of a physical or logical network. For instance, when the controller 115 is part of a network control system that manages logical networks in a multi-user (e.g., multi-tenant) hosted environment, the provisioning module 2635 in some embodiments directs the configurator 2605 to specify at least some of the service rules when a logical network is being specified for one user (e.g., for one tenant) and/or when a new VM is being provisioned on a host. In some embodiments, the provisioning module 2635 can automatically provision (without any user input) MDM-attribute based service rules by using the attribute sets and operators that are stored in the storage 2660.

The configurator 2605 allows users (through the UI module 2630 or the provisioning module 2635) to specify service rules in terms of high-level constructs. Examples of such high-level constructs are the high-level network, compute, and security constructs, such as logical switches, logical routers, logical networks, physical networks, compute clusters, datacenters, distributed firewalls, etc. The configurator 2605 stores the service rules that it configures in the high-level rule storage 2620.

From the high-level rule storage 2620, the translation engine 2610 retrieves the service rules, and converts the high-level construct identifiers in the tuples of the retrieved rules to lower-level construct identifiers. For instance, in some embodiments, the translation engine 2610 converts compute constructs (e.g., datacenter identifiers, compute cluster identifiers, host identifiers, etc.), network constructs (e.g., LFE identifiers, logical network identifiers, etc.), and security groups (formed by one or more network or compute constructs) into IP addresses, VNIC identifiers and wildcard values. In so converting the construct identifiers, the translation engine 2610 ensures that all service rules are defined by low-level identifiers that can be deciphered by all enforcing devices that receive the service rules. The translation engine 2610 stores the service rules that it retrieves, and when necessary converts, in the low-level rule data storage 2625.

To convert high-level identifiers (e.g., the high-level network construct, compute construct, and security groups defined by the AppliedTo tuples) to low-level identifiers (e.g., to IP addresses, VNIC identifiers, and wildcard values), the translation engine 2610 relies on the definition of the high-level groups that are stored in the group definition data storage 2640. These definitions are stored by a user (through the UI module 2630) or by the automated provisioning module 2635.

In some embodiments, these definitions are statically defined. In other embodiments, some or all of the high-level group definitions are dynamically modifiable by a user or the provisioning module 2635. Specifically, one or more of the identifiers in some embodiments can refer to dynamically modifiable constructs, which, in turn, allows the controller 115 to dynamically adjust the service rules by dynamically changing the definition of the identifiers. In some embodiments, the rule configurator 2605 can specify one or more of the compute constructs, network constructs and security groups as dynamic collection that can have members (e.g., forwarding elements, hosts, VNICs, etc.) dynamically added and/or removed from them.

For constructs that are defined by reference to static or dynamic groups, the translation engine 2610 (1) uses the group definitions in the group definition data storage 2640 to identify the low-level identifiers (e.g., the VNIC and wildcard values) associated with the high-level identifiers, (2) substitutes the high-level identifiers with the identified low-level identifiers, and (3) stores the resulting rules in the low-level rules storage 2625. When a dynamic collection that is used to define the tuple(s) of one or more service rules is modified, the translation engine 2610 updates the low-level identifiers of the affected service rules. As further described below, the publishing engine 2615 then sends the updated membership change for the affected service rules to the service-rule enforcing devices that need to be informed of this membership change. This approach foregoes the need to resend the affected service rules to the enforcing devices that previously received these rules. However, the publishing engine 2615 will send an affected service rule to a new enforcing device when the membership change to a dynamic collection requires the addition of a new enforcing device.

The publishing engine 2615 collects and distributes enforcing-device service rules from the low-level data storage 2625. As shown in FIG. 26, the publishing engine 2615 includes a rule extractor 2650 and a distribution engine 2645. For each enforcing device, the rule extractor 2650 identifies and retrieves from the lower-level data storage 2625, the service rules that pertain to the enforcing device. The rule extractor 2650 stores the retrieved service rules for each particular enforcing device in a data storage (e.g., data storages 2655 and 2665) that the publishing engine 2615 maintains for the particular enforcing device.

In some embodiments, the rule extractor 2650 only retrieves and stores for each enforcing device the service rules that pertain to that enforcing device. As such, the enforcing-device data storages (e.g., data storages 2655 and 2665 that store the service rules for each enforcing device) are typically much smaller than the high-level and low-level data storages 2620 and 2625, because the enforcing-device data storages contain only service rules that pertain to their respective enforcing device.

In some embodiments, the service rules that pertain to an enforcing device include the service rules that relate to data end nodes (e.g., the VMs or the VM VNICs) that are connected to the enforcing device. In some embodiments, the rules that pertain to each enforcing device also include the service rules that relate to data end nodes that may be connected to the enforcing device. For instance, when a particular host belongs to a compute cluster that implements a particular logical network, the rule extractor 2650 of some embodiments stores, in a data storage for the particular host, the service rules that are specified for the logical network even before a VM that belongs to the logical network is instantiated on the particular host. Pushing the service rules ahead of time to such a host is advantageous because it allows the host to configure the service rules for the VM without interacting with a controller.

FIG. 26 shows three of the data storages 2655 and 2665 that the rule extractor 2650 maintains. Two of these data storages 2655 are for hosts that execute service modules that serve as enforcing devices for the VMs executing on the hosts. The third data storage 2665 is for a service appliance (e.g., a firewall appliance). In some embodiments, the distribution engine 2645 of the publishing engine 2615 pushes to each enforcing device (through a network) the service rules that are stored in the data storage that the rule extractor 2650 maintains for the enforcing device. In other embodiments, the enforcing devices pull the service rules from the distribution engine 2645. In still other embodiments, the distribution engine 2645 pushes the service rules to some of the enforcing devices, while serving as a resource from which other enforcing devices can pull the service rules.

As mentioned above, the publishing engine 2615 distributes to the enforcing devices updates to enforcement point sets when a user or an automated process dynamically modifies such sets. Such modifications cause the translation engine 2610 in some embodiments to update the service rules in the lower-level data storage 2625. This, in turn, can cause the rule extractor 2650 to update or to create one or more rules in one or more enforcing-device data storages (e.g., data storages 2655 and 2665) that it maintains for the enforcing devices. The distribution engine then distributes (e.g., through push or pull actions) the updated rules to the affected enforcing devices.

In some embodiments, the MDM attribute processing service modules use a novel MDM-attribute based service rule storage to store MDM-attribute based service rules. This service rule storage has an indexing structure that can quickly identify MDM-attribute based rules that can have any number of arbitrary MDM attributes and attribute values. In some embodiments, this indexing structure is dynamically built at the service module from service rules that are defined in a vector form by a network controller. By building this indexing structure dynamically at the service module based on the vector-defined service rules, the service rule storage can be quickly created and/or updated for a new or updated set of MDM attributes and/or values. In some embodiments, the service rule storage also generates an indexing structure for quickly identifying rules that match flow header values of a data message.

To define the MDM-attribute based service rules in vector form, the network controllers of some embodiments define each rule in terms of one or more vector labels, with (1) each vector label defined in terms of one or more MDM labels and one or more possible values for each label, and (2) two or more vector labels (when the rule is defined by reference to two or more vector labels) being interrelated with each other by one or more operators. Each MDM label is an MDM attribute, and each MDM label value is a value that the MDM attribute can have. Each vector label in a rule has the form

```
Vector Label {
Name: Label Name
Values: Vector { ...}
},
```

In some embodiments, two or more MDM labels can be associated in a rule by using the AND and AND NOT operators. The AND operator means that the label and its specified value(s) have to be present for the rule to be satisfied, while the AND NOT operator means that the label and its specified value(s) cannot be present for the rule to be satisfied. When more than one value is specified for an MDM label, these values are specified in terms of an explicit or implicit OR operator in some embodiments, meaning that the existence of any one of the specified values satisfies the condition of the rule specified by the value's associated label.

Several examples of vector-defined service rules are provided below. These examples illustrate that when multiple vector labels are specified, they are interrelated in terms of an explicit AND operator, and each specified value for a label is interrelated with any other value specified for the label by an implicit OR operator. These examples also illustrate that a label vector can be negated in the rule by using an explicit AND NOT operator.

```
Rule 1 {
Vector Label {
Name : User_Location
Values: {A, B, C}
}
<AND>
Vector Label {
Name : Phone_Status
Values: {D,E}
}
<AND NOT>
Vector Label {
Name : Phone_Ownership
Values: {F,G}
}
To Destination IP Address N
Action
Allow }
Rule 2 {
Vector Label {
Name: User_Location
Values: {A, B, C1}
}
<AND>
Vector Label {
Name : Phone_Ownership
Values: {F,G1}
}
To Destination IP Address B
Action
Deny
}
```

The exemplary rules expressed above are firewall rules. This novel vector form for expressing the firewall rules can specify complex firewall rule structures that are dependent on a number of MDM attributes. Specifically, these simple vectors can efficiently express the complex MDM-attribute based rules:

Rule 1: From User Location=(A|B|C) and (Phone Status=(D|E) and Phone_Ownership is not (F|G) to IP Address N: Allow Rule 2: From User Location=(A|B|C1) and Phone_Ownership is not (F|G1) to IP Address B: Deny.

Figure 27:
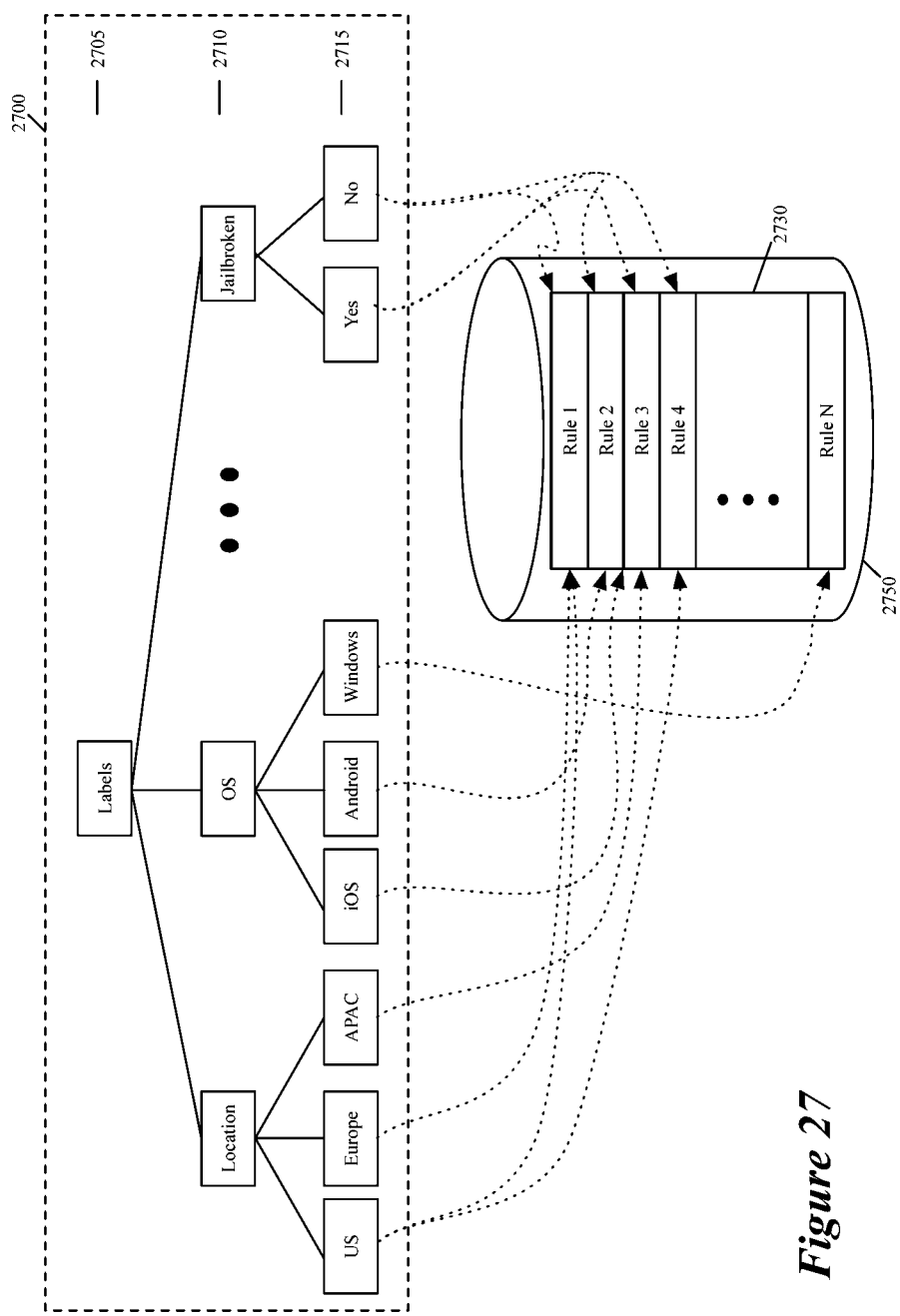
FIG. 27 illustrates an example of an MDM-attribute index tree of some embodiments.

Some embodiments use this novel vector form to specify other service rules (e.g., load balancing rules, NAT rules, etc.). In some embodiments, the network controller publishes the vector-specified service rules to the service nodes (e.g., the service modules, service appliance, etc.). Each service node then dynamically generates an index graph (e.g., a directed acyclic graph, DAG) that can later be used to quickly identify rules that match an MDM attribute set of a message flow. FIG. 27 illustrates an example of an index graph 2700 of some embodiments. As shown, the index graph 2700 is a three level tree. The first level 2705 is the root level, and in this example is called Labels.

The second level 2710 includes one node to represent each unique MDM label that can be used in a service rule. In this example, three MDM labels are shown, which are location, OS, and jailbroken status. Each MDM label node is a child node of the root level, and defines a tree branch of the root node. Each tree branch corresponds to one MDM label (one MDM attribute).

For each MDM label, the third level 2715 includes a node to represent each specified value for the MDM label. As shown, each value node identifies at least one service rule 2730 in the rule storage 2750. For instance, in some embodiments, each value node contains a reference (e.g., pointer) to at least one service rule 2730 that is defined in terms of the label value. Each value node can be linked to multiple rules, as multiple rules 2730 can be defined in terms of the label value. In some embodiments, one value node (i.e., one third-level node) can specify a range of values.

In some embodiments, service modules store the service rules 2730 in the same vector specified format that they are sent from the network controller. In other embodiments, the service module stores the service rules in a different format than the vector format that the network controller uses to send the rules. For example, in some embodiments, the service module stores uses a tag length value (TLV) format to store the service rules. In such embodiments, the service module converts the definition of the service rules from the vector specified format into a TLV format, and then stores the converted rules 2730 in the rule storage 2750. Also, in some embodiments, the service rules 2730 are stored with a set of priority values that identify their order of precedence, while in other embodiments the priority value of the service rules is implicitly defined based on the order in which the rules 2730 are stored in a rule storage structure 2750 (e.g., rule table).

Figure 28:
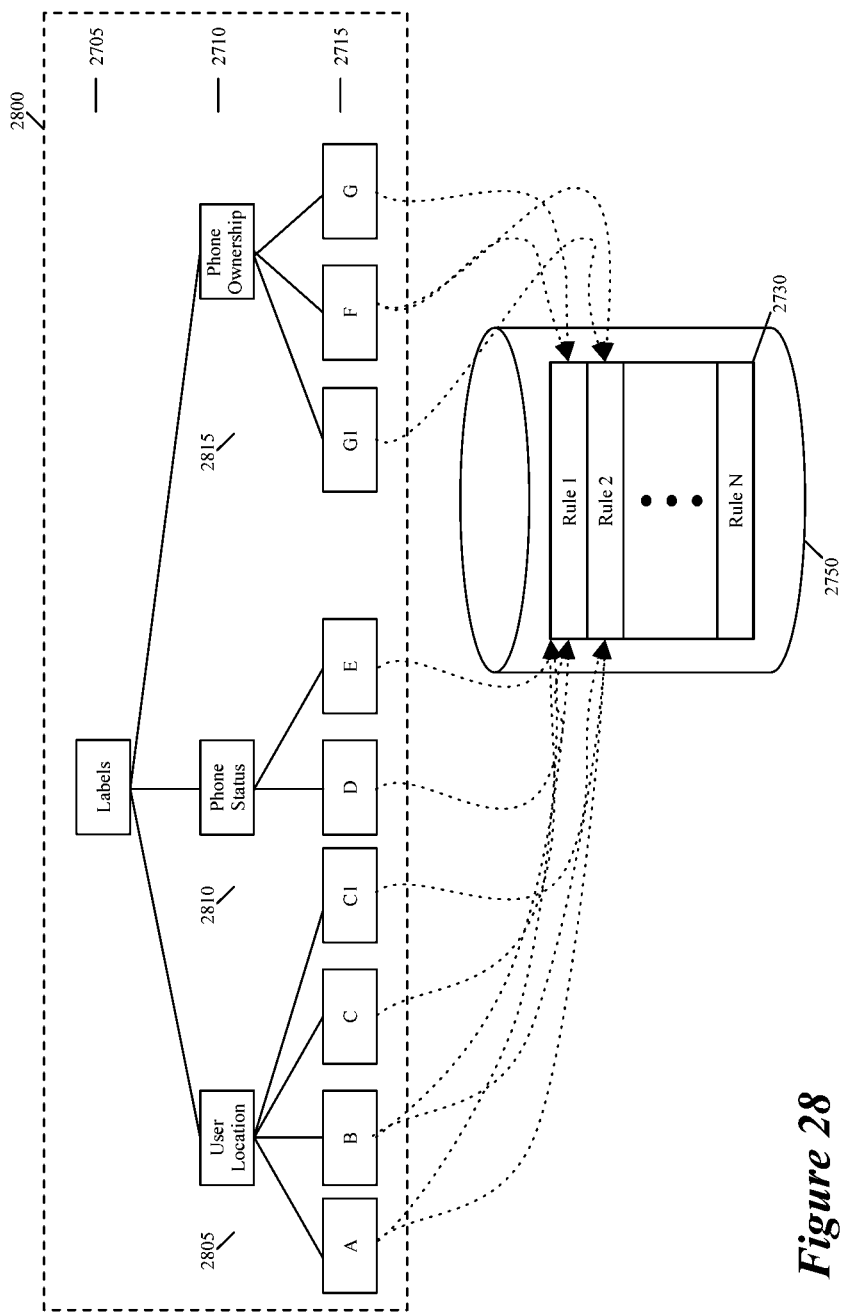
FIG. 28 illustrates an index tree that can be defined for the two vector-specified service rules mentioned above.

FIG. 28 illustrates an index tree 2800 that can be defined for the two vector-specified service rules mentioned above. As shown, this tree can have the three branches 2805, 2810, and 2815, which are for the User Location label, the Phone Status label, and the Phone_Ownership label. As shown, user-location values A and B refer to rules 1 and 2, user-location value C refers to rule 1, and user-location value C1 refers to rule 2. The phone-status values D and E refer to rule 1. The phone-ownership value F refers to rules 1 and 2, while the phone-ownership value G refers to rule 1 and phone-ownership value G1 refers to rule 2. Instead of creating a tree branch for each MDM label and placing all the tree branches in one tree structure, other embodiments define a separate tree structure for each MDM label.

For a data message flow's MDM attribute set, each MDM attribute in the set and its associated value are checked against the MDM label and its associated value(s) in the index tree, in order to generate a list of rules that are referred to by the MDM label values that match the MDM attribute values. Once the rule list is generated, one or more of the rules on this lists are processed for the flow's MDM attribute set and/or other flow-based attributes in order to identify the highest priority service rule that matches the MDM attribute set.

In some embodiments, the service module not only creates an index tree for the MDM attributes, but also creates an index tree to quickly identify rules that match flow header values of a data message. In some of these embodiments, the flow-header based index tree is a radix tree. The creation and use of a radix tree to index and retrieve firewall rules for packet header values is described in U.S. patent application Ser. No. 14/295,553, now issued as U.S. Pat. No. 9,774,707, which is incorporated herein by reference.

Figure 29:
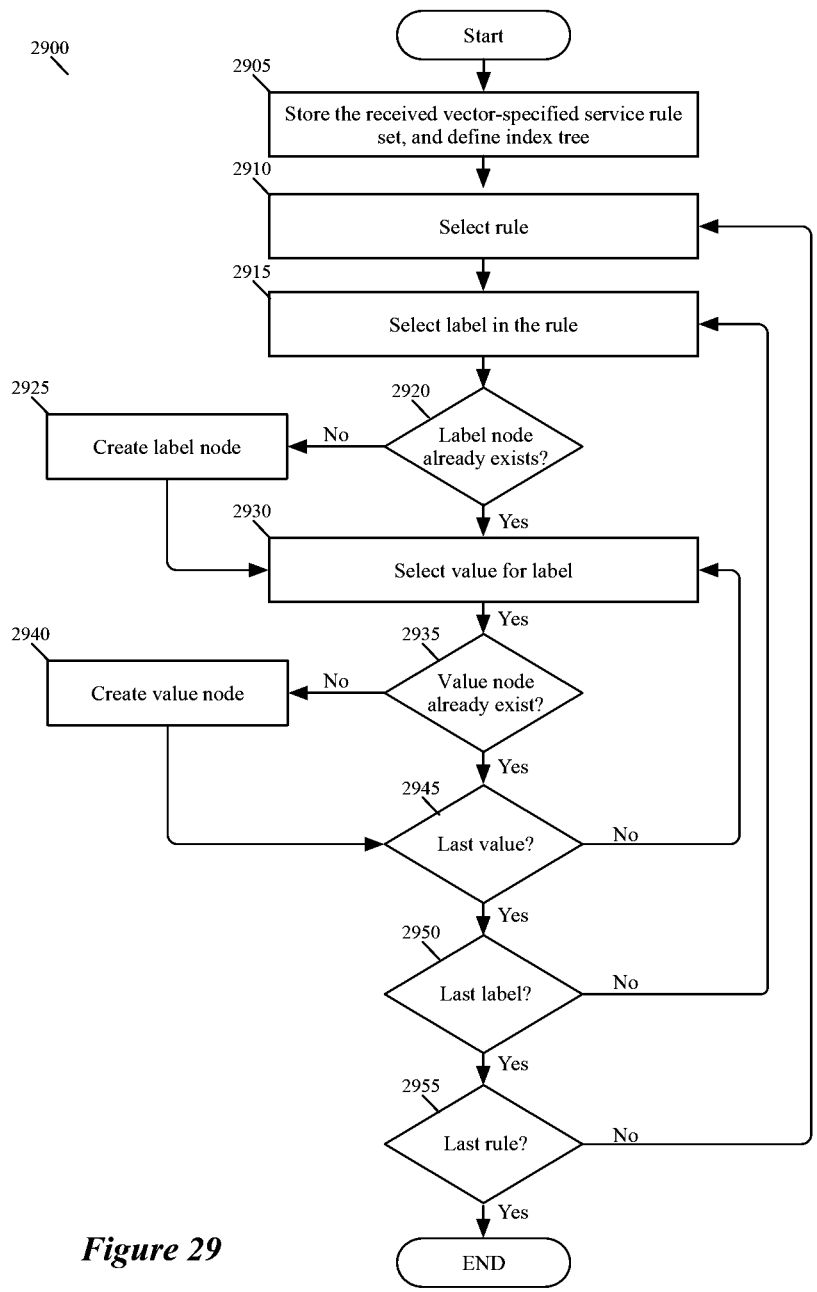
FIG. 29 illustrates a process that builds an MDM-attribute index tree structure for a service rule storage that stores a set of service rules from the network controller.

The process for examining the tree index structure and the service rules for a flow's MDM attribute set will be further described below by reference to FIG. 30. However, before describing this process, a process 2900 of FIG. 29 will be first described. This process 2900 builds an MDM-attribute index tree structure for a service rule storage that stores a set of service rules from the network controller. In some embodiments, a service node (e.g., service module, service appliance, etc.) performs the process 2900 each time it receives a new set of vector-specified service rules or an updated set of service rules.

At 2905, the process 2900 stores the received service rule set in a service rule data storage structure (e.g., a table) of the rule storage. In some embodiments, before storing the service rules, the process 2900 converts the definition of the service rules from the received vector format to another format (e.g., a TLV format). In the example illustrated in FIG. 29, the received set of service rules are the first set of rules received by the service node, or it is a set of rules that is meant to completely replace a set of rules previously received by the service node. Accordingly, at 2905, the process 2900 defines a new index tree. The process of updating a previously created index tree based on an updated service rule set will be described below.

At 2910, the process 2900 selects a service rule in the received service rule set. It then selects (at 2915) a label in the selected service rule. Next, at 2920, it determines whether the index tree already has a second-level label node for the selected label. If not, it creates a second-level node, associates this node with the root level Labels node, and transitions to 2930. The process 2900 also transitions to 2930 when it determines that it created a second-level node for the selected label in a previous iteration through 2920.

At 2930, the process 2900 selects a value that the selected rule specifies for the selected label. Next, at 2935, it determines whether the index tree already has a third-level value node for the selected value. If not, it creates a third-level value node, associates this node with second-level label node, and transitions to 2945. In embodiments that allow a value node to represent a value range, the process 2900 can select (at 2930) a value range for the selected label, and it can specify (at 2935) a value node for the selected value range.

The process also transitions to 2945 when it determines that it created a third-level value node for the selected label and selected value in a previous iteration through 2935. At 2945, the process 2900 determines whether it has examined all of the values that the selected rule specifies for the selected label. If not, it returns to 2930 to select another value. Otherwise, at 2950, the process 2900 determines whether it has examined all of the labels specified in the selected rule.

When the process 2900 determines (at 2950) that it has not examined all of the labels, it returns to 2915 to select another label in the specified rule. Otherwise, at 2955, the process 2900 determines whether it has examined all of the rules in the received rule set. If so, it ends. If it has not examined all of the rules, it returns to 2910 to select another rule in the specified rule set to examine.

In some embodiments, each time the network controller updates a service rule set for a service node, the network controller sends the entire rule set (i.e., the rule set containing old rules, new rules and updated rules) to the service node, and the service node creates the MDM-attribute index structure from scratch for each rule set that it receives. In other embodiments, the network controller does not send the entire rule set to the service node when it creates some new service rules and/or updates other service rules. In these embodiments, the network controller sends a service rule update to the service node.

When the received rule set is an update set that is meant to update a previously received set of rules, the service node performs a similar process to the process 2900 for newly specified rules in the update set in order to update the MDM-attribute index tree. However, the received rule set might remove previously specified rules. When a rule is being removed, the network controller provides the definition of the removed rule in the update rule set. The service node then steps through the labels of the removed rule to remove the label branches from the previously created index tree when the label branches are not used by any other service rule.

In some embodiments, each second level label node maintains a count of the number of service rules that use it, and each third level value node maintains a count of the number of service rules that use it. When processing a service rule update that requires the removal of a service rule, the service node removes a second or third level node if its count is 1. Otherwise, it decrements the count by 1. When a previously specified service rule is being updated to include a new label or value, the network controller of some embodiments supplies two records, one service rule removal record to remove the previously created service rule, and one service rule creation record to add a new service rule.

Figure 30:
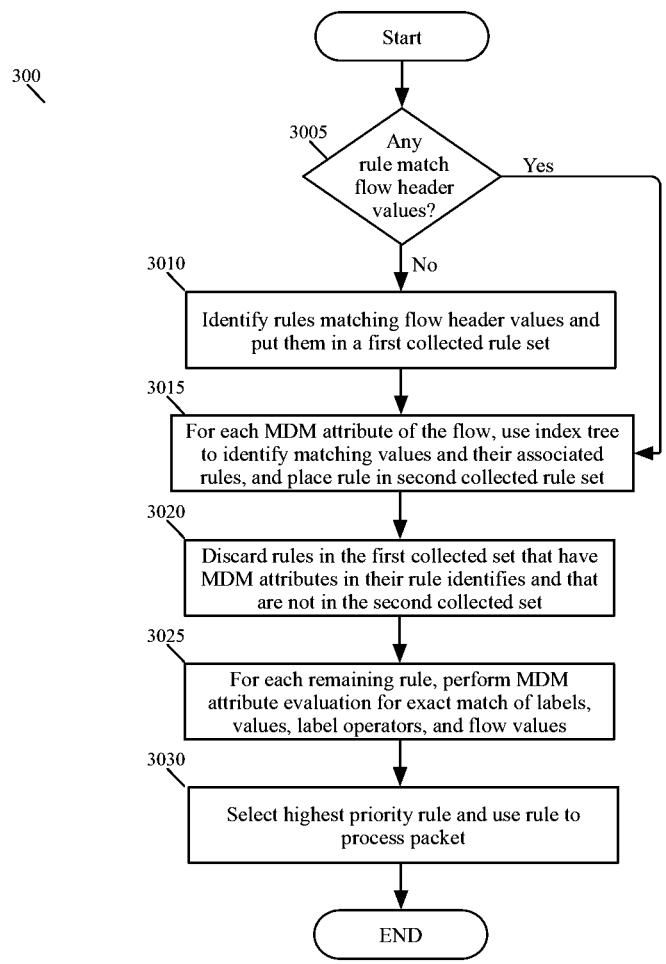
FIG. 30 illustrates a process that the service node uses to select a service rule in the service rule storage for a data message flow based on the flow's MDM attribute set and/or flow header values.

FIG. 30 illustrates a process 3000 that the service node uses to select a service rule 2730 in the service rule storage 2750 for a data message flow based on the flow's MDM attribute set and/or flow header values. This process matches an MDM attribute set and/or flow attributes of a data message with service rules stored in the service rule storage. As shown, the process initially determines (at 3005) whether any service rule matches the header values of a received data message. If not, the process transitions to 3015.

Otherwise, the process selects (at 3010) all service rules matching the message's header values and adds them to a first collection of service rules. In some embodiments, the process uses the radix tree structure to identify matching service rules in some embodiments. Also, in some embodiments, the process retrieves all service rules that match the message's header values instead of just retrieving the highest priority matching service rule, because this highest priority matching service rule might not match the MDM attributes of the data message. In some embodiments, the service rule storage 2750 always has at least one default service rule that matches any set of header values.

From 3010, the process 3000 transitions to 3015, where it identifies any service rule that is referred to by the value of any MDM attribute in the received data message's MDM attribute set. To identify such service rules, the process uses the MDM-attribute tree structure (such as index trees 2700 and 2800) in some embodiments. The process places all the service rules identified (at 3015) in a second collection of rule.

Next, at 3020, the process discards from the first service-rule set identified at 3010 any service rule that has an MDM attribute in its rule identifier, and that is not in the second service rule set. At 3020, the process then defines a third rule collection set by adding to the second service-rule set any service rule in the first set that was not discarded at 3020. In some embodiments, the process does not discard from the first rule set a service rule that is not in the second rule set but does not have MDM attributes in their rule identifiers, because such a first set rule might be the highest priority rule that matches the data message. In some embodiments, each service rule has a field that designates whether the rule's identifier is defined at least partially based on an MDM attribute. The process 3000 uses this field in some embodiments to quickly identify any first set rule that has an MDM attribute in its rule identifier.

After 3020, the process examines (at 3025) the service rule or rules in the third collection set defined at 3020. In examining a service rule in the third collection set, the process compares the MDM attribute values and flow header values of the received data message with the MDM attributes, values, operators and flow header values of the rule in order to determine whether the data message's attributes match those of the rule's identifier. At 3030, the process selects the highest priority service rule that matched the data message's MDM attributes and/or flow header values, and then ends.

In some embodiments, the operation 3030 is an implicit part of the operation 3025 because the process examines the rules in the third collection set according to their priority, and the process stops its examination of the rules once it identifies a rule that matches the received data message's MDM attributes and/or flow header values. Once the service node identifies the highest priority service rule that matches the received data message, the service node performs its service operation on the data message based on the action tuple value(s) of the matching service rule.

The following example illustrates how the MDM attribute set of a message can be matched with one or more MDM-attribute based rules. Assume that the MDM attribute set of a message is in the form <IP:Port> <Label L1:V1, L2:V2, L3:V3 . . . >. One such example would be 10.10.1.5:45634<User Location:B, Phone Status:D, Phone_Ownership: G1, Mempership_Status:Elite, Group_Member:M|O|P>

The process 3000 initially identifies any service rule that matches the flow header values of the received data message, and places all identified service rules in a first collected rule set for evaluation. The process then checks each MDM attribute value of the message against the label tree. If the attribute value matches one of the label values specified in the tree, the unique rules to which the matching label value refers are collected and put in the second collected rule set for evaluation. For the above example, both rules 1 and 2 would be collected since rule 1 is referred to by the user-location value B and phone-status value D, and rule 2 is referred to by user-location value B and phone-ownership value G1.

The process 3000 then performs its rule intersection operation to discard any rule in the first collected set that has an MDM attribute in its rule identifier and that is not in the second collected set. The process then adds all remaining rules in the first collected set to the second collected set to produce a third collected rule set. Now for every rule in the third collected set, the label evaluation is done from the basket for an exact match of all label attributes and the label operator <AND, AND NOT>. As mentioned above, some embodiments perform the rule matching in the order of the rule priorities, so that when a higher priority rule matches the MDM attribute set, the rule check can be stopped without checking the lower priority rules.

For the above example, assume that neither rule has an identifier that is defined in terms of flow attributes. While matching rule 1 for all labels, the following would match:
Label User Location: B True
Label Phone Status: D True
Label Phone_Ownership: G1 False After evaluating the operators, User Location AND Phone Status AND NOT Phone_Ownership, the rules would be qualified to be applicable on the traffic. Rule 2 match would be done next as follows:
Label User Location:B True
Label Phone_Ownership:G1 True
After evaluating the operators, even rule 2 would be applicable. Hence, the lower of the {Rule1, Rule2} would be selected and packet allowed/dropped based upon the action.

The rule-checking approach described above allows the service node to recheck the rules if one or more mobile-device MDM attributes (e.g., location) suddenly change. Then the rules can be reevaluated for the next incoming packet while the connection is still on and the connection allowed or dropped midway based upon the determination. More generally, the above-described approach provides a fast and scalable solution that can handle a multitude of dynamic labels and various complex values and relationships between these labels. The power of this approach is that it can process a multitude of dynamic tags extremely efficiently even for over 100K rules configured for different policies, so as to maintain a reasonable connection and throughput rate for the subscriber.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 31:
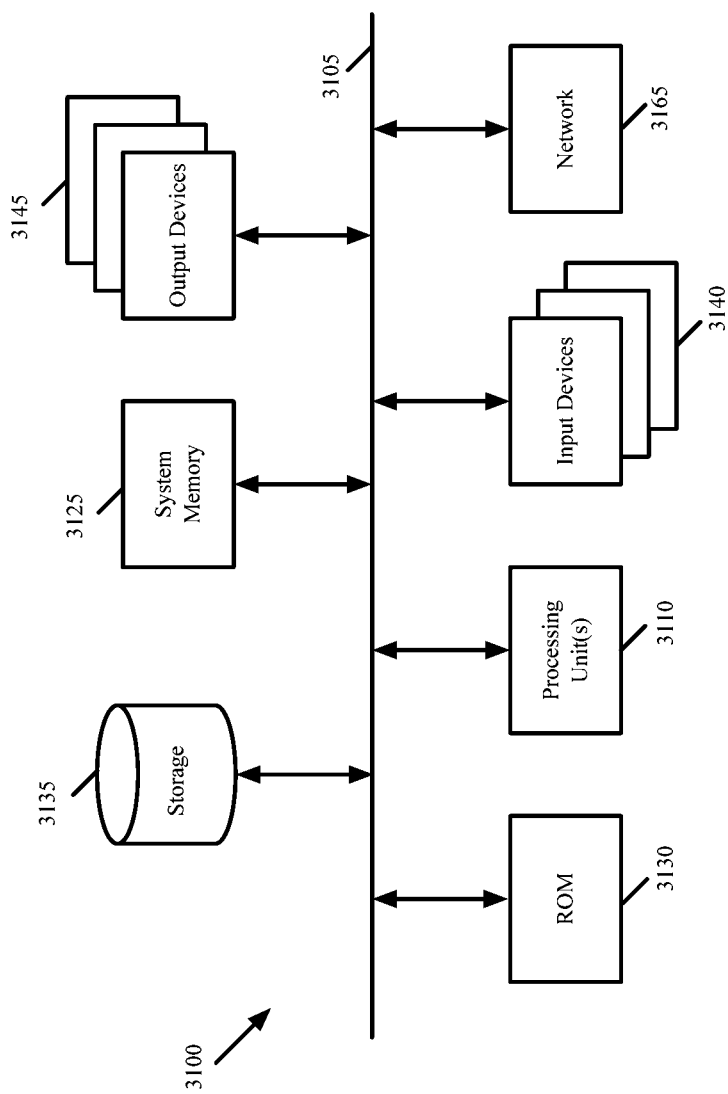
FIG. 31 conceptually illustrates a computer system with which some embodiments of the invention are implemented.

FIG. 31 conceptually illustrates a computer system 3100 with which some embodiments of the invention are implemented. The computer system 3100 can be used to implement any of the above-described hosts, controllers, and managers. As such, it can be used to execute any of the above described processes. This computer system includes various types of non-transitory machine readable media and interfaces for various other types of machine readable media. Computer system 3100 includes a bus 3105, processing unit(s) 3110, a system memory 3125, a read-only memory 3130, a permanent storage device 3135, input devices 3140, and output devices 3145.

The bus 3105 collectively represents all system, peripheral, and chipset buses that communicatively connect the numerous internal devices of the computer system 3100. For instance, the bus 3105 communicatively connects the processing unit(s) 3110 with the read-only memory 3130, the system memory 3125, and the permanent storage device 3135.

From these various memory units, the processing unit(s) 3110 retrieve instructions to execute and data to process in order to execute the processes of the invention. The processing unit(s) may be a single processor or a multi-core processor in different embodiments. The read-only-memory (ROM) 3130 stores static data and instructions that are needed by the processing unit(s) 3110 and other modules of the computer system. The permanent storage device 3135, on the other hand, is a read-and-write memory device. This device is a non-volatile memory unit that stores instructions and data even when the computer system 3100 is off. Some embodiments of the invention use a mass-storage device (such as a magnetic or optical disk and its corresponding disk drive) as the permanent storage device 3135.

Other embodiments use a removable storage device (such as a floppy disk, flash drive, etc.) as the permanent storage device. Like the permanent storage device 3135, the system memory 3125 is a read-and-write memory device. However, unlike storage device 3135, the system memory is a volatile read-and-write memory, such a random access memory. The system memory stores some of the instructions and data that the processor needs at runtime. In some embodiments, the invention's processes are stored in the system memory 3125, the permanent storage device 3135, and/or the read-only memory 3130. From these various memory units, the processing unit(s) 3110 retrieve instructions to execute and data to process in order to execute the processes of some embodiments.

The bus 3105 also connects to the input and output devices 3140 and 3145. The input devices enable the user to communicate information and select commands to the computer system. The input devices 3140 include alphanumeric keyboards and pointing devices (also called "cursor control devices"). The output devices 3145 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 31, bus 3105 also couples computer system 3100 to a network 3165 through a network adapter (not shown). In this manner, the computer can be a part of a network of computers (such as a local area network ("LAN"), a wide area network ("WAN"), or an Intranet, or a network of networks, such as the Internet. Any or all components of computer system 3100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For example, many of the examples described above refer to mobile devices, MDM servers, and MDM attributes. One of ordinary skill will realize that all of these examples are equally applicable to any type of remote device, RDM servers and RDM attributes.

Also, this specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc. One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

A number of the figures (e.g., FIGS. 8-10, 29 and 30) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. In view of the foregoing, one of ordinary skill in the art would understand that the invention is not to be limited by the foregoing illustrative details, but rather is to be defined by the appended claims.

The invention claimed is:

1. A non-transitory machine readable medium storing a program for processing mobile-device data messages entering a network, the program comprising sets of instructions for:
   receiving a data message sent by a remote device through a first tunnel that connects the remote device to the network;
   removing a first tunnel header of the first tunnel from the data message;
   identifying a set of remote device management (RDM) attributes associated with the received data message;
   based on the RDM attribute set, identifying a service tag to associate with the received data message;
   encapsulating the data message with a second tunnel header of a second tunnel to forward the data message along the second tunnel to a network element within the network; and
   inserting the identified service tag in the second tunnel header of the second tunnel, said service tag for allowing a set of network elements of the network to process the data message according to a set of policies of the network.

2. The non-transitory machine readable medium of claim 1, wherein the service tag comprises a security descriptor that determines how at least one network element performs the service on the data message.

3. The non-transitory machine readable medium of claim 2, wherein the service is one of a firewall operation, a load balancing operation, a logical network segmentation operation, and a destination network address translation operation on the data message.

4. The non-transitory machine readable medium of claim 2, wherein the security descriptor specifies a trust level from a plurality of trust levels for the data message.

5. The non-transitory machine readable medium of claim 2, wherein the security descriptor specifies whether the remote device is a trustworthy device.

6. The non-transitory machine readable medium of claim 2, wherein the security descriptor specifies whether the remote device is a jail broken device.

7. The non-transitory machine readable medium of claim 1, wherein
   the network is a network within a multi-tenant datacenter,
   the remote device is associated with a first tenant,
   the service tag associates the data message with a first set of users of the first tenant, which is different than a second set of users of the first tenant, and
   the service tag allows the data message to be processed according to a first set of policies defined for the first set of users and not a second set of policies defined for the second set of users.

8. The non-transitory machine readable medium of claim 7, wherein the first set of policies require the data message to be processed by a first set of compute nodes that is for the first set of users, and not a second set of compute nodes that is for the second set of users.

9. The non-transitory machine readable medium of claim 7, wherein the first and second sets of policies are different sets of service policies, the first set of service policies specifying a first group of services that should be performed on data messages from remote devices of the first set of users, while the second set of service policies specifies a second group of services that should be performed on data messages from remote devices of the second set of users.

10. The non-transitory machine readable medium of claim 9, wherein each group of services includes at least one of a firewall service, a load balancing service, a logical network segmentation service, and a destination network address translation service on the data message.

11. The non-transitory machine readable medium of claim 1, wherein
   the data message comprises a request for processing by a plurality of compute nodes comprising a first set of compute nodes and a second set of compute nodes, and
   the service tag directs the set of network elements to have a compute node in the first set of compute nodes process the data message's request instead of a compute node in the second set of compute nodes.

12. The non-transitory machine readable medium of claim 1, wherein the service tag comprises a location descriptor that describes a location of the remote device and that determines how at least one network element performs at least one service on the data message.

13. The non-transitory machine readable medium of claim 1, wherein the service tag is not a parameter in a header of the data message received from the remote device.

14. The non-transitory machine readable medium of claim 13, wherein the service tag is also not an RDM attribute in the identified RDM attribute set.

15. The non-transitory machine readable medium of claim 1, wherein the remote device supplies at least a subset of the RDM attribute set in a header of the first tunnel.

16. The non-transitory machine readable medium of claim 1, wherein the set of instructions for identifying the RDM attribute set comprises a set of instructions for receiving at least a subset of the RDM attribute set from an RDM server that is used to authenticate a request from the remote device to establish a VPN session through the first tunnel.

17. The non-transitory machine readable medium of claim 16, wherein the set of instructions for identifying the RDM attribute set further comprises a set of instructions for retrieving from a header of the first tunnel another subset of the RDM attribute set that is supplied by the remote device.

18. The non-transitory machine readable medium of claim 16, wherein the set of instructions for receiving the RDM attribute subset comprises a set of instructions for receiving the RDM attribute subset as part of an authentication approval from the RDM server.

19. The non-transitory machine readable medium of claim 16, wherein the program further comprises a set of instructions for receiving an authentication approval from the RDM server, wherein the set of instructions for receiving the RDM attribute subset comprises a set of instructions for receiving the RDM attribute subset in a communication from the RDM server that is separate from the authentication approval.

20. A method of processing remote-device data messages entering a network, the method comprising:
- receiving a data message sent by a remote device through a first tunnel that connects the remote device to the network;
- removing a first tunnel header of the first tunnel from the data message;
- identifying a set of remote device management (RDM) attributes associated with the received data message;
- based on the RDM attribute set, identifying a service tag to associate with the received data message;
- encapsulating the data message with a second tunnel header of a second tunnel to forward the data message along the second tunnel to a network element; and
- inserting the identified service tag in the second tunnel header of the second tunnel, said service tag for allowing a set of network elements of the network to process the data message according to a set of policies of the network.

21. The method of claim 20, wherein the data message is received
at a virtual private network (VPN) gateway that connects to the remote device through the first tunnel.

22. The method of claim 20, wherein the service tag comprises a location descriptor that describes a location of the remote device and that determines how at least one network element performs at least one service on the data message.

23. The method of claim 20, wherein the service tag is not a parameter in a header of the data message received from the remote device.

24. The method of claim 20, wherein the service tag is also not an RDM attribute in the identified RDM attribute set.

* * * * *